United States Patent [19]
Kita

[11] Patent Number: 6,112,054
[45] Date of Patent: Aug. 29, 2000

[54] SATELLITE POSITIONING METHOD IN A COMMUNICATION CONTROL SYSTEM

[75] Inventor: Kazunori Kita, Tokyo, Japan

[73] Assignee: Casio Computer Co., Ltd., Tokyo, Japan

[21] Appl. No.: 08/997,408

[22] Filed: Dec. 23, 1997

[30] Foreign Application Priority Data

Dec. 28, 1996 [JP] Japan ................................ 8-358834

[51] Int. Cl.$^7$ ........................... H04Q 7/20; H04Q 7/32
[52] U.S. Cl. .............. 455/12.1; 455/13.1; 455/13.2; 455/427; 455/456; 455/428; 455/18; 342/357.01; 342/357.06; 342/357.09; 342/352; 701/226
[58] Field of Search .................... 455/12.1, 13.1, 455/13.2, 427, 456, 428, 18; 342/357.01, 357.06, 357.08, 357.09, 357.11, 357.13, 357.16, 358, 352, 353; 701/226

[56] References Cited

U.S. PATENT DOCUMENTS

| | | |
|---|---|---|
| 3,349,398 | 10/1967 | Werth ........................................ 455/13.1 |
| 5,446,465 | 8/1995 | Diefes et al. ............................ 455/13.1 |
| 5,574,660 | 11/1996 | Diekelman .............................. 455/13.1 |
| 5,749,044 | 5/1998 | Natarajan et al. ...................... 455/13.1 |

*Primary Examiner*—Fan Tsang
*Assistant Examiner*—Keith Ferguson
*Attorney, Agent, or Firm*—Frishauf, Holtz, Goodman, Langer & Chick, P.C.

[57] ABSTRACT

A satellite position/arrival-time calculating section calculates the arrival date and time at which a communication satellite is to arrive in a communicable area where the communication satellite can communicate with a satellite communication terminal apparatus, and creates communicable date and time information. A timer controls a power supply control circuit in accordance with the arrival date and time information created by the satellite position/arrival-time calculating section. The timer automatically controls the power supply control circuit so as to supply communication power to a satellite communication circuit section while the communication satellite is in the communicable area and so as to stop the supply of the communication power at the time when the communication satellite leaves the communicable area.

19 Claims, 31 Drawing Sheets

| ADDRESS INPUT | DATA OUTPUT | | | |
|---|---|---|---|---|
| POSITION CODE | LONGITUDE | LATITUDE | RADIUS | |
| P1 | $\lambda 1$ | $\phi 1$ | r1 | |
| P2 | $\lambda 2$ | $\phi 2$ | r2 | |
| P3 | $\lambda 3$ | $\phi 3$ | r3 | |
| P4 | $\lambda 4$ | $\phi 4$ | r4 | |
| : | : | : | : | |

| ADDRESS INPUT | | | DATA OUTPUT | |
|---|---|---|---|---|
| LONGITUDE | LATITUDE | | GROUND COMMUNICATION AREAS A (COMMUNICATION: POSSIBLE/IMPOSSIBLE) | GROUND COMMUNICATION AREAS B (COMMUNICATION: POSSIBLE/IMPOSSIBLE) |
| $\lambda 1$ | $\phi 1$ | | 1(POSSIBLE) | 0(IMPOSSIBLE) |
| $\lambda 1$ | $\phi 2$ | | 1(POSSIBLE) | 0(IMPOSSIBLE) |
| $\lambda 2$ | $\phi 1$ | | 1(POSSIBLE) | 1(POSSIBLE) |
| $\lambda 2$ | $\phi 2$ | | 0(POSSIBLE) | 1(POSSIBLE) |
| : | : | | : | : |

SATELLITE POSITIONING METHOD IN A COMMUNICATION CONTROL SYSTEM

BACKGROUND OF THE INVENTION

1. Field of the Invention

The present invention relates to a communication control apparatus, a portable communication apparatus and a communication control method, all for performing communications via a communication satellite and a ground radio base station, and more particularly to a fitted-on type miniature communication control system such as a wrist watch type system.

2. Description of the Related Art

Mobile radiotelephone systems like an automobile telephone and a cellular telephone are nowadays utilized widely. In recent years, new mobile radiotelephone systems such as a PHS (Personal Handy-phone System) in Japan and a GSM (Global System for Mobile Communication) in Europe have been developed. Now the miniaturization of the mobile radiotelephone systems and an improvement in their performances are being carried out in accordance with the digitization of communication/call data. As a result, a small-sized communication terminal having a high performance can be used for sending and receiving data to and from a facsimile and a personal computer.

A system utilizing a communication satellite (geostationary satellite), which moves in a stationary orbit, is mainly used as a satellite communication system. In a satellite communication system utilizing a geostationary satellite, a communication terminal requires a large-sized parabola antenna. A worldwide mobile communication system employing, in place of a geostationary satellite, a plurality of non-geostationary satellites which move in orbits lower in height than the orbit of the geostationary satellite, is being planned now. Among others, considerations and experiments have already been initiated for plans such as the "Iridium Project", "Odyssey", "Global Star" and "Inmarsat-P" in order to bring them into practice.

In the mobile communication system utilizing non-geostationary satellites, one communication terminal outputs radio waves of the same degree as those for a current portable telephone and performs communications with another communication terminal via a communication satellite.

In recent years, a GPS (Global Positioning System) which measures a current position through the use of a GPS satellite has been generally utilized. A navigation apparatus which is mounted in a vehicle is mainly adopted in the GPS. Of late, however, a portable GPS reception apparatus has also been employed in accordance with the miniaturization of a GPS reception unit which receives radio waves from a GPS satellite. In Europe and the United States, a DGPS (Differential Global Positioning System) in which a fixed reception station accurately receives radio waves from a GPS satellite and correction data is created based on the received radio waves, is also utilized in order to improve the measurement accuracy in the GPS.

The mobile radiotelephone systems such as a cellular telephone and the PHS are basically those for achieving a call between communication terminals through a relay radio base station. According to those systems, however, it is also possible to realize a long-distance call between communication terminals and to establish a connection between a communication terminal and a public line network. According to the mobile radiotelephone systems, a service area is divided into radio zones known as intermediate-distance area cells or short-distance area microcells. Radio base stations are provided in the individual radio zones and are in charge of them. The radio base stations are connected to each other via a private line network or a public line network, due to which a call can be made between communication terminals which differ in radio zone and which are far distant from each other, as well as between a communication terminal and a subscriber's telephone connected to the public line network.

In principle, the mobile radiotelephone systems can realize a call when a communication terminal is present in a radio zone where the communication terminal can receive radio waves from a radio base station. In order to cover all areas as the radio zones, the mobile radiotelephone systems have to be provided with a large number of radio base stations.

Depending on country and system, the mobile radiotelephone systems differ from each other in radio frequency, connection method, communication protocol and standards for the communication terminals. These differences make mutual connection and data exchange impossible, which results in that a communication terminal, which is adopted in one mobile radiotelephone system, cannot be used in another mobile radiotelephone system.

In the mobile communication systems such as the "Iridium Project", "Odyssey", "Global Star", "Inmarsat-P", etc. which are being planned now, communications are performed using non-geostationary satellites. In general, a geostationary satellite travels along a stationary orbit whose height is 36,000 km. Meanwhile, a non-geostationary satellite travels along a low earth orbit or a medium earth orbit. The height of the low earth orbit is approx. 500 km to several thousand kilometers, and is lower than that of the orbit of the geostationary satellite. The height of the medium earth orbit is approx. 10,000 km, and is located inside the Van Allen belts. In the mobile communication systems utilizing non-geostationary satellites, since the height of the orbit of a communication satellite is low, the radio wave propagation delay time is short and the propagation loss of radio waves is small. Those permit the size and weight of a communication unit, etc., which are mounted in the communication terminal or the communication satellite, to be reduced.

The mobile communication systems utilizing non-geostationary satellites have an advantage in that a call area, which is considerably wider than a radio zone (call area) where radio waves can be received from a radio base station, can be attained. However, the above-mentioned mobile communication systems have the following problem:

A non-geostationary satellite moves relative to the earth at high speed, and accordingly the period of time over which the communication satellite stays in a communicable area, where it can communicate with a communication terminal, is short. In the case where the non-geostationary satellite moves in an orbit whose height is 1,000 km, the period of time over which the satellite stays in the communicable area, which begins at a specific point on the ground, is only twelve minutes. In order to enable a call to be made continuously from the specific point on the ground, a large number of non-geostationary satellites are required, and those satellites have to be successively located in communicable areas where they can communicate with the communication terminal. Since the speed at which the non-geostationary satellites move relative to the earth is high, a frequency shift due to the Doppler effect is considerable.

The antennas and the bodies of the communication terminals which are employed in the mobile communication systems utilizing the non-geostationary satellites can be made smaller in size than those employed in a system employing a geostationary satellite, but have larger sizes than those employed in the mobile radiotelephone systems. In the mobile communication systems utilizing the non-geostationary satellites, the communication fees are more expensive than those in the mobile radiotelephone systems, because the costs of launching and controlling a large number of communication satellites are huge.

In order to bring the communication fees down close to the fees charged for use of the mobile radiotelephone systems, it has been considered to employ, in the mobile communication systems utilizing the non-geostationary satellites, dual-mode communication terminals which contain communication circuits for the mobile radiotelephone systems so that not only the mobile communication systems but also the mobile radiotelephone systems can be utilized. According to the mobile communication systems utilizing the non-geostationary satellites and employing the dual-mode communication terminals, when the communication terminals can be connected to radio telephone base stations, the mobile radiotelephone systems, not the mobile communication systems, are utilized in order to reduce the total fees.

In the mobile radiotelephone systems such as the PHS in which a service area is divided into small radio zones, a communication terminal regularly receives an ID code from a radio base station, and identifies the radio base station which is in charge of a radio zone. When the communication terminal receives another different ID code, the communication terminal discriminates that it has moved to another radio zone, and sends a control signal to another radio base station which is in charge of the radio zone to which the communication terminal has moved. The radio base station receives the control signal sent from the communication terminal, and registers information about the communication terminal in the database of a network control apparatus which controls the radio base station. When calling up the communication terminal, the network control apparatus sends out a call signal to the communication terminal through the radio base station in accordance with the communication terminal information registered in the database, and establishes a line connection. In order to connect a line to the communication terminal, the network control apparatus needs to constantly check in which radio zone the communication terminal is located. Meanwhile, the communication terminal needs to regularly receive an ID code sent from the radio base station, which results in an increase in the power consumption.

In the case of a mobile communication system employing a geostationary satellite which moves in an orbit whose height is 36,000 km, the communicable area is wide, since the altitude of the communication satellite is high. In the mobile communication system utilizing a geostationary satellite, the communication satellite need not register or control the communication terminal, because the communicable area is fixed. On the other hand, in the mobile communication systems utilizing the non-geostationary satellites which move in the orbits whose heights are lower than that of a geostationary satellite, the communicable area changes from one to another in accordance with the movement of the communication satellite, and therefore the communication satellite needs to register and control the communication terminal.

In the mobile communication systems utilizing the non-geostationary satellites, unlike in the case of the mobile radiotelephone systems, the communication satellite is always moving relative to the earth, and the speed of its movement is considerably high. The network control apparatus has to frequently register the communication terminal and the communication satellite corresponding to the communication terminal in the database. Meanwhile, the communication terminal has to frequently receive an ID signal sent from the communication satellite. Consequently, according to the mobile communication systems utilizing the non-geostationary satellites, the important communication line and the electric power of the communication terminal are consumed due to such control procedures other than communications.

In order to eliminate the need to perform such control procedures other than communications in the mobile communication systems utilizing the non-geostationary satellites, it has been proposed to measure the position of the communication terminal, determine from the position of the communication satellite the communication satellite which becomes possible to communicate with the communication terminal, and perform communications via the communication satellite. Two methods for measuring the position of the communication terminal are available. According to one method, the communication satellite measures the position of the communication terminal. According to the other method, the communication terminal measures its position. However, those two methods have the following problems:

According to one method in which the communication satellite measures the position of the communication terminal, as well as in the case of an Emergency Position Indicating radio Beacon, the communication terminal has to constantly or frequently send position measurement data to the communication satellite, under which condition the communication terminal consumes a large amount of power. In the case where the number of system subscribers increases, the communication satellite is required to process position measurement data sent from a huge number of communication terminals, which entails the need to provide the satellite with a large-scale processing unit.

According to the other method in which the communication terminal measures its position, three or four communication satellites are located in the sky and send position measurement data in the same principle as that of the GPS. In this method, the number of communication satellites, the determination and arrangement of the orbit are limited. The communication satellites send the position measurement data to the communication terminal, and relay, to an earth station, position information sent from the communication terminal. The communication terminal thus requires a circuit for receiving the position measurement data, and consumes a large amount of power in order to receive the position measurement data.

SUMMARY OF THE INVENTION

The present invention has been made in consideration of the above circumstances, and an object of the present invention is to provide communication apparatus, communication control apparatus, a portable apparatus and a communication control method, all ient communications to be attained with low power consumption.

Another object of the present invention is to provide a communication apparatus, a communication control apparatus, a portable communication apparatus and a communication control method, all for determining communication conditions such as the arrival time and location at which communications with a communication satellite and a radio base station become possible, etc. and for enabling efficient communications to be attained.

According to the first aspect of the present invention having the above-described object, there is provided a communication terminal apparatus comprising:

orbit calculation means (29, 73, 125, 217, 324) for calculating position of a communication satellite which is changing;

current position discrimination means (15, 82, 125, 217, 305) for discriminating a current position of said communication terminal apparatus on the earth;

determination means (29, 73, 128, 220, 324) for determining whether said communication satellite has arrived a communicable area in which said communication satellite is capable of communicating with said communication terminal apparatus, based on the position of said communication satellite which said orbit calculation means (29, 73, 125, 217, 324) has calculated and the current position of said communication terminal apparatus which said current position discrimination means (15, 82, 125, 217, 305) has discriminated;

satellite communication means (3, 54, 103, 204, 306) for communicating with said communication satellite; and communication control means (4, 94, 122, 223, 328) for controlling said satellite communication means (3, 54, 103, 204, 306) to start and stop communications, in accordance with the result of the determination performed by said determination means (29, 73, 128, 220, 324).

Said orbit calculation means may include:

storage means for storing orbital element data specifying the shape of an orbit of said communication satellite and the motion of said communication satellite, and means (29, 73, 125, 217, 324) for calculating a geocentric position of said communication satellite which is the position relative to the earth, by performing orbital calculations based on the orbital element data stored in said storage means.

Said determination means (29, 73, 128, 220, 324) includes, for example, position determination means (38, 73, 128, 229, 324) for determining whether said communication satellite has arrived said communicable area and whether said communication satellite has left said communicable area.

Said current position discrimination means (15, 82, 125, 217, 305) may includes position input means (23) for inputting information representing the current position of said communication terminal apparatus on the earth.

Said current position discrimination means (15, 82, 125, 217, 305) may include position measurement calculation means (82, 135, 217, 305) for measuring and calculating the current position of said communication terminal apparatus on the earth.

Said position measurement calculation means (82, 135, 217, 305) may include means (15, 82, 125, 217, 305) for receiving signal radio waves from a GPS satellite and deriving the current position of said communication terminal apparatus on the earth by performing predetermined position measurement and calculation based on the received signal radio waves.

Said position measurement calculation means (82, 135, 217, 305) and said satellite communication means (3, 54, 103, 204, 306) may share at least a part of an antenna and at least a part of a communication circuit.

Said determination means (29, 73, 128, 220, 324) may include calculating determination means (29, 73, 128, 220, 324) for calculating at least one of an arrival time at which said communication satellite is to arrive said communicable area and a leaving time at which said communication satellite is to leave said communicable area, and for determining, based on the result of the calculation, whether said communication satellite has arrived said communicable area. In this case, said communication control means (4, 94, 122, 223, 328) controls said satellite communication means to start and stop communications, in accordance with the result of the determination performed by said calculating determination means.

Said determination means and said communication control means (4, 94, 122, 223, 328) may include:

calculating means (128) for calculating at least one of an arrival time at which said communication satellite is to arrive said communicable area and a leaving time at which said communication satellite is to leave said communicable area;

storing means (131) for storing the at least one of the arrival time and leaving time;

timer (129) for counting current time; and comparing means (130, 131) for comparing the current time and the time stored in said storing means, and controlling said satellite communication means to start and stop communications, in accordance with the result of the comparison by said comparing means.

Said communication control means (4, 94, 122, 223, 328) may include power supply control means (31, 76, 139, 329) for controlling turning on and off of a power supply to said satellite communication means (3, 54, 193, 294, 306).

Said satellite communication means (3, 54, 193, 294, 306) may include communication means (227) which employs at least one of a spread spectrum modulation and demodulation system and a code division multiple access system.

Said orbit calculation means (29, 73, 125, 217, 324) may include storage means (22) for storing orbital element data created by demodulating and decoding a signal which said satellite communication means (3, 54, 103, 204, 306) has received from said communication satellite, and means (29, 73, 125, 217, 324) for calculating the position of said communication satellite by using the orbital element data stored in said storage means (22).

The communication apparatus may comprises display means (453, 118, 215) for displaying data, position calculation means (29, 73, 128, 217, 324) for calculating communication satellite position information, based on at least one of orbit position information specifying a position of the orbit of said communication satellite, geocentric position information specifying a geocentric position of said communication satellite and apparent position information specifying an apparent position of said communication satellite, and display control means (14, 66, 116, 214, 320) for controlling said display means (453, 118, 215) to display, at least in one of the form of character data and the form of plot image data, the communication satellite position information calculated by said position calculation means (29, 72, 128, 217, 324).

The communication apparatus may be a fitted-on type communication terminal apparatus which is fitted on a part of a body of a user.

Said communication apparatus may include an antenna element (2, 52, 102, 202, 303) which is used to perform communications via said communication satellite. Said antenna element includes, for example, a helical type antenna, a dielectric antenna or a patch type flat antenna.

To achieve the objects, a communication apparatus according to the second aspect of the present invention comprises:

orbit calculation means (29, 73, 125, 217, 324) for calculating a position of a communication satellite;

current position discrimination means (15, 82, 125, 217, 305) for discriminating a current position of said communication terminal apparatus on the earth;

determination means (29, 73, 128, 220, 324) for determining whether said communication satellite has arrived a communicable area in which said communication satellite is capable of communicating with said communication terminal apparatus, based on the position of said communication satellite which said orbit calculation means (29, 73, 125, 217, 324) has calculated and the current position of said communication terminal apparatus which said current position discrimination means (15, 82, 125, 217, 305) has discriminated;

satellite communication means (3, 54, 103, 204, 306) for communicating with said communication satellite;

ground communication means (142, 204, 307) for performing communications via a earth radio base station; and communication control means (131, 221, 328) for controlling said ground communication means (142, 204, 307) to stop communications and controlling said satellite communication means (3, 54, 103, 204, 306) to start communications, when said determination means (29, 73, 128, 220, 324) determines that said communication satellite is in said communicable area, and for controlling said satellite communication means (3, 54, 103, 204, 306) to stop communications and controlling said ground communication means (142, 204, 307) to start communications, when said determination means (29, 73, 128, 220, 324) determines that said communication satellite is not in said communicable area.

Said ground communication means (142, 204, 307) may include identification code detection means (146, 231, 307) for receiving and detecting an identification code sent from said earth radio base station, and said communication control means (131, 221, 328) may include means (116, 214, 320) for controlling said ground communication means (142, 204, 307) to start communications, when said identification code detection means (146, 231, 307) detects the identification code sent from said earth radio base station, and for controlling said satellite communication means (3, 54, 103, 204, 306) to start communications, when said identification code detection means (146, 231, 307) does not detect the identification code sent from said earth radio base station and when said determination means (29, 73, 128, 220, 324) determines that said communication satellite is in said communicable area.

Said ground communication means (142, 204, 307) may includes waiting reception means (116, 214, 320), which waits a call from said earth radio base station, for performing communications upon receiving the call from said earth radio base station.

Said ground communication means (142, 204, 307) and said satellite communication means (3, 54, 103, 204, 306) may share at least a part of an antenna and at least a part of a communication circuit.

To achieve the objects, a communication apparatus according to the third aspect of the present invention comprises:

ground communication means (142, 204, 307) for performing communications via a earth radio base station;

current position detection means (125, 217, 305) for detecting a current position of said communication terminal apparatus on the earth and outputting current position information specifying the detected current position;

communication condition information storage means (326) for storing communication condition information including communication area position information specifying a position of a communication area where said ground communication means (142, 204, 307) is capable of performing communications;

area discrimination means (325) for discriminating whether said communication terminal apparatus is in said communication area, based on the current position information output from said current position detection means (125, 204, 307) and the communication area position information stored in said communication condition information storage means (326); and communication control means (131, 221, 328) for controlling said ground communication means (142, 204, 307) to start communications, when said area discrimination means (325) discriminates that said communication terminal apparatus is in said communication area, and for controlling said ground communication means (142, 204, 307) to stop communications, when said area discrimination means (325) discriminates that said communication terminal apparatus is not in said communication area.

Further, a communication apparatus according to the fourth aspect of the present invention, comprises:

orbit calculation means (29, 73, 125, 217, 324) for calculating a position of a communication satellite;

current position detection means (125, 217, 305) for detecting a current position of said communication terminal apparatus on the ground and outputting current position information specifying the detected current position;

determination means (29, 73, 128, 229, 324) for determining whether said communication satellite has arrived a communicable area where said communication satellite is capable of communicating with said communication terminal apparatus, based on the position of said communication satellite which said orbit calculation means (29, 73, 125, 217, 324) has calculated and the current position of said communication terminal apparatus which said current position detection means (125, 217, 305) has detected;

satellite communication means (3, 54, 103, 204, 306) for communicating with said communication satellite;

ground communication means (142, 204, 307) for performing communications via a ground radio base station;

communication condition information storage means (326) for storing communication condition information including communication area position information specifying a position of a communication area where said ground communication means (142, 204, 307) is capable of performing communications;

area discrimination means (325) for discriminating whether said communication terminal apparatus is in said communication area, based on the current position information output from said current position detection means (125, 204, 307) and the communication area position information stored in said communication condition information storage means (326); and communication control means (131, 221, 328) for controlling said ground communication means (142, 204, 307) to start communications, when said area discrimination means (325) discriminates that said communication terminal apparatus is in said communication area, and for controlling said satellite communication means (3, 54, 103, 204, 306) to start communications, when said area discrimination means (325) discriminates that said communication terminal apparatus is not in said communication area.

A communication control apparatus according to the fifth aspect of the present invention comprises:

communication satellite position detection means (29, 73, 128, 217, 324) for detecting a position of a communication satellite which is changing;

terminal position detection means (82, 125, 217, 305) for detecting a current position of said communication terminal on the earth;

determination means (29, 73, 128, 220, 324) for determining whether said communication satellite has arrived a communicable area where said communication satellite is capable of communicating with said communication terminal, based on the position of said communication satellite which said communication satellite position detection means (29, 73, 128, 217, 324) has detected and the current position of said communication terminal which said terminal position detection means (82, 125, 217, 305) has detected;

satellite communication means (3, 54, 103, 204, 306) for communicating with said communication satellite;

ground communication means (142, 204, 307) for performing communications via a ground radio base station;

communication control means (131, 221, 328) for controlling said ground communication means (142, 204, 307) to stop communications and controlling said satellite communication means (3, 54, 103, 204, 306) to start communications, when said determination means (29, 73, 128, 220, 324) determines that said communication satellite is in said communicable area, and for controlling said satellite communication means (3, 54, 103, 204, 306) to stop communications and controlling said ground communication means (142, 204, 307) to start communications, when said determination means (29, 73, 128, 220, 324) determines that said communication satellite is not in said communicable area.

A communication control apparatus according to sixth aspect of the present invention includes:

calculation means (29, 73, 128, 217, 324) for detecting a position of a communication satellite which is changing;

a position measurement calculation means (82, 125, 217, 305) for detecting a current position of said communication terminal on the earth;

a control circuit (14, 66, 116, 214, 320) for determining whether said communication satellite has arrived a communicable area where said communication satellite is capable of communicating with said communication terminal, based on the position of said communication satellite which said azimuth calculation means (29, 73, 128, 217, 324) has detected and the current position of said communication terminal which said position measurement calculation means (82, 125, 217, 305) has detected;

a satellite communication circuit (3, 34, 103, 204, 306) for communicating with said communication satellite;

a radio communication circuit (142, 204, 307) for performing communications via a ground radio base station; and a communication control circuit (131, 221, 328) for controlling said radio communication circuit (142, 204, 307) to stop communications and controlling said satellite communication circuit (3, 54, 103, 204, 306) to start communications, when said control circuit (14, 66, 116, 214, 320) determines that said communication satellite is in said communicable area, and for controlling said satellite communication circuit (3, 54, 103, 204, 306) to stop communications and controlling said radio communication circuit (142, 204, 307) to start communications, when said control circuit (14, 66, 116, 214, 320) determines that said communication satellite is not in said communicable area.

To achieve the object, a fitted-on type communication terminal apparatus according to the seventh aspect of the present invention has a main body which is fitted on a part of a body of a user, said main body including:

communication satellite position detection means (29, 73, 128, 217, 324) for detecting a position of a communication satellite;

terminal position detection means (82, 125, 217, 305) for detecting a current position of said main body;

determination means (29, 73, 128, 220, 324) for determining whether said communication satellite is in a communicable area where said communication satellite is capable of communicating with said main body, based on the position of said communication satellite which said communication satellite position detection means (29, 73, 128, 217, 324) has detected and the current position of said main body which said terminal position detection means (82, 125, 217, 305) has detected;

satellite communication means (3, 54, 103, 204, 306) for communicating with said communication satellite;

ground communication means (142, 204, 307) for performing communications via a ground radio base station; and communication control means (131, 221, 328) for controlling said ground communication means (142, 204, 307) to stop communications and controlling said satellite communication means (3, 54, 103, 204, 306) to start communications, when said determination means (29, 73, 128, 220, 324) determines that said communication satellite is in said communicable area, and for controlling said satellite communication means (3, 54, 103, 204, 306) to stop communications and controlling said ground communication means (142, 204, 307) to start communications, when said determination means (29, 73, 128, 220, 324) determines that said communication satellite is not in said communicable area.

A communication control method according to the eighth aspect of the present invention comprises the steps of:

a communication satellite position detecting step (S2) of detecting a position of a communication satellite which is a position relative to the earth and which is changing;

a terminal position detecting step (S4) of detecting a current position of a communication terminal apparatus;

a determining step (S4) of determining whether said communication satellite has arrived a communicable area where said communication satellite is capable of communicating with said communication terminal apparatus, based on the position of said communication satellite which has been detected by said communication satellite position detecting step (S2) and the current position of said communication terminal apparatus which has been detected by said terminal position detecting step (S4); and a communication controlling step of stopping communications performed via a ground radio station and starting communications with said communication satellite when it is detected in said determination step (S4) that said communication satellite is in said communicable area, and stopping communications with said communication satellite and starting communications via said ground radio base station when it is detected in said determination step (S4) that said communication satellite is not in said communicable area.

DETAILED DESCRIPTION OF THE PREFERRED EMBODIMENTS

Embodiments of the present invention will be hereinafter explained with reference to the accompanying drawings.

A portable communication terminal apparatus according to the first embodiment of the present invention will now be described with reference to FIGS. 1 to 7.

The portable communication terminal apparatus according to the first embodiment is formed as a portable mobile communication terminal apparatus having the satellite communication function of communicating directly with a communication satellite such as a low earth orbit (LEO) non-geostationary satellite by radio.

The portable communication terminal apparatus serving as a "mobile station" is connected to another mobile station via a communication unit (including a relay or a switchboard), mounted in a communication satellite serving as a "space station", and through a radio communication line. The mobile station is connected to a public network telephone connected to an "earth station" and is further connected to a mobile station in another area, via the space station and the earth station which is a ground-based satellite line switchboard or gateway apparatus.

Figure 1:
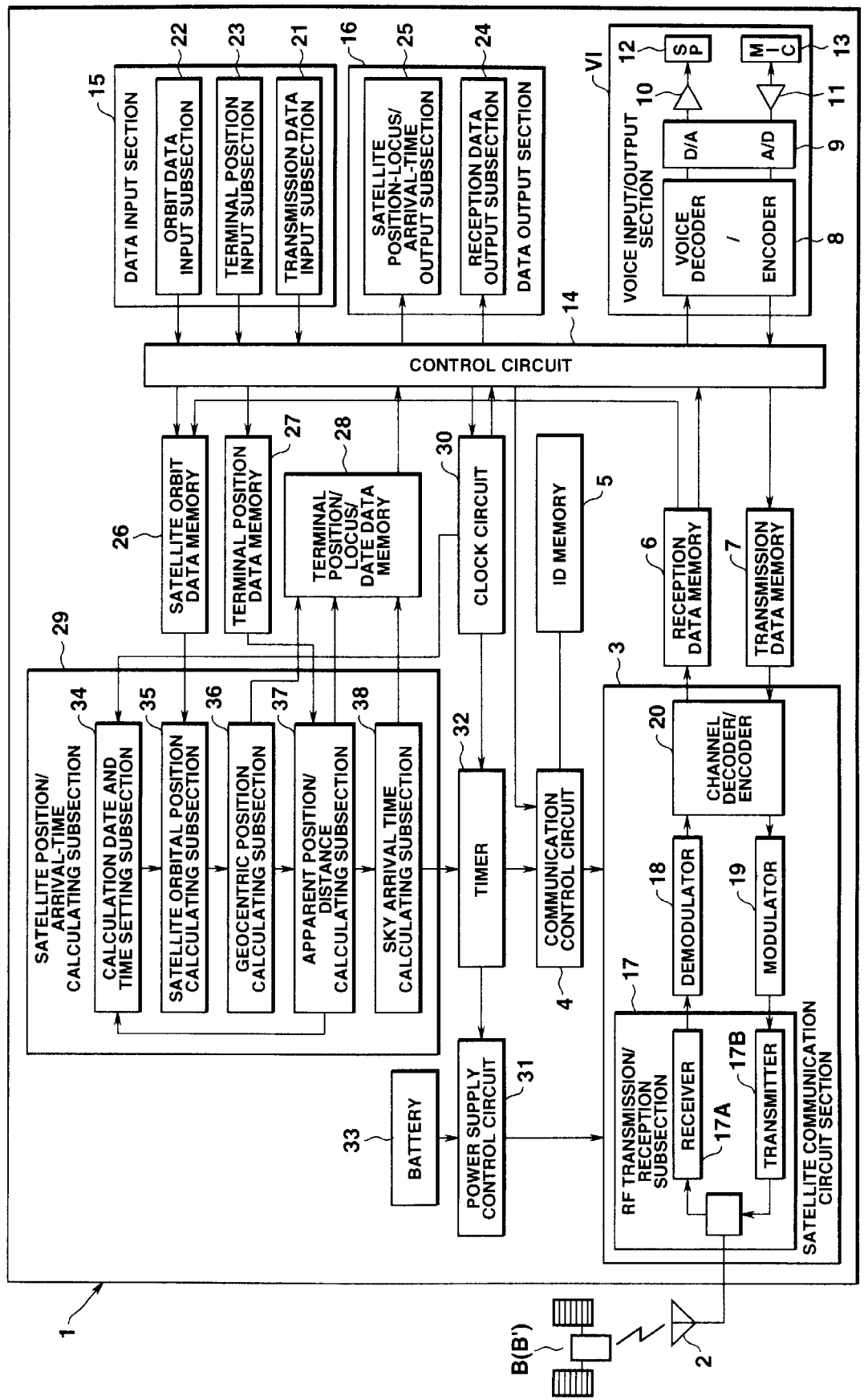
FIG. 1 is a block diagram which schematically shows the structure of a portable communication terminal apparatus according to the first embodiment of the present invention.

FIG. 1 schematically shows the basic circuit structure of the portable communication terminal apparatus according to the first embodiment of the present invention.

The portable communication terminal apparatus 1 illustrated in FIG. 1 include a communication antenna section 2, a satellite communication circuit section 3, a communication control circuit 4, an ID memory 5, a reception data memory 6, a transmission data memory 7, a voice input/output section VI, a control circuit 14, a data input section 15 and data output section 16.

The communication antenna section 2 or the satellite communication circuit section 3 sends and receives communication data by radio to and from a communication unit mounted in a communication satellite B (B') such as a non-geostationary satellite. The satellite communication circuit section 3 includes an RF transmission/reception subsection 17, a demodulation circuit 18, a modulation circuit 19 and a channel decoder/encoder 20. The RF transmission/reception subsection 17 includes a receiver 17A and a transmitter 17B.

The communication control circuit 4 controls the data communication with the communication satellite which the satellite communication circuit section 3 performs. The ID memory 5 stores an ID (Identifier) for identifying the communication terminal apparatus.

The reception data memory 6 stores reception data which the satellite communication circuit section 3 has received from the communication satellite. The transmission data memory 7 stores transmission data which is transmitted to the communication satellite through the communication circuit section 3.

The voice input/output section VI includes a voice decoder/encoder 8, a D/A or A/D conversion circuit 9, amplifiers 10 and 11, a speaker 12, a microphone 13. In the case where the reception data received from the communication satellite is voice data, the voice decoder/encoder 8 decodes the voice data, and the D/A or A/D conversion circuit 9 converts the resultant data to an analog voice signal. The analog voice signal as converted is sent to the amplifier 10, and the speaker 12 reproduces a voice from the analog video signal sent from the amplifier 10. The D/A or A/D conversion circuit 9 receives a voice signal from a microphone 13 through the amplifier 11, and converts the received voice signal to a digital voice signal. The voice decoder/encoder 8 codes the digital voice signal as transmission data, and supplies the transmission data to the communication circuit section 3.

The control circuit 14 makes the transmission data memory 7 store data other than voices, such as characters, numerals, codes and image data, all being input from the data input section 15. The control circuit 14 supplies, to the data output section 15, data other than voices, i.e., characters, numeral codes and image data received from the communication satellite. The data input section 15 includes a transmission data input subsection 21, an orbit data input subsection 22 and a terminal position input subsection 23. The data output section 16 includes a reception data output subsection 24 and a satellite position-locus/arrival-time output subsection 25.

The portable communication terminal apparatus 1 further includes a satellite orbit data memory 26, a terminal position data memory 27, a satellite position/locus/date and time data memory 28, a satellite position/arrival-time calculating section 29, a clock circuit 30, a power supply control circuit 31, a timer 32 and a battery 33.

The satellite orbit data memory 26 stores orbit data input from the data input subsection 22 in the data input section 15 and used to calculate the communication satellite's position in the orbit. The orbit data is data such as the orbital elements of the non-geostationary communication satellite which is to communicate with the portable communication terminal apparatus 1.

The terminal position data memory 27 stores position information of the portable communication terminal apparatus 1, such as a latitude, a longitude, the name of a place and the name of an area. The terminal position input subsection 23 may have a receiver which receives position measurement information for determining the position of the portable communication terminal apparatus 1, such as a latitude, longitude, the name of a place and the name of an area.

The satellite position/arrival-time calculating section 29 calculates, from the orbit data of the communication satellite and the position information of the communication terminal apparatus, the position (the geocentric position, the apparent position, the distance) of the communication satellite and the arrival date and time at which the communication satellite is to arrive a communicable area where the communication satellite can communicate with the communication terminal apparatus. The satellite position/arrival-time calculating section 29 includes a calculation date and time setting subsection 34, a satellite orbital position calculating subsection 35, a geocentric position calculating subsection 36, an apparent position/distance calculating subsection 37 and a sky arrival time calculating subsection 38.

The calculation date and time setting subsection 34 sets the date and time of the calculation of the communication satellite's position in the orbit. The satellite orbital position calculating subsection 35 and the geocentric position calculating subsection 36 calculate respectively the communication satellite's position in the orbit and the geocentric position of the communication satellite at the date and time set by the calculation date and time setting subsection 34. Based on the geocentric position of the communication satellite and the position of the communication terminal apparatus, the apparent position/distance calculating subsection 37 calculates the apparent position of the communication satellite with respect to the communication terminal apparatus and the distance between the communication satellite and the communication terminal apparatus.

The sky arrival time calculating subsection 38 discriminates whether the communication terminal apparatus can communicate with the communication satellite, and more specifically, whether the communication satellite in the sky is located above the communication terminal apparatus, whether the elevation angle of the communication satellite is such an angle that the communication terminal apparatus can communicate with the communication satellite, or whether the distance between the communication satellite and the communication terminal apparatus is in such a range that the communication terminal apparatus can communicate with the communication satellite. By performing those calculations, the satellite position/arrival-time calculating section 29 can not only calculate the position of the communication satellite relative to the earth at a given date and time and the position of the communication satellite relative to the communication terminal apparatus at a given date and time, but also can discriminate whether the communication terminal apparatus can communicate with the communication satellite. If the satellite position/arrival-time calculating section 29 performs the calculations every one minute, for example, while changing the date and time set by the calculation time and date setting subsection 34, on the basis of the current time information obtained from the time circuit 30, the satellite position/arrival-time calculating section 29 can calculate after how many minutes from the current time the communication satellite will arrive the communicable area where it can communicate with the communication terminal apparatus. The satellite position/arrival-time calculating section 29 can also calculate after how many minutes from the calculated time the communication satellite will go outside the aforementioned communicable area.

The satellite position/locus/date and time data memory 28 stores the satellite position, locus and arrival date and time, which are calculated by the sky arrival time calculating subsection 38.

The power supply control circuit 31 turns on and off the supply of power to the communication circuit section from the battery 33.

The timer 32 controls the power supply control circuit 31 in accordance with the satellite arrival date and time information obtained by the satellite position/arrival-time calculating section 29. More specifically, the timer 32 controls the power supply control circuit 31 to supply power to the satellite communication circuit section 3 when it has become the arrival time the communication satellite arrives the communicable area where the communication satellite can communicate with the communication terminal apparatus. When it has become the leaving time the communication satellite goes outside the above-mentioned communicable area, the timer 32 controls the power supply control circuit 31 to stop the supply of power to the satellite communication circuit section 3.

Figure 2:
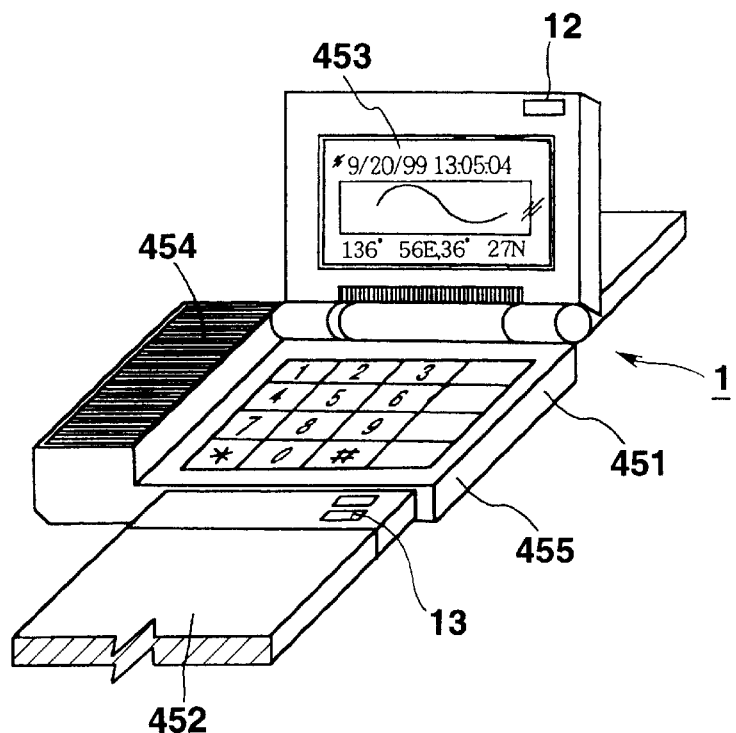
FIG. 2 is a schematic diagram for explaining the appearance of the portable communication terminal apparatus.
Figure 3:
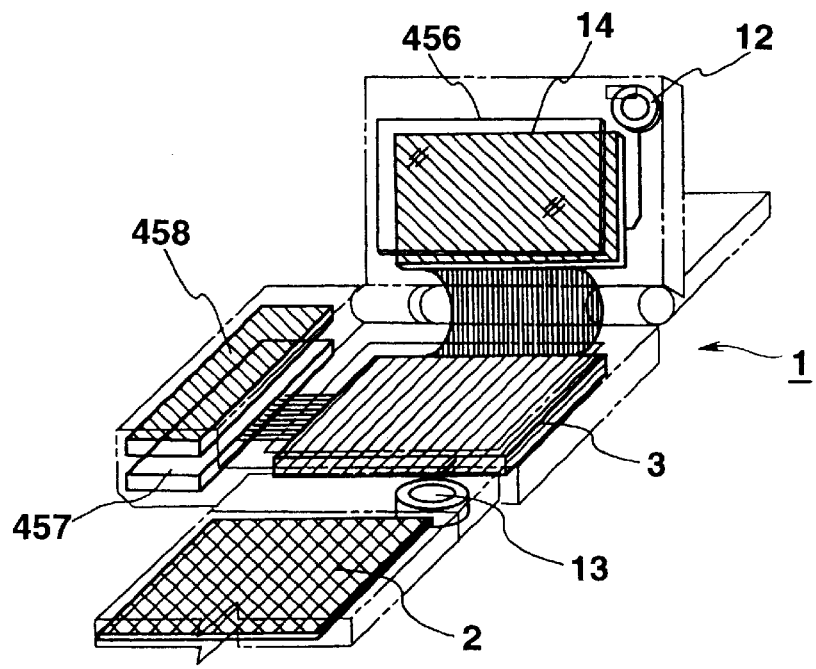
FIG. 3 is a schematic diagram for explaining the arrangement of parts mounted in the portable communication terminal apparatus.

FIG. 2 shows the appearance of the portable communication terminal apparatus 1 illustrated in FIG. 1. FIG. 3 shows the arrangement of parts mounted in the portable communication terminal apparatus illustrated in FIG. 1. FIGS. 2 and 3 exemplify the case where the portable communication terminal apparatus 1 is formed as one of a watch type.

The portable communication terminal apparatus 1 shown in FIGS. 2 and 3 has a watch case 451, a wrist band section 452, a display/output section 453 and a terminal position input section 454.

The watch case 451 contains the satellite communication circuit section 3. An operation/input section 455 having numeric keys, etc. is arranged on the upper surface of the watch case 451. The microphone 31 and the antenna section 2 for communicating with the satellite are incorporated in the wrist band section 452.

The display/output section 453 serves also as a lid to cover the upper surface of the watch case 451, and is opened and closed by pivoting the display/output section 453 on its one peripheral portion. The display/output section 453 has an LCD (liquid crystal display) panel 456 and displays time, communication data, the setting of communications, etc. For example, the display/output section 453 displays the current time, the arrival time and leaving time of the communication satellite. The display/output section 453 further displays, in the form of a plot, the communication satellite's position in the orbit and the geocentric position, apparent position and locus of the communication satellite, and displays in characters where the communication satellite and the communication terminal apparatus are located, etc. The display/output section 453 contains the control circuit 14 and the speaker 12.

The terminal position input section 454 is arranged on a side peripheral portion of the watch case 451, and contains a position measurement receiver 457 and a position measurement antenna 458.

Figure 4:
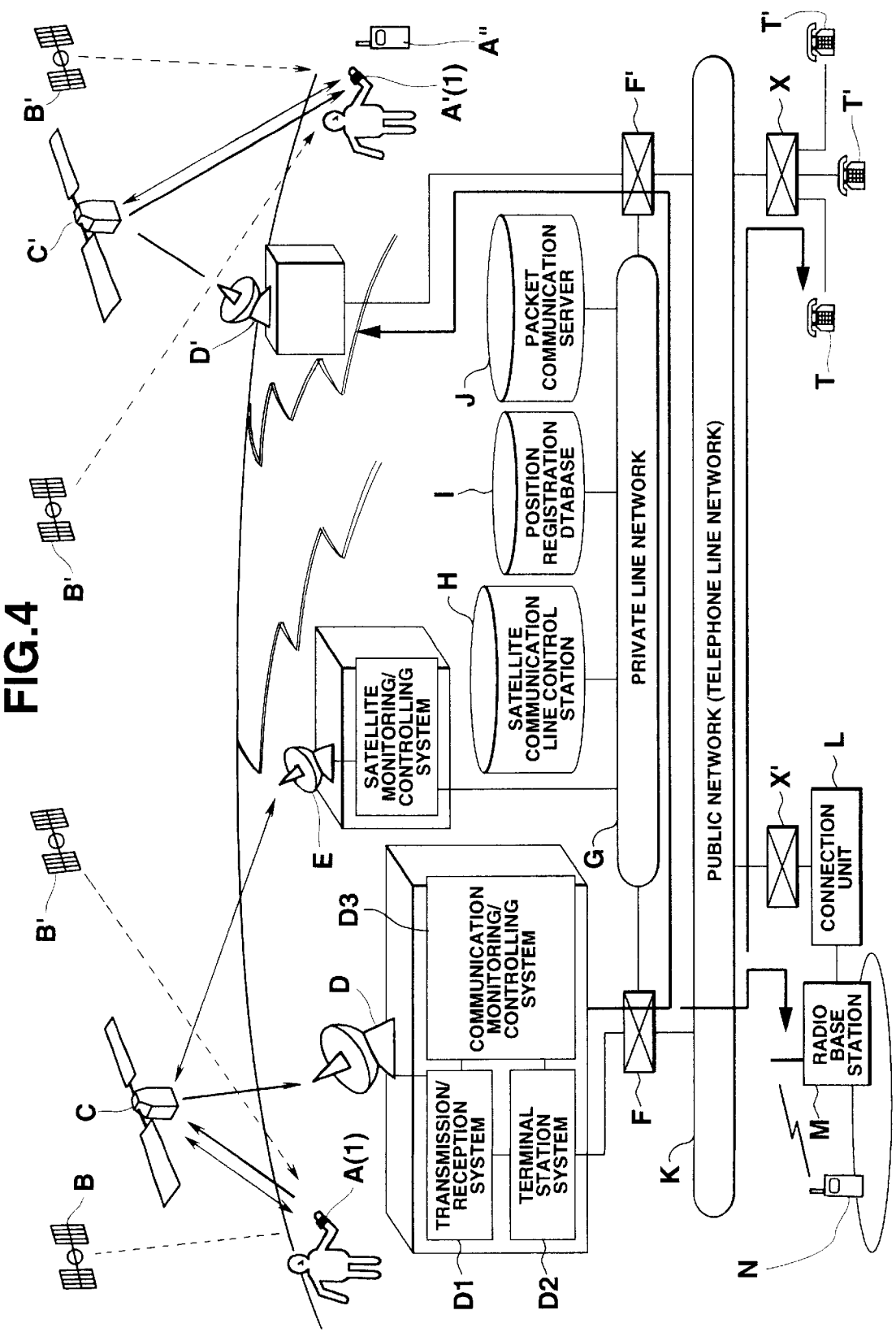
FIG. 4 is a schematic diagram for explaining a communication line system which is realized by the portable communication terminal apparatus.

FIG. 4 schematically shows the structure of a communication network system using the portable communication terminal apparatus 1.

As shown in FIG. 4, a portable communication terminal apparatus A and A' (the portable communication terminal apparatus 1) receive position measurement signals from position measurement satellites B and B' such as GPS satellites or the like, and measure and set the positions in which the portable communication terminal apparatuses A and A' are present. Users may set the aforementioned positions by directly inputting them to the portable communication terminal apparatuses A and A'.

The portable communication terminal apparatuses A and A' send and receive communication data and control data to and from communication satellites or space stations C and C'. The space stations C and C' send and receive communication data and control data to and from earth stations D and D' or another satellite communication terminal apparatus A". A satellite control station E controls the space stations C and C'.

The space stations D and D' are connected to a private line network G and a public network (telephone line network) K via satellite line relay switchboards F and F'. The private line network G is connected to the satellite control station E, a satellite communication line control station H, a position registration database I and a packet communication server J. The public network K is connected to subscribers' telephones T and T' via a switchboard X. Further, the public network K is connected to a radio base station M via a switchboard X' and a connection unit L. The radio base station M is connected to a communication terminal N like a cellular telephone or one according to the PHS (Personal Handy-phone System) or the like.

Figure 5:
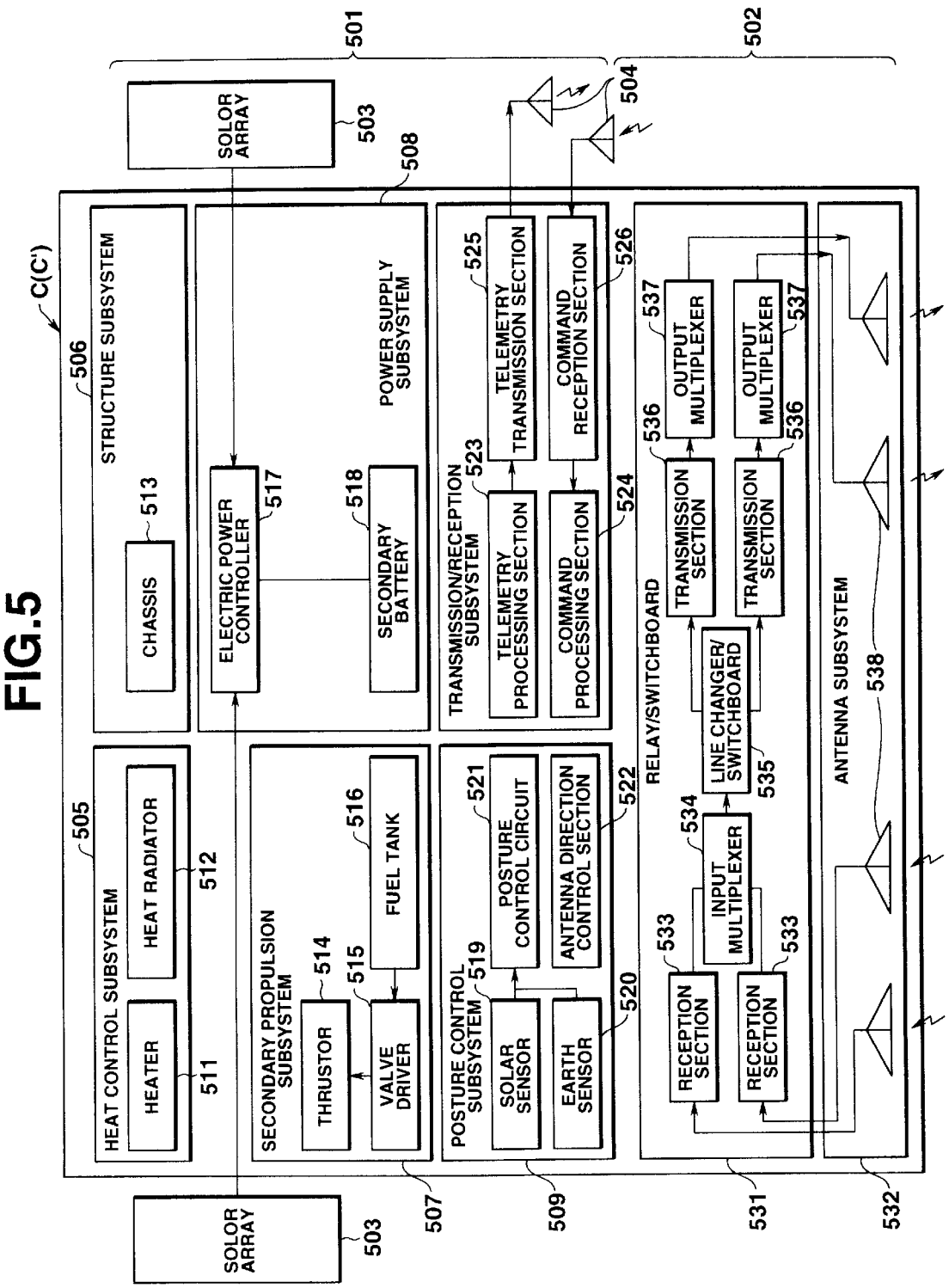
FIG. 5 is a schematic block diagram for explaining the structure of a space station.

FIG. 5 exemplifies the specific structure of the space station C (C').

The space station includes a common system 501 and a communication system 502.

The common system 501 includes solar arrays 503, transmission/reception antennas 504, a heat control subsystem 505, a structure subsystem 506, a secondary propulsion subsystem 507, a power supply subsystem 508, a posture control subsystem 509 and a transmission/reception subsystem 510.

The solar arrays 503 are the power sources of the communication satellite, and have solar batteries and/or the like. The transmission/reception antennas 504 are those for the transmission/reception subsystem 510. The heat control subsystem 505 has a heat radiator 511 and a heater 512. The structure subsystem 506 substantially consists of a chassis 513. The secondary propulsion subsystem 507 has a thrustor 514, a valve driver 515 and a fuel tank 516.

The power supply subsystem 508 has an electric power controller 517 and a secondary battery 518. The electric power controller 517 is connected to the solar arrays 503 and the secondary battery 518, and when needed, the electric power controller 517 accumulates, in the secondary battery 518, the electric power generated by the solar arrays 503.

The posture control subsystem 509 has a solar sensor 519, an earth sensor 520, a posture control circuit 521 and an antenna direction control section 522. The transmission/reception subsystem 510 includes a telemetry processing section 523, a command processing section 524, a telemetry transmission section 524 and a command reception section 526. The transmission antennas 504 are connected one to each of the telemetry transmission section 525 and command reception section 526.

The communication system 502 has a relay/switchboard 531 and an antenna subsystem 532.

The relay/switchboard 531 includes reception sections 533, an input multiplexer 534, a line changer/switchboard 535, transmission sections 536 and output multiplexers 537. The number of reception sections 533, the number of transmission sections 536 and the number of output multiplexers 537 accord with the number of lines as handled. The antenna subsystem 532 includes antennas 538 which are connected one to each of the reception sections 533 and output multiplexers 537.

Figure 6:
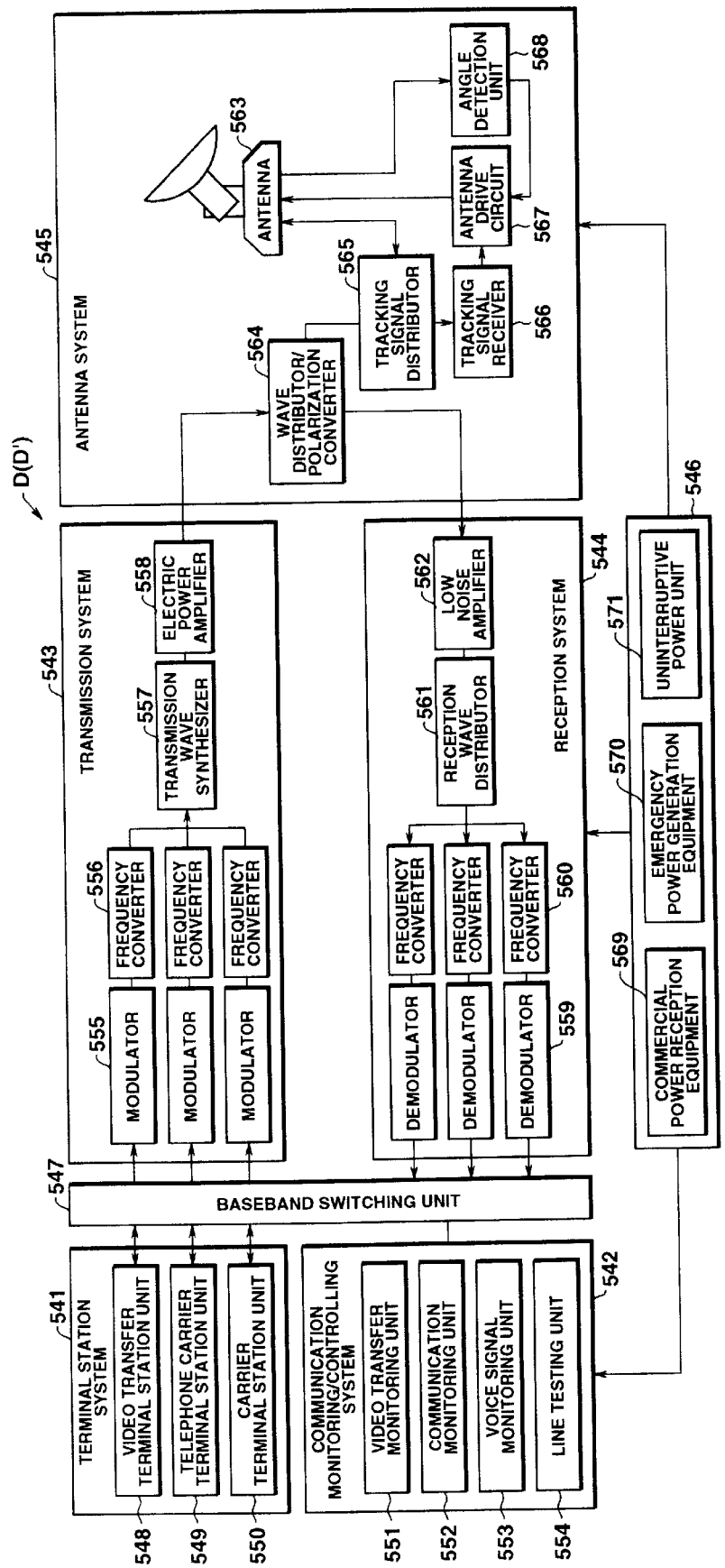
FIG. 6 is a schematic block diagram for explaining the structure of a space station.

FIG. 6 shows an example of the structure of the specific system of the earth station D (D').

The earth station D (D') has a terminal station system 541, a communication monitoring/controlling system 542, a transmission system 543, a reception system 544, an antenna system 545, a power supply system 546 and a baseband switching unit 547.

The terminal station system 541 includes a video transfer terminal station unit 548, a telephone carrier terminal station unit 549 and a carrier terminal station unit 550.

The communication monitoring/controlling system 542 includes a video transfer monitoring unit 551, a communication monitoring unit 552, a video signal monitoring unit 553 and a line testing unit 554.

The transmission system 543 includes modulators 555, frequency converters 556, a transmission wave synthesizer 557 and an electric power amplifier 558. The transmission wave synthesizer 557 combines the transmission waves sent from the modulators 555 and the frequency converters 556, and supplies them to the electric power amplifier 558.

The reception system 544 includes demodulators 559, frequency converters 560, a reception wave distributor 561 and a low noise amplifier 562. The reception wave distributor 561 distributes the reception waves amplified by the low noise amplifier 562 to the demodulators 559 and the frequency converters 560.

The antenna system 545 includes an antenna 563, a distributor (polarization converter) 564, a tracking signal distributor 565, a tracking signal receiver 566, an antenna drive circuit 567 and an angle detection unit 568. The power supply system 546 includes commercial power reception equipment 569, emergency power generation equipment 570 and an uninterruptive power unit 571.

Figure 7:
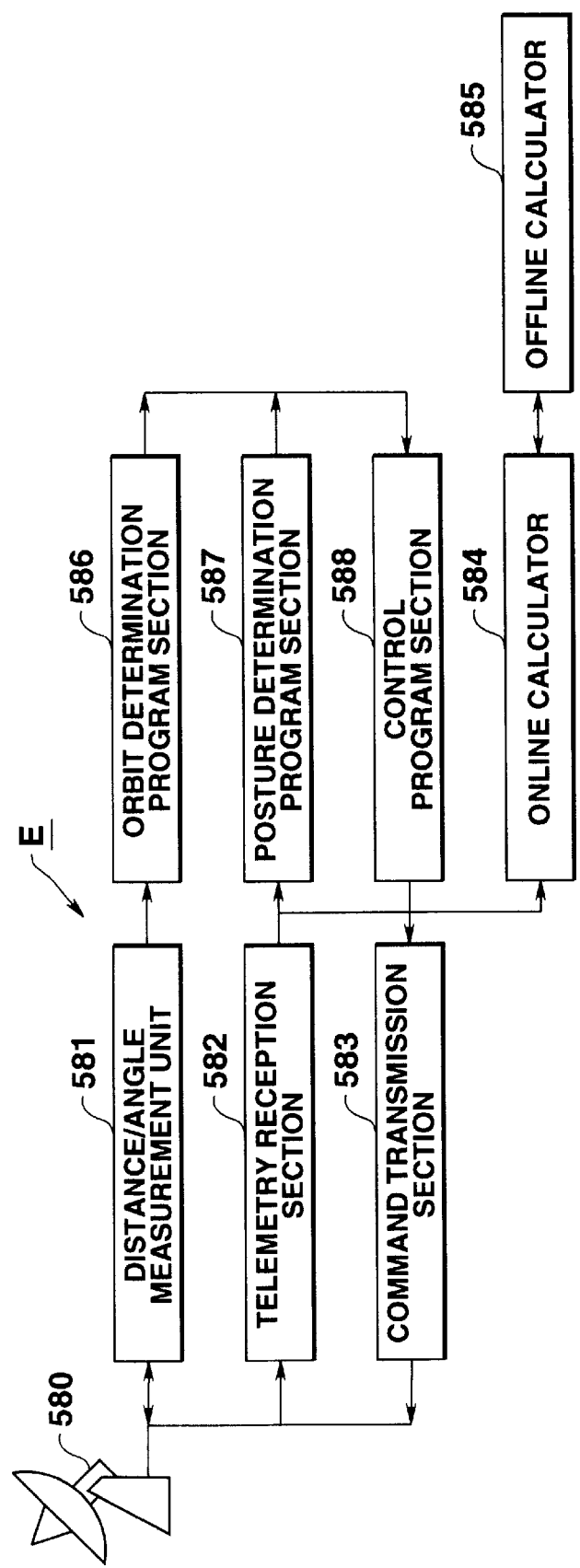
FIG. 7 is a schematic block diagram for explaining the structure of a satellite control station.

FIG. 7 shows the structure of the specific system of the satellite control station E.

The satellite control station E has an antenna 580, a distance/angle measurement unit 581, a telemetry reception section 582, a command transmission section 583, an online calculator 584, an offline calculator 585, an orbit determination program section 586, a posture determination program section 587 and a control program section 588. The orbit determination program section 586, the posture determination program section 587 and the control program section 588 are executed by the offline calculator 584.

A method for calculating the orbit of a non-geostationary communication satellite and a method for calculating a height "h" and an azimuth "Az", both methods being employed in the portable communication terminal apparatus 1 illustrated in FIG. 1, will now be schematically described.

First of all, the orbit calculating method will be explained.

[1] Orbital Elements

The celestial bodies in the solar system, like planets, asteroids and comets, are moving in elliptical orbits around the sun in accordance with what is called "Kepler's lows of motion." The orbits need to be learned in order to calculate where in the orbits such celestial bodies are located at a given time or in what directions they can be seen from a given point on the earth. The "orbital elements" indicate the forms of the celestial bodies and their motions. If the orbital elements are given, the positions of the celestial bodies can be calculated.

Figure 8:
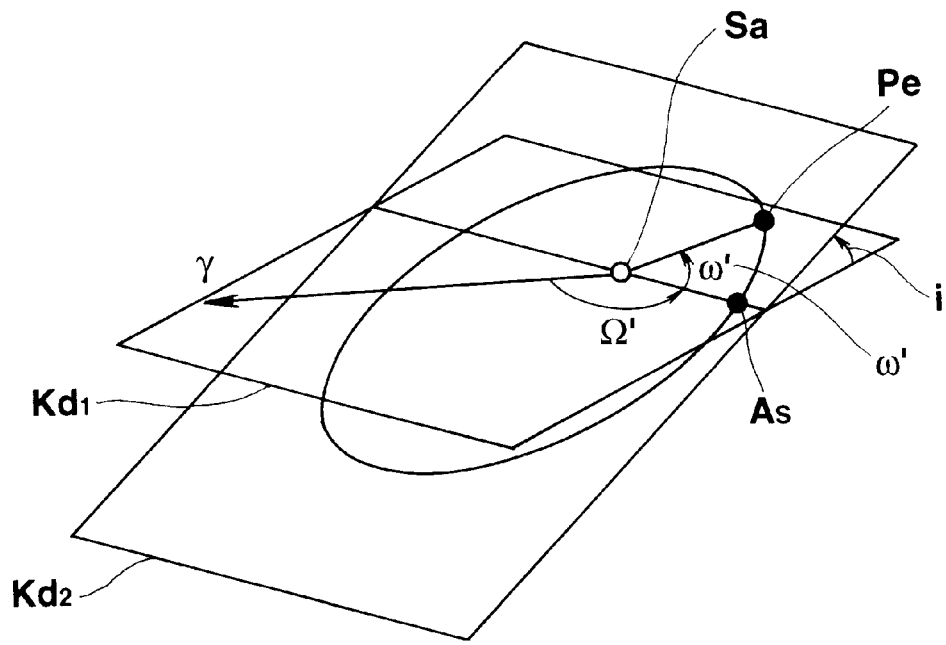
FIG. 8 is a schematic diagram for explaining the orbital elements of a planet.

In the case of a planet, the form of the orbit and the motion of the planet can be represented by shown in FIG. 8 by using the nine orbital elements shown in Table 1, i.e., the argument "$\omega'$" of perigee, the longitude "$\Omega'$" of the ascending node, the inclination "i", the eccentricity "e", a mean anomaly "$M_0$" the semi-major axis "a", the perigee distance "q", the mean motion "n" and the revolution period "P". The perigee distance q, the mean motion n and the revolution period P shown in Table 1 can be obtained from the other six orbital elements of the argument $\omega'$ of perigee, the longitude $\Omega'$ of the ascending node, the inclination i, the eccentricity e, the mean anomaly $M_0$ and the semi-major axis a. Substantially, those six orbital element determines the motion of the planet.

TABLE 1

Orbital Elements of Planet

| | Symbol | Orbital Element | Unit |
|---|---|---|---|
| 1 | $\omega'$ | Argument of perigee | degree(s) [deg] |
| 2 | $\Omega'$ | Longitude of ascending node | degree(s) [deg] |
| 3 | i | Inclination | degree(s) [deg] |
| 4 | e | Eccentricity | radian [rad] |
| 5 | $M_0$ | Mean anomaly | degree(s) [deg] |
| 6 | a | Semi-major axis | kilometer(s) [km] |
| 7 | q | Perigee distance | kilometer(s) [km] |
| 8 | n | Mean motion | degree(s) [deg] |
| 9 | P | Revolution period | second(s) [sec] |

The celestial longitude of perihelion ($\omega$–=$\Omega'$+$\omega'$) may be used in place of the argument $\omega'$ of perigee.

[2] Satellite Optical Elements

In the satellite orbit, an orbital plane "Kd2", which should be constant in to the Kepler's lows of motion, varies with time due to the earth being swollen at its equator. In the case of the satellite orbit, the equatorial longitude $\Omega$ of the ascending node varies sequentially, while the inclination i is substantially uniform. In consideration of this, the orbital elements are determined using an equatorial plane "sk" of the earth in place of an ecliptic plane "Kd1" of the orbit of a planet. Furthermore, in the case of the satellite orbit, equatorial coordinates such as a right ascension or the like are employed as an orbital element in place of ecliptic coordinates such as a celestial longitude or the like. Since the communication satellite moves in an elliptical orbit around the earth, a perigee "Pt" is adopted as an orbital element in place of a perihelion "Pe".

Figure 9:
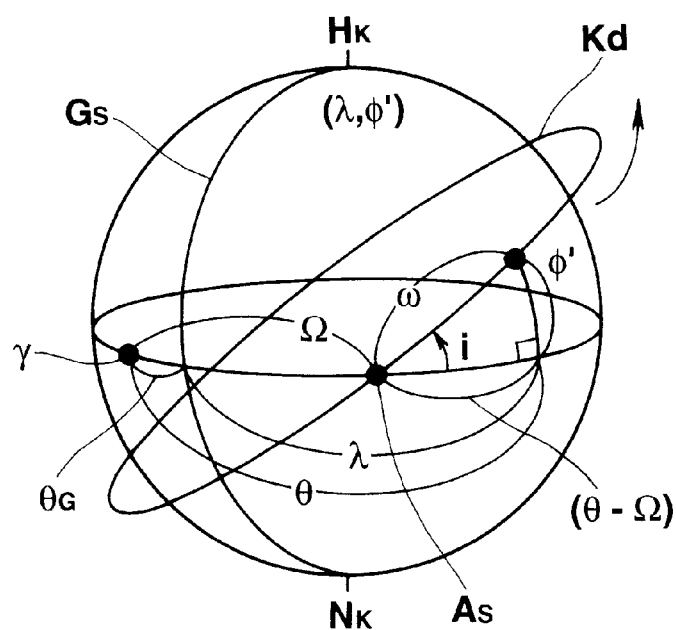
FIG. 9 is a schematic diagram for explaining the orbit of a communication satellite.

In the case of the communication satellite, as well as in the case of a planet, an orbit such as that illustrated in FIG. 9 is represented using six orbital elements, i.e., the equatorial longitude $\Omega$ of the ascending node and the inclination i, both determining the orbital plane, the argument $\omega$ of perigee which determines the direction to the perigee in the orbital plane, the semi-major axis a indicating the magnitude of the orbit, the eccentricity e indicating the form of the orbit, and either the perigee passage time T indicating the position of the communication satellite or the mean anomaly $M_0$ at a reference time. Thus, the satellite orbit is represented using the six orbital elements of $\omega$, $\Omega$, i, e, a and either $M_0$ and T.

However, unlike in the case of the celestial bodies referred to in the Kepler's laws of motion, the orbital plane of the communication satellite varies as mentioned previously, and the position of the perigee in the orbital plane also varies accordingly. In the case of the satellite orbit, variations occur in the equatorial longitude $\Omega$ of the ascending node, while the inclination i is substantially uniform. Furthermore, in the case of the satellite orbit, the mean motion n, which should be constant in the Kepler's laws of motion, also varies due to the upper atmosphere and the solar radiation pressure. Therefore, the satellite orbit needs to be calculated in consideration of variations in the mean anomaly $M_0$, the mean motion m, the equatorial longitude $\Omega$ of the ascending node and the argument $\omega$ of perigee, as shown by Equation 1.

$$M = M_0 + M_1 t + M_2 t^2$$

$$n = M_1 + 2M_2 t$$

$$\Omega = \Omega_0 + \Omega_1 t$$

$$\omega = \omega_0 + \omega_0 t \qquad \text{[Equation 1]}$$

(The equation "$\omega + M = \omega_0 + M_0 + (\omega_1 + M_1) t + M_2 t^2$" is attained in the case of e≈0.)

Thus, not the six elements of $\omega$, $\Omega$, i, e and $M_0$ or a, but the nine elements of $\omega_0$, $\omega_1$, $\Omega_0$, $\Omega_1$, i, e, $M_0$, $M_1$, $M_2$ and a reference time (epoch) are generally employed as the orbital elements of the communication satellite, as shown in Table 2.

TABLE 2

Orbital Elements of Communication Satellite

| Symbol | Orbital Element | Unit |
| --- | --- | --- |
| 1 $M_0$ | Mean anomaly at reference time | degree(s) [deg] |
| (1') T | Perigee passage time | day(s) |
| 2 $M_1$ | Mean anomaly determined by coefficient t | degree(s) [deg] |
| 3 $M_2$ | Mean anomaly determined by coefficient t | degree(s) [deg] |
| 4 $\omega_0$ | Argument of perigee at reference time | degree(s) [deg] |
| 5 $\omega_1$ | Variation (perturbation) in argument of perigee | degree(s)/day |
| 6 $\Omega_0$ | Equatorial longitude of ascending node at reference time | degree(s) [deg] |
| 7 $\Omega_1$ | Variation (perturbation) in equatorial longitude of ascending node | degree(s)/day |
| 8 i | Inclination | degree(s) [deg] |
| 9 e | Eccentricity | radian [rad] |
| 10 a | Semi-major axis | kilometer(s) [km] |
| 11 q | Perigee distance | kilometer(s) [km] |
| 12 n | Mean motion | degree(s) [deg] |
| 13 P | Revolution period | second(s) [sec] |

[3] How to Calculate Orbital Elements

When the perigee passage time T at which the communication satellite passes the perigee is the reference time (epoch) and when $\omega_0$, $\Omega_0$, $i_0$, $a_0$ and $e_0$ are used as the orbital elements $\omega$, $\Omega$, i, a and e at the time T, Equation 2 is derived using Equation 1 shown previously.

Perigee passage time: T

Argument perigee: $\omega = \omega_0 + \omega_1 (t-T)$

Ascending node: $\Omega = \Omega_0 + \Omega_1 (t-T)$

Inclination: $i = i_0$

Semi-major axis: $a = a_0$ [km]

Eccentricity: $e = e_0$ \qquad [Equation 2]

The earth is not perfectly spherical, but is elliptic in cross section. The earth has the oblateness $J_2$ given as:

$$J_2 = 0.00108263 (J_2 = (1082629 \pm 1) \times 10^{-9})$$

Variations occur in the orbit of the communication satellite due to the perturbation caused by the oblateness of the earth. The values $\omega 1$ and $\Omega 1$, which represent the extent of the perturbation, are expressed by Equation 3.

$$\omega_1 = (2/3)(J_2/p^2) n \{2 - (5/2) \sin^2(i)\}$$

$$\Omega_1 = (2/3)(J_2/p^2) n \cos(i) \qquad \text{[Equation 3]}$$

where "p" is the radius of curvature in the prime vertical, and is given as:

$$p = a'(1 - e^2)$$

where "a'" is obtained by dividing "a" by the equatorial radius (=6378.16 km), that is:

$$a' = a/6378.16$$

The resolution period P of the communication satellite can be obtained according to Newton's law of universal gravitation or Kepler's third law.

$$a^3/P^2 = GM(1 + m/M)/4\pi^2 \approx GM/4\pi^2 (M >> m)$$

The universal gravitation constant G is expressed by:

$$G = 6.67:3 \times 10^{-11} \ [m^3/kg.sec^2]$$

where "M" is the mass of the earth, and is represented by:

$$GM = 3.986005 \times 10^{14} \ [m^3/sec^2]$$

and where "m" is the mass of the communication satellite, but can be neglected since m is smaller than M. Hence, the revolution period P of the communication satellite can be calculated from Equation 4.

$$P = 0.0095198 \times (a)^{1.5} \ [\text{sec}] \qquad \text{[Equation 4]}$$

From this revolution period P of the communication satellite, Equation 5 can be derived:

$$n = 360° \times 24 \times 60 \div 60 P \ [\text{degrees/day}] \qquad \text{[Equation 5]}$$

The above revolution period P of the communication satellite is one which cannot be obtained by observations. Meanwhile, the apparent period (node period) "$P_n$"$_1$ which can be obtained by observations and which contains the perturbation owing to the geography of the earth can be expressed by Equation 6:

$$P_n \approx 360° \times 24 \times 60 \times 60/(n + \omega_1) \qquad \text{[Equation 6]}$$

When "e" is approximately 0 (e≈0), the values $\omega_1$ and $\Omega_1$ in Equation 3, both values representing the extent of the perturbation, are represented by Equation 7, based on Equations 4 and 5.

$$\omega_1 = 9.97° \times \{2 - 2.5 \sin 2(i_O)\} \div (a')^{3.5}$$

$$\Omega_1 = -9.97° \times \cos(i_O) \div (a')^{3.5}$$

$$a' = a/6378.16 \quad \text{[Equation 7]}$$

[4] How to Derive Orbit from Launching Conditions

In most cases, the communication satellite launching point is the perigee q in the satellite orbit, while its opposite point is the apogee Q. The inclination i is required to be larger than the latitude φ of the launching point ($|i| \geq |\phi|$) unless as the satellite orbit is adjusted.

As shown in FIG. 9, the satellite orbit is based on the equinox "γ" and the equator of the earth. That point on the equator which the communication satellite passes from the south to the north is known as the ascending node. The angle from the equinox γ up to the ascending node is the equatorial longitude of the ascending node, which is expressed by Ω. The angle defined between the orbital plane and the equatorial plane is the inclination i. The point which is closest to the center of the earth is the perigee q, and the distance between the perigee q and the center of the earth is the perigee distance q. The angle from the ascending node up to the perigee is the argument of perigee, and is expressed by ω.

The perigee can be derived from Equation 8 when the communication satellite launching time, the longitude and latitude of the launching point, the geocentric latitude, the launching height and the launching velocity are expressed by follows:

Communication satellite launching time: t
Longitude and latitude of launching point: (λ, φ)
Geocentric latitude: φ'
Launching height: h [km]
Launching velocity: V [km/sec]

Perigee passage time: T=t

Perigee distance: $q \approx h + 6378.16$ [Equation 8]

The velocity V of the motion of a celestial body, which is moving around the earth, is represented by Equation 9:

$$V = 631.35 \times \sqrt{\{(2/r) - (1/a)\}} \quad \text{[Equation 9]}$$

where "r" is the perigee distance [km], and "a" is the semi-major axis.

The launching point is located at a height of q [km] from the center of the earth, and is expressed by Equation 10.

$$1/a = (2/q) - (V/631.350)^2 \quad \text{[Equation 10]}$$

The eccentricity (e) of the communication satellite is shown by Equation 11.

$$e = 1 - q/a \quad \text{[Equation 11]}$$

Figure 10:
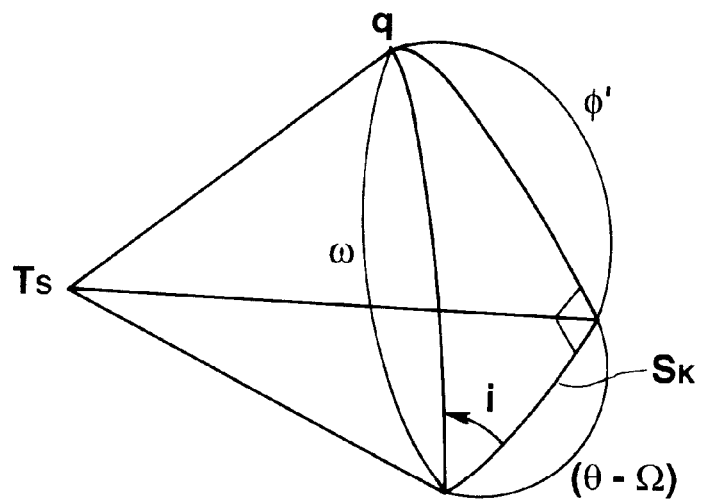
FIG. 10 is a schematic diagram for explaining a spherical triangle in the vicinity of a communication satellite launching point.

A method for calculating the argument ω of the perigee, the equatorial longitude Ω of the ascending node and the inclination i will now be described. First, let it be assumed that "i" becomes clear at the time of launching. Let it be assumed that the satellite orbit is nearly circular. In this case, the orbit and the equator are large geocentric circles, and the meridian, when extended, forms also a large geocentric circle. Hence, using the spherical triangle illustrated in FIG. 10, the argument ω of the perigee and the equatorial latitude Ω of the ascending node are expressed by Equations 12, 13 and 14 in accordance with the spherical trigonometry.

$$\sin \omega = \sin \phi'/\sin i \quad \text{[Equation 12]}$$

$$\sin(\theta - \Omega) = \sin \omega \cos i/\cos \phi' \quad \text{[Equation 13]}$$

$$\cos(\theta - \Omega) = \cos \omega/\cos \phi' \quad \text{[Equation 14]}$$

where θ represents the sidereal time at the launching time.

The argument ω of the perigee and the equatorial longitude Ω of the ascending node, both being shown in Equations 13 and 14, can be represented by follows:

$$\omega = \sin^{-1}(\sin \phi'/\sin i)$$

$$\tan(\theta - \Omega) = \sin \omega \cos i/\cos \omega$$

$$(\theta - \Omega) = \tan^{-1}(\sin \omega \cos i/\cos \omega) \quad \text{[Equation 15]}$$

If (θ−Ω) in Equation 15 is given, the equatorial longitude Ω of the ascending node can be expressed by Equation 16:

$$\Omega = \lambda + \theta_G - (\theta - \Omega) \quad \text{[Equation 16]}$$

where is the longitude of the launching point, and $\theta_G$ is the Greenwich sidereal time.

[5] How to Calculate Communication Satellite Passage Point

Figure 11:
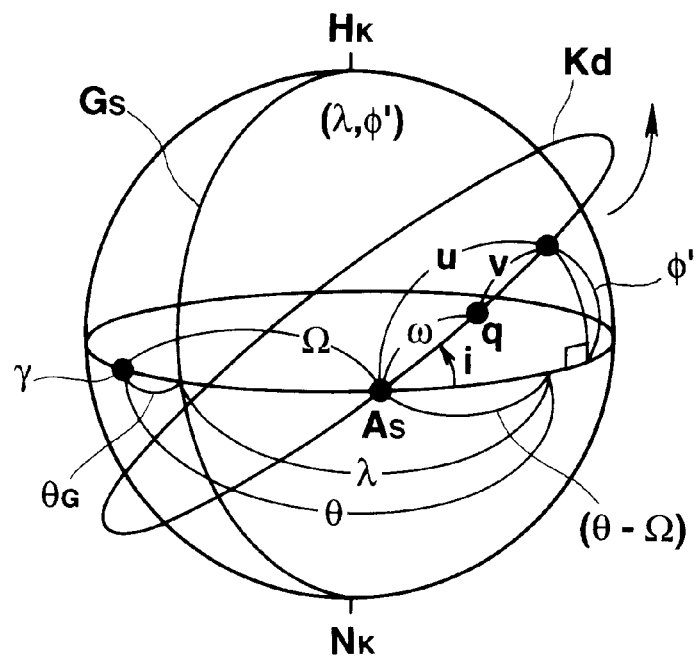
FIG. 11 is a schematic diagram for explaining a communication satellite passage point.

The communication satellite passage point (refer to FIG. 11) which the communication satellite passes at a given time $t_1$ can be obtained as the longitude and the latitude (λ, φ), using the orbital elements shown in Items [3] and [4] put forth previously.

Similarly the time at which the communication satellite arrives a given point (λ, φ) can be obtained using the orbital elements shown in Items [3] and [4].

(1) First the orbital elements of the communication satellite at the time $t_1$ are derived from Equations 2 and 3.

Figure 12:
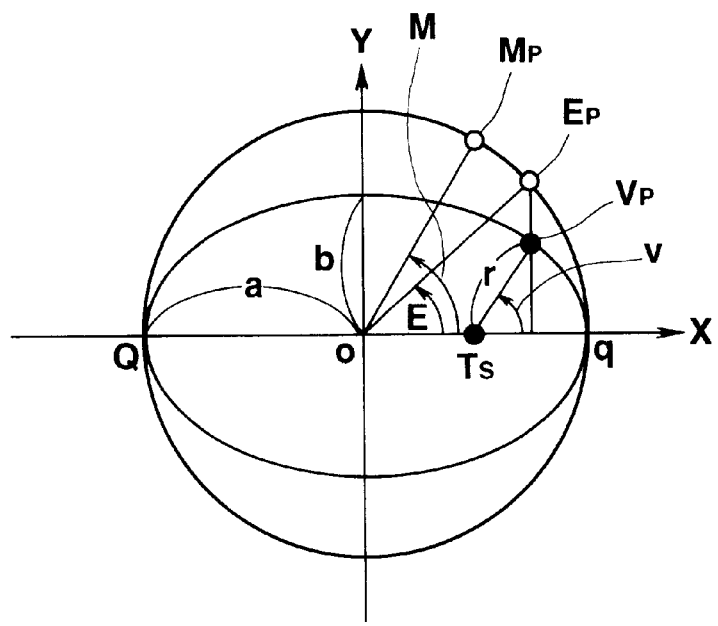
FIG. 12 is a schematic diagram for explaining the elliptic motion of the communication satellite and an anomaly which is an orbital element.

(2) Next the mean anomaly M at the time $t_1$ is derived from Equation 17 in order to obtain the true anomaly shown in FIG. 12 and which is the angle defined between an imaginary line connecting the perigee and the center of the earth and an imaginary line connecting the actual position of the communication satellite and the center of the earth.

$$M = n(t_1 - T) \quad \text{[Equation 17]}$$

(3) Then the eccentric anomaly E is derived from Equation 18 in accordance with Kepler's equation of motion.

$$M = E - e \cdot \sin E \quad \text{[Equation 18]}$$

However, Kepler's equation shown as Equation 18 cannot be solved as is. In general, therefore, the solution is obtained according to the asymptotic system shown in following item (A) or (B) by repeating the same procedure until the convergence of the approximate value of E.

$$M \quad \text{(A)}$$
$E_0$ : initial value
$\downarrow$
$E_1 = M + e \cdot \sin E_0$
$E_2 = M + e \cdot \sin E_1$
$E_3 = M + e \cdot \sin E_2$
...

$$M \quad \text{(B)}$$
$E_1$ : initial value
$\downarrow$
$M_1 = E_1 - e \cdot \sin E_1$
$\Delta E_1 = (M - M_1)/(1 - e \cdot \cos E_1)$
$E_2 = E_1 + \Delta E_1$
$M_2 = E_2 - e \cdot \sin E_2$
$\Delta E_2 = (M - M_2)/(1 - e \cdot \cos E_2)$
$E_3 = E_2 + \Delta E_2$
...

(4) Equation 19 is derived from the elliptic motion and the anomaly which are shown in FIG. 12:

$$r \cdot \cos v = a (\cos E - e)$$

$$r \cdot \sin v = b \cdot \sin E \quad \text{[Equation 19]}$$

Hence, Equation 20 is attained.

$$v = \tan^{-1}\{b \cdot \sin E / a (\cos E - e)\} \quad \text{[Equation 20]}$$

Further, Equation 21 is also attained.

$$r = \sqrt{\{a^2 (\cos E - e)^2 + b^2 \cdot \sin^2 E\}}$$

or $$r = a(1 - e \cdot \cos E) \quad \text{[Equation 21]}$$

(5) Consequently, the angular distance u from the equatorial longitude $\Omega$ of the ascending node up to the communication satellite passage point is expressed by Equation 22:

$$u = \omega_0 + \omega_1(t_1 - T) + v = \omega + v \quad \text{[Equation 22]}$$

(6) Next the argument $\omega$ of the perigee and the equatorial longitude $\Omega$ of the ascending node, which are shown by Equations 12 and 14, are expressed by Equation 23.

$$v_1 = \cos \phi' \cdot \cos (\theta - \Omega) = \cos u$$

$$v_2 = \cos \phi' \cdot \sin (\theta - \Omega) = \sin u \cdot \cos i$$

$$v_3 = \sin \phi' = \sin u \cdot \sin i \quad \text{[Equation 23]}$$

The argument $\omega$ of the perigee and the equatorial longitude $\Omega$ of the ascending node, which are shown by Equations 23, are expressed by Equation 24

$$\phi' = \sin^{-1} (\sin u \cdot \sin i)$$

$$\sin (\theta - \Omega) = \sin u \cdot \cos i / \cos \phi'$$

$$\cos (\theta - \Omega) = \cos u / \cos \phi' \quad \text{[Equation 24]}$$

The argument $\omega$ of the perigee and the equatorial longitude $\Omega$ of the ascending node, which are shown by Equation 24, are represented by Equation 25.

$$(\theta - \Omega) = \tan^{-1}\{\sin(\theta - \Omega)/\cos(\theta - \Omega)\} \quad \text{[Equation 25]}$$

$$= \tan^{-1}(\sin u \cdot \cos i / \cos u)$$

The geocentric latitude $\phi'$ of the communication satellite passage point, which has been obtained in the above-described manner, is represented by Equation 24. The angle (difference in longitude) $(\theta - \Omega)$ from the ascending point on the equator up to the passage point is expressed by Equation 25.

$$\lambda = (\theta - \Omega) + \Omega - \theta_G \quad \text{[Equation 26]}$$

The calculation of the altitude and azimuth of the communication satellite will now be described.

Figure 13:
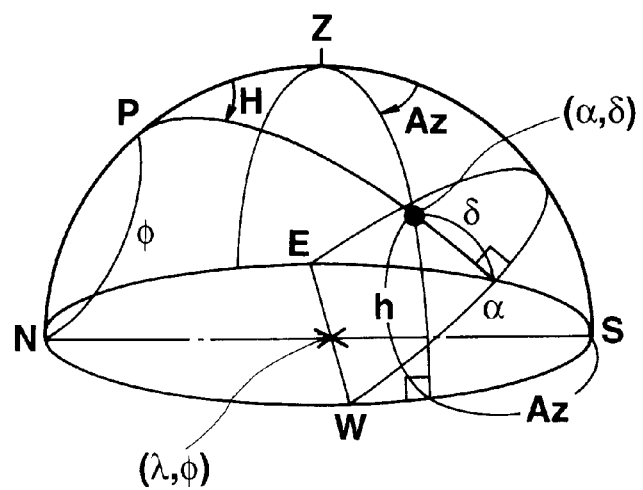
FIG. 13 is a schematic diagram for explaining the hour angle, altitude and azimuth of a celestial body.

[1] How to Obtain Altitude and Azimuth From Position of Celestial Body and Position of Observation In general, the apparent altitude "h" and azimuth "Az" of a given celestial body with reference to such an observation point (longitude $\lambda$, latitude $\phi$) on the ground as that in FIG. 13 is expressed based on the local hour angle "H" of the celestial body. The local hour angle H is as shown in Equation 27.

$$H = \theta - \alpha = (\theta_G + \lambda) - \alpha \quad \text{[Equation 27]}$$

where $\theta$ is the local sidereal time, $\theta_G$ is the Greenwich sidereal time, $\alpha$ is the right ascension, and $\lambda$ is the longitude of the observation point.

The local sidereal time $\theta$ is expressed by Equation 28.

$$\theta[\text{degrees}] = 360° \times \text{frac}.[0.671262 + 1.002737909 \times (MJD - 40000) + \lambda/360°] \quad \text{[Equation 28]}$$

where MJD stands for the semi-Julian Day (=Julian Day– 2400000.5), while frac. represents the decimal part of the result of the calculation of the formula described in [ ].

The altitude h and azimuth Az serving as horizontal coordinates, the hour angle H of the celestial body which is calculated from Equation 27, the declination $\delta$ of the celestial body, and the latitude $\phi$ of the observation point have the relationship shown by Equation 29.

$$\cos h \cdot \cos Az = -\cos \phi \cdot \sin \delta + \sin \phi \cdot \cos \delta \cdot \cos H$$

$$-\cos h \cdot \sin Az = -\cos \phi \cdot \sin H$$

$$\sin h = \sin \phi \cdot \sin \delta + \cos \phi \cdot \cos \delta \cdot \cos H \quad \text{[Equation 29]}$$

Using Equation 29, the altitude h is expressed by Equation 30

$$h = \sin^{-1} (\sin \phi \cdot \sin \delta + \cos \phi \cdot \cos \delta \cdot H) \quad \text{[Equation 30]}$$

The azimuth Az is expressed by Equation 31, and is further expressed by Equation 32:

$$\sin A_z = \cos \phi \cdot \sin H / \cos h$$

$$\cos A_z = (-\cos \phi \cdot \sin \delta + \sin \phi \cdot \cos \delta \cdot \cos H)/\cos h \quad \text{[Equation 31]}$$

$$A_z = \tan^{-1}(\sin A_z / \cos A_z) \quad \text{[Equation 32]}$$

$$= \tan^{-1}\{\cos \delta \cdot \sin H / (-\cos \phi \cdot \sin \delta + \sin \phi \cdot \cos \delta \cdot \cos H)\}$$

Figure 14:
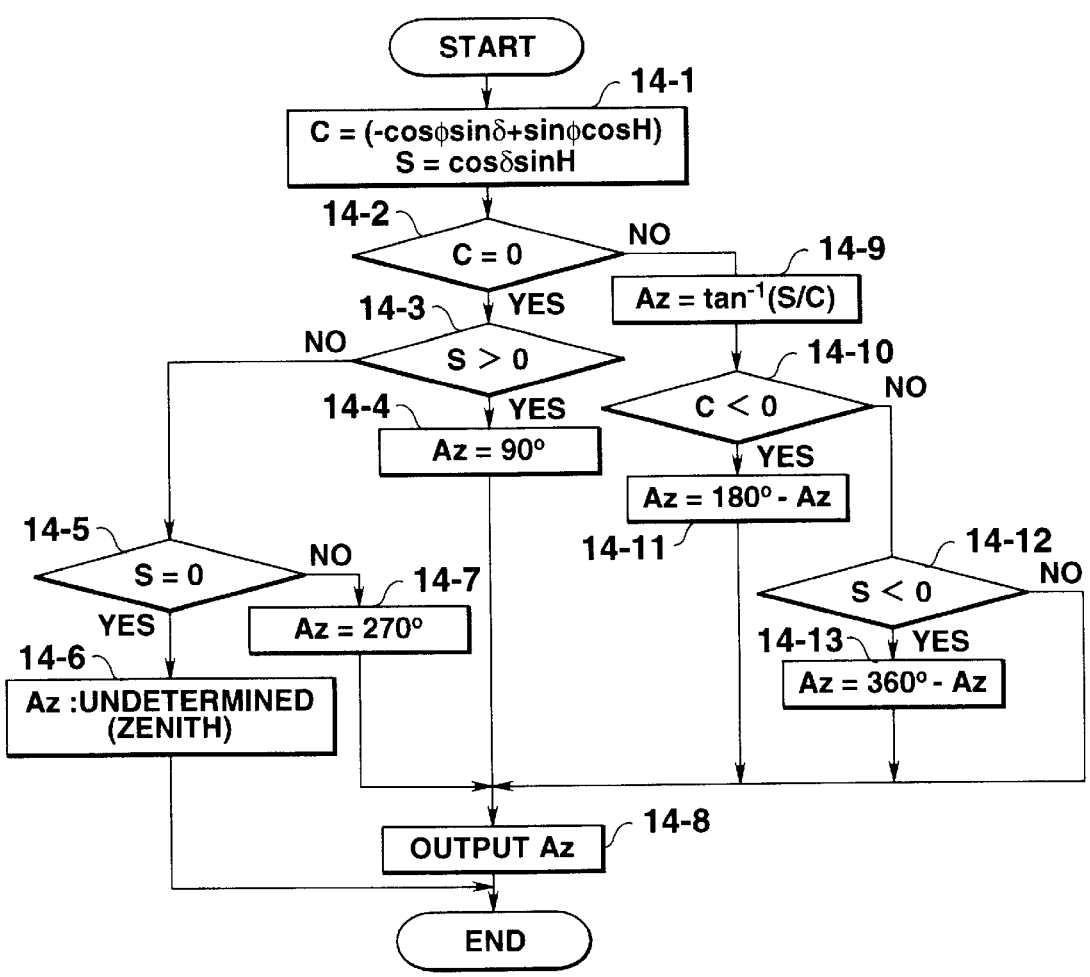
FIG. 14 is a flowchart showing a process for determining the quadrant of the azimuth.

As shown in the flowchart of FIG. 14, the quadrant of the azimuth $A_z = \tan^{-1} (\sin A_z/\cos A_z)$ is obtained by a 360° system in accordance with whether sin Az and cos Az is positive or negative.

[2] Altitude and Azimuth of Geostationary Satellite (Simple Method of Obtaining Altitude and Azimuth)

A geostationary communication satellite seems to remain in a fixed position when viewed from an observation point on the earth, since the period of revolution of the geostationary communication satellite is the same as the period of rotation of the earth. Such a geostationary communication satellite is made to travel in a circular orbit which is located above the equator of the earth at a height of approximately 36000 km so that the period of the satellite's revolution is the same as that of the earth's rotation.

Figure 15:
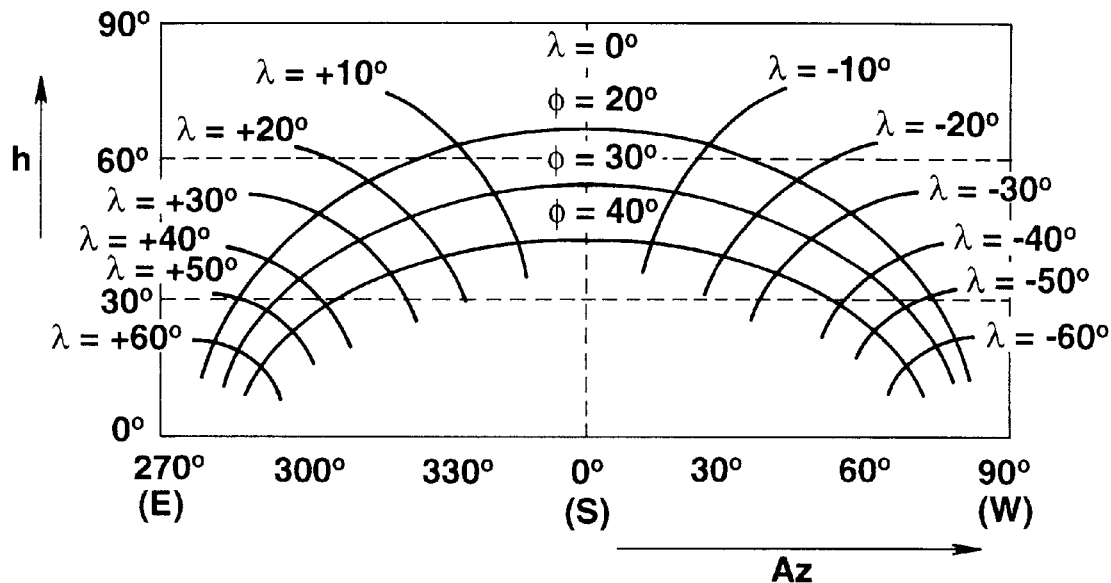
FIG. 15 is a schematic diagram for briefly explaining the relationship between the altitude and azimuth of a geostationary satellite.

Unlike in the case of a non-geostationary satellite, the position of the geostationary satellite can be easily obtained from the table shown in FIG. 15 without the need to obtain the orbital elements and detailed position of the satellite, if the longitude $\lambda_{SAT}$ and latitude $\phi_{SAT}$ (=0) of the position in which the satellite is stationary with respect to the earth are given.

[3] Altitude and Azimuth of Geostationary Satellite (Calculation Method)

Figure 16:
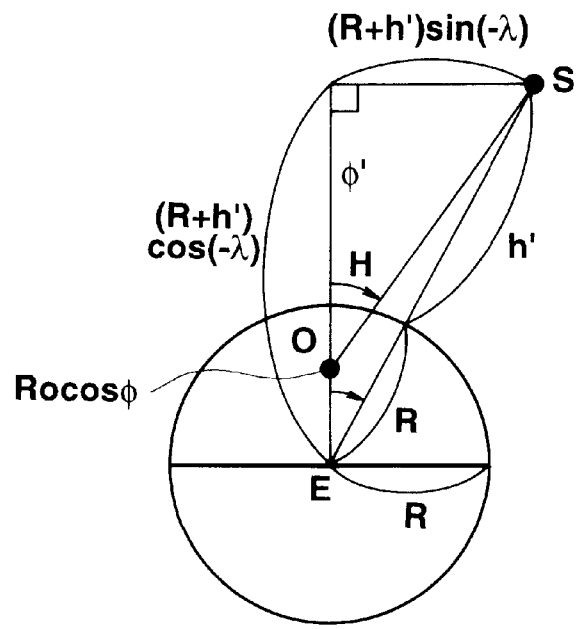
FIG. 16 is a schematic diagram for explaining the hour angle of the geostationary satellite.
Figure 17:
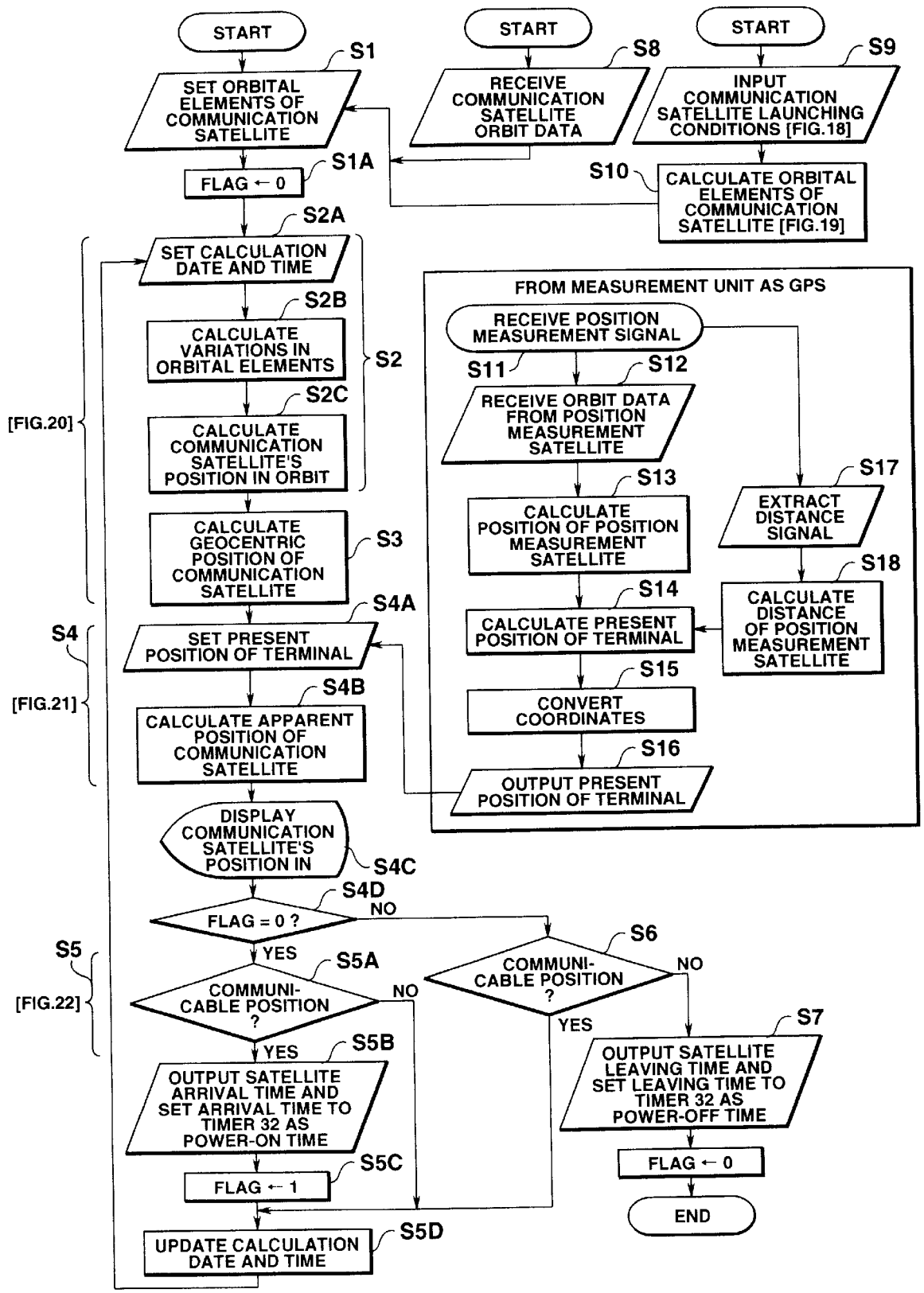
FIG. 17 is a flowchart for explaining the calculation of the position and arrival time of the communication satellite.

The altitude and azimuth of a geostationary satellite can be precisely calculated as shown below:

As shown in FIG. 16, the hour angle H is expressed by Equation 33, and is further expressed by Equation 34.

$$\tan H = \{(R+h') \sin (-\lambda)\}/\{(R+h') \cos (-\lambda) - R_0 \cos \phi\} \quad [\text{Equation 33}]$$

$$H = \tan^{-1} [-\sin \lambda / \{\cos \lambda - R_0 \cos \phi/(R+h')\}] \quad [\text{Equation 34}]$$

where R is the equatorial radius (6378 km), $R_0$ is the distance between the observation point and the center of the earth, and $\lambda$ is obtained by subtracting the longitude of the observation point from that ($\lambda_{SAT}$) of the position in which the satellite is stationary with respect to the earth.

Since the satellite is geostationary, the altitude h' is about 36000 [km], and $R_0$ is approximately 6371 [km] in case of Japan, under which conditions the hour angle H of the geostationary satellite is expressed by Equation 35.

$$H(\text{Geostationary}) \approx \tan^{-1} [-\sin \lambda / \{\cos \lambda - 0.15034 \times \cos \phi\}] \quad [\text{Equation 35}]$$

The declination δ is expressed by Equation 36, and is further expressed by Equation 37.

$$\sin \delta = (-R_0 \sin \phi)/\sqrt{\{R_0^2 + (R+h')^2 - 2R_0(R+h') \cos \phi \cos \lambda\}} \quad [\text{Equation 36}]$$

$$\delta(\text{Geostationary}) = \sin^{-1} [-6371 \cdot \sin \phi / \sqrt{\{1836484525 - 539980476/\cos \phi \cos \lambda\}}] \quad [\text{Equation 37}]$$

The altitude h and azimuth Az of the geostationary satellite can be obtained by inserting the hour angle H and the declination δ into Equations 30 and 32.

The right ascension α is shown as H=θ−α in Equation 27. Hence, using the hour angle H and the local sidereal time θ, the right ascension α of the geostationary satellite is expressed by Equation 38.

$$\alpha = \theta - H \quad [\text{Equation 38}]$$

The longitude $\lambda_{SAT}$ of the position in which the satellite is stationary with respect to the earth is approximately expressed by Equation 39, using the orbital elements explained previously.

$$\lambda_{SAT}(\text{Geostationary}) \approx \Omega + \omega + M - \theta_G \quad [\text{Equation 39}]$$

where Ω is the equatorial longitude of the ascending node, ω is the argument of perigee, M is the mean anomaly, and $\theta_G$ is the Greenwich sidereal time.

The calculation of the above-described satellite orbit and position can be realized by a microprocessor which includes a ROM (read-only memory) storing an instruction program showing the process of calculation, a RAM (random access memory) storing data, a CPU (central processing unit) which executes a variety of arithmetic operations in accordance with the instruction program, etc.

An example of a calculation program for realizing, with a microprocessor, the process of obtaining the position of a communication satellite with respect to the center of the earth and the apparent position of the communication satellite when viewed from the portable communication terminal apparatus (hereinafter referred to simply as the "terminal") and the distance between the communication satellite and the terminal, on the basis of the above-described general method of calculating the satellite orbit, will now be described with reference to the flowcharts shown in FIGS. 17 to 26.

In general, in the case of a celestial body like a planet in the solar system, the position of its orbit is obtained using six orbital elements, while in the case of a communication satellite whose orbital plane varies, the position of its orbit is obtained using nine orbital elements, as set forth previously.

More specifically, at least six orbital elements, i.e., the "equatorial longitude Ω of the ascending node" and the "inclination i", both determining the plane of the orbit of the communication satellite, the "argument ω of perigee" determining the direction to the perigee in the orbital plane, the "eccentricity e" indicating the form of the orbit, and the "perigee passage time T" (or the "mean anomaly $M_0$,") indicating the position of the communication satellite are necessary in order to calculate where in the orbit the communication satellite is located.

Unlike in the case of the orbit referred to in the Kepler's laws of motion, the orbit of the communication satellite cannot be precisely derived only from the above-described six orbital elements, because the perturbation due to the oblateness of the earth influences the orbit of the communication satellite, sequentially varying the plane of the orbit. Hence, the orbit of the communication satellite such as a non-geostationary satellite needs to be calculated also in consideration of, for example, variations (the influences of the perturbation) with time in the "mean anomaly M", the "equatorial longitude Ω of the ascending node" and the argument ω of perigee", that is:

$$M = M_0 + M_1 t + M_2 t^2$$

$$\Omega = \Omega_0 + \Omega_1 t$$

$$\omega = \omega_0 + \omega_1 t$$

In many cases, therefore, the orbit of the communication satellite is calculated using not the six orbital elements of "ω, Ω, i, e, $M_0$ and a", but the nine orbital elements of "$\omega_0$, $\omega_1$, $\Omega_0$, $\Omega_1$, i, e, $M_0$, $M_1$ and $M_2$" and the "reference time (epoch)".

The values $\omega_1$ and $\Omega_1$, which represent the extent of the perturbation due to the form of the earth, can be approximately calculated using the oblateness $J_2$ of the earth, that is:

$$J_2 = (1082629 \pm 1) \times 10^{-9}$$

An example of the process by which the microprocessor calculates the position of the communication satellite with respect to the center of the earth, the position of the communication satellite when viewed from the terminal and the distance between the communication satellite and the terminal, will now be briefly described.

First the microprocessor determines the orbital elements $\omega_0$, $\omega_1$, $\Omega_0$, $\Omega_1$, i, e, $M_0$, $M_1$ and $M_2$. Further, based on the above orbital elements $\omega_0$, $\omega_1$, $\Omega_0$, $\Omega_1$, i, e, $M_0$, $M_1$ and $M_2$, the microprocessor calculates the other orbital elements, that is, the "perigee distance q", the mean motion n", the "revolution period P", the "node period $P_n$", etc. (step S1).

Figure 18:
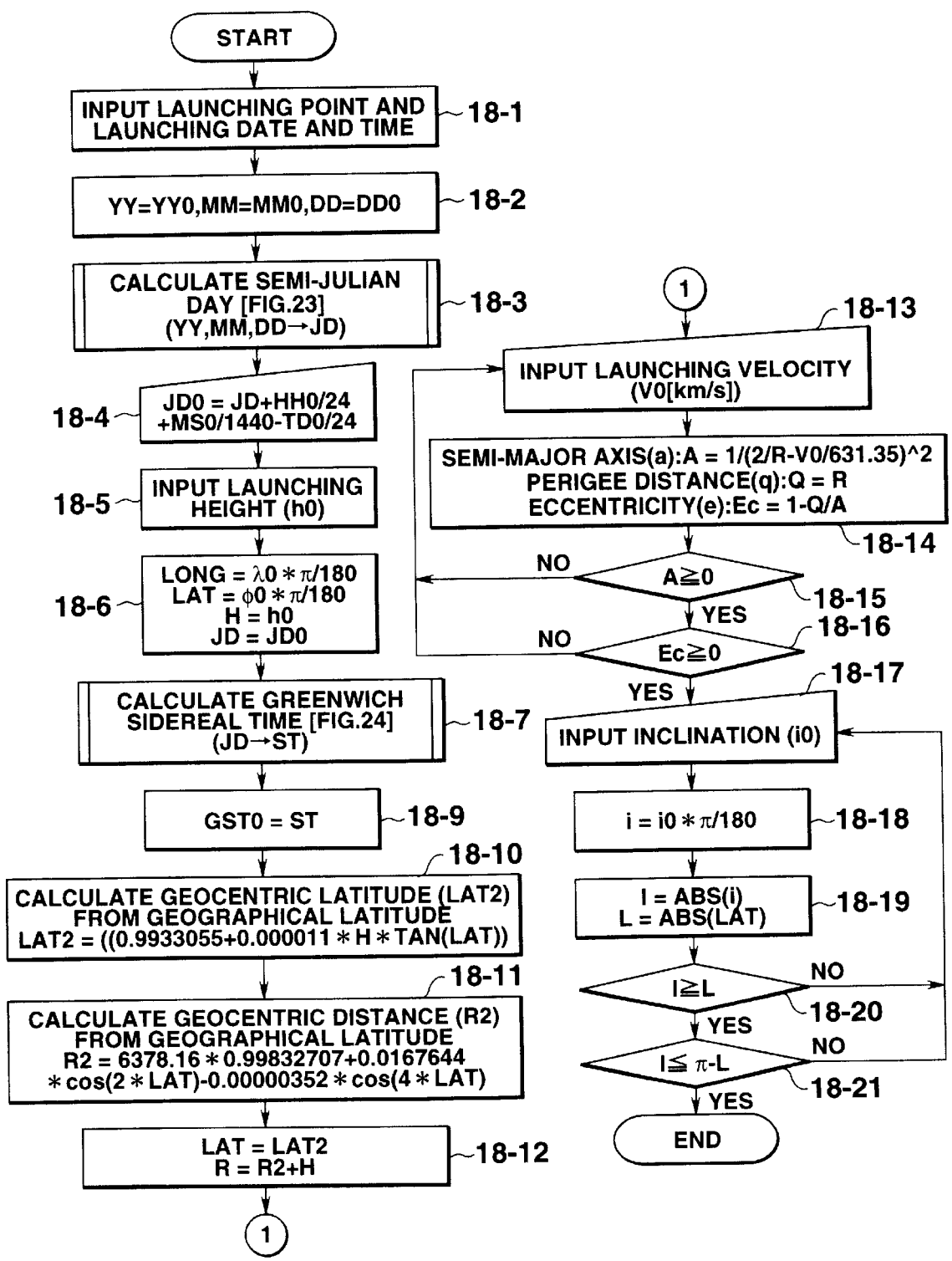
FIG. 18 is a flowchart for explaining the input of communication satellite launching conditions.
Figure 19:
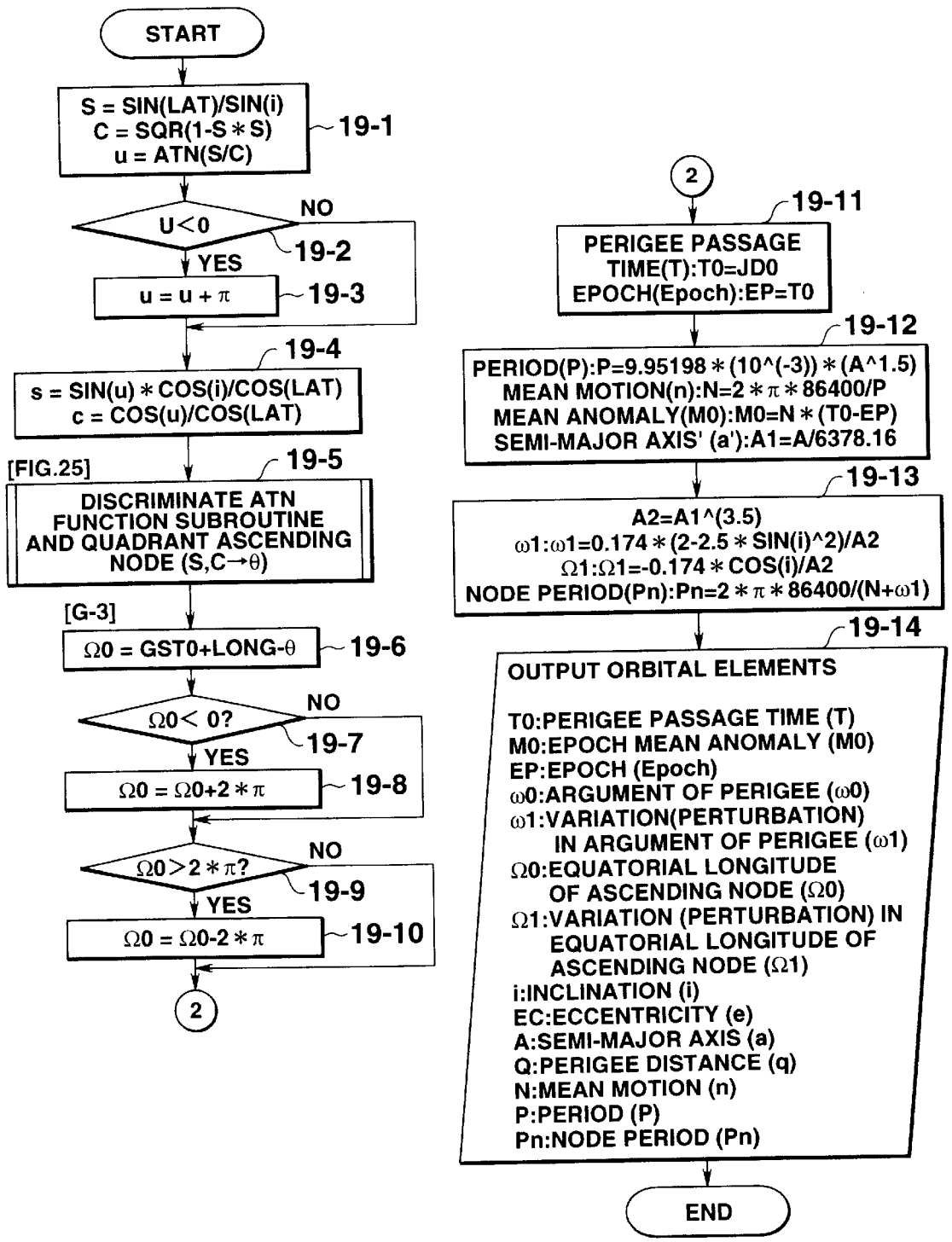
FIG. 19 is a flowchart for explaining how to calculate the orbital elements of the communication satellite from the launching conditions.
Figure 27:
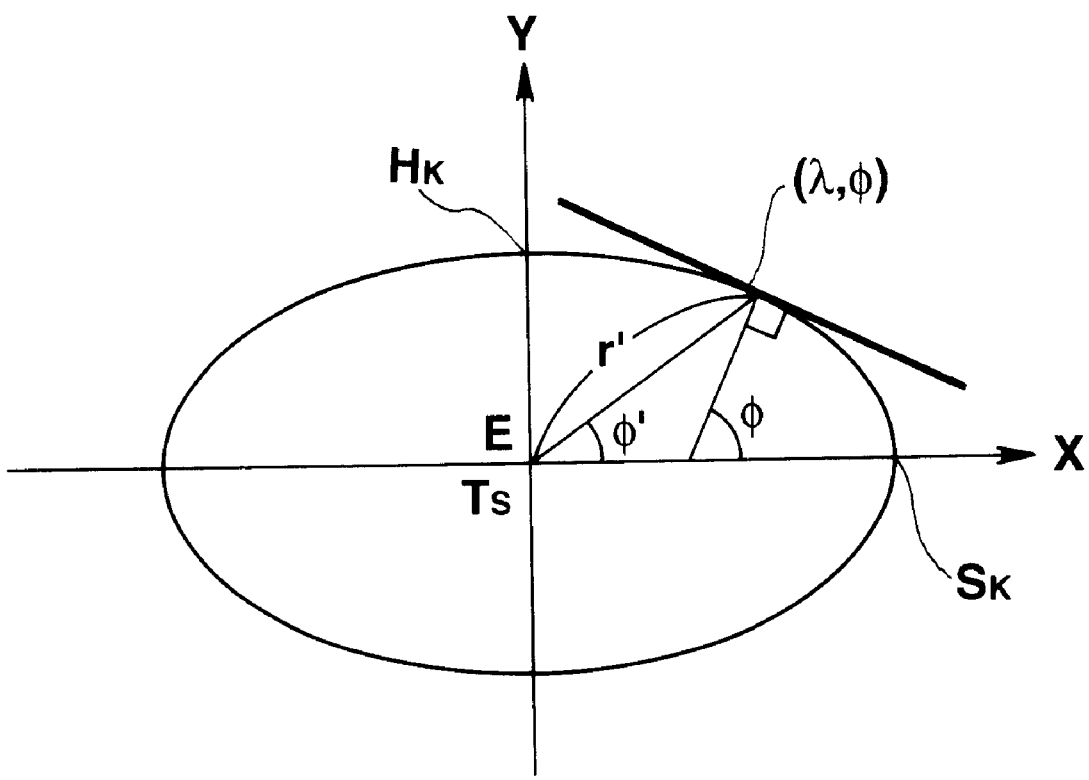
FIG. 27 is a schematic diagram showing the relationship between a geographical latitude and a geocentric latitude.

An operator may input the orbital elements at the time of calculation, or a memory may prestore the orbital elements. Alternatively, the orbital elements may be obtained from orbit data received from the communication satellite, or may be calculated from the communication satellite launching conditions, etc., as shown in FIGS. 18 and 19. In FIG. 18, the geographical latitude $\phi$ is converted into the geocentric latitude $\phi'$. The relationship between the geographical latitude $\phi$ and the geocentric latitude $\phi'$ is shown in FIG. 27.

Next the microprocessor sets the calculation date and time, and calculates variations with time in the individual orbital elements, on the basis of the difference $(t-T_0)$ between the calculation date and time and the epoch, thereby obtaining the communication satellite's position in the orbit (step S2).

The microprocessor converts the calculation date and time into, for example, the semi-Julian Day, calculates the difference $(t-T_0)$ between the calculation date and time and the epoch, and calculates M, $\omega$ and $\Omega$ as shown in Equation 40.

$$M = M_0 + n \times (t-T_0)$$

$$\omega = \omega_0 + \omega_1 \times (t-T_0)$$

$$\Omega = \Omega_0 + \Omega_1 \times (t-T_0) \quad \text{[Equation 40]}$$

Using the "mean anomaly M", the microprocessor solves the Kepler's equation of motion $$M = E - e \sin(E)$$

in accordance with the asymptotic system, thereby obtaining the eccentric anomaly E, and calculates the "true anomaly v" and the "geocentric distance $r_{SAT}$ of the satellite" as shown in Equation 41.

$$r_{SAT} \cos(v) = a \cdot (\cos(E) - e)$$

$$r_{SAT} \sin(v) = b \cdot \sin(E) \quad \text{[Equation 41]}$$

The "true anomaly v" and the "geocentric distance $r_{SAT}$" shown in Equation 41 are given as Equation 42:

$$v = \tan^{-1}\{b \cdot \sin(E)/(a \cdot (\cos(E)-e))\}$$

$$r_{SAT} = \sqrt{\{a^2 \cdot (\cos(E)-e)^2 + b^2 \cdot \sin^2(E)\}} \quad \text{[Equation 42]}$$

The "angular distance u from the ascending node up to the satellite passage point" is given as Equation 43.

$$u = \omega_0 + \omega_1(t-T_0) + v = \omega + v \quad \text{[Equation 43]}$$

Next the microprocessor calculates the geocentric position of the satellite on the basis of the satellite's position in the orbit.

Using Equation 44, the microprocessor obtains the "geocentric latitude $\psi_{SAT}$ of the satellite passage point" or the "declination $\delta$ of the satellite" from the "angular distance u from the ascending node up to the satellite passage point" and the "inclination i", for example.

$$\psi_{SAT} = \sin^{-1}(\sin(u) \cdot \sin(i)) \quad \text{[Equation 44]}$$

Moreover, the microprocessor calculates the "angle from the ascending node on the equator up to the passage point", i.e., the "difference in longitude $(\theta-\Omega)$". Then, using Equation 45, the microcomputer obtains the "longitude $\lambda_{SAT}$ of the satellite passage point" and the "right ascension $\alpha$ of the satellite" from the difference $(\theta-\Omega)$ and the Greenwich sidereal time $\theta_G$.

$$(\theta-\Omega) = \tan^{-1}(\sin(u) \cdot \cos(i)/\cos(u))$$

$$\lambda_{SAT} = (\theta-\Omega) + \Omega - \theta_G$$

$$\alpha = (\theta-\Omega) + \Omega \quad \text{[Equation 45]}$$

In the manner described above, the microprocessor calculates the satellite's geocentric position at the calculation date and time, and more specifically, the equatorial coordinates "right ascension $\alpha$, declination $\delta$", the "longitude $\lambda_{SAT}$ and latitude $\psi_{SAT}$" of the satellite passage point and the "geocentric distance $r_{SAT}$" between the center of the earth and the satellite passage point.

Figure 20:
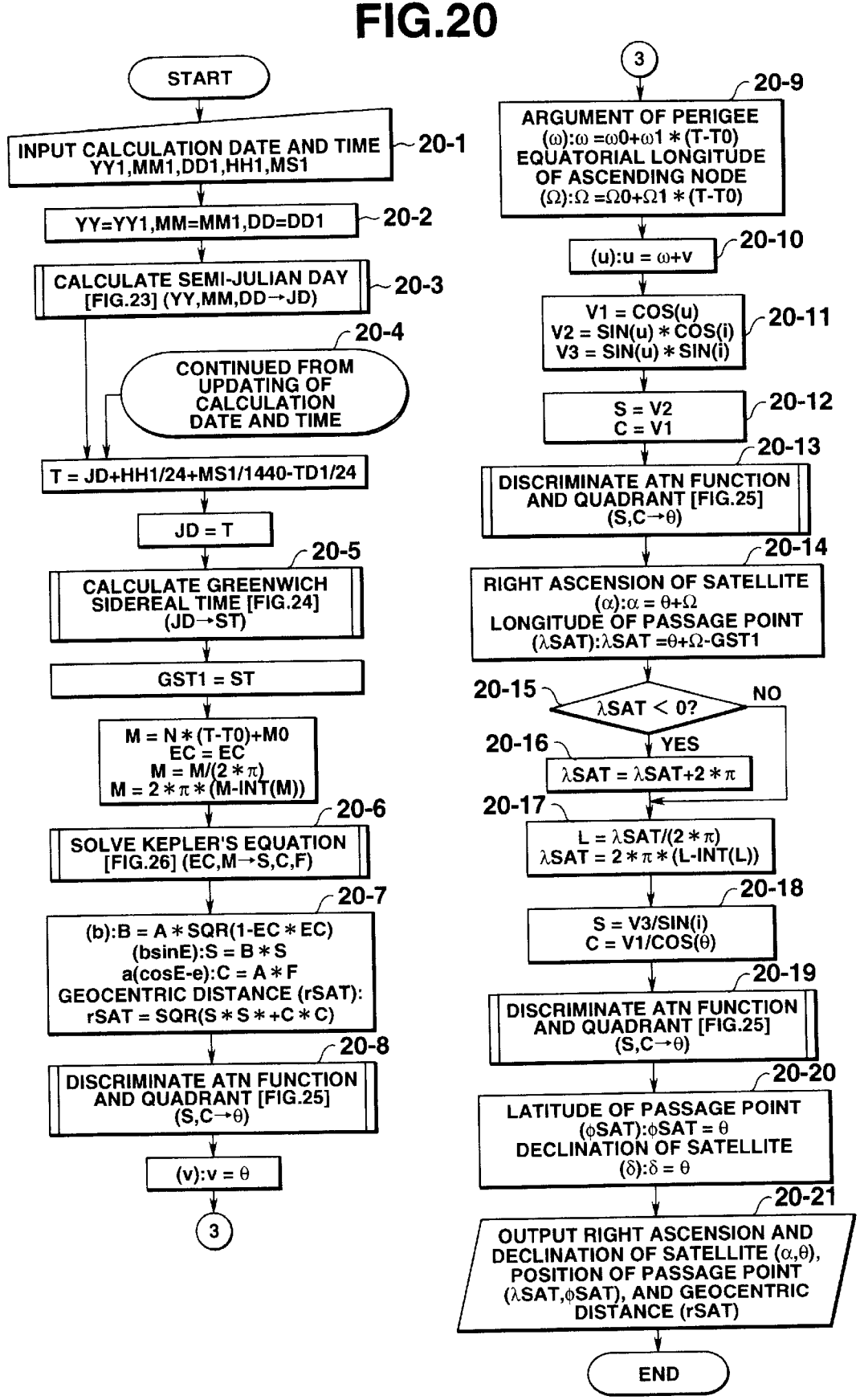
FIG. 20 is a flowchart for explaining the calculation of the geocentric position of the communication satellite.

The steps S2 and S3 are shown in the form of detailed flowcharts in FIG. 20.

Next the microprocessor calculates the apparent position of the satellite when viewed from the terminal and the distance between the satellite and the terminal, on the basis of the satellite's geocentric position calculated previously and terminal's position data attained by a position measurement process through the use of position measurement data which is input as mentioned previously or supplied from a position measurement satellite (step S4).

Next, from the terminal's position "longitude $\lambda$ and latitude $\psi$" on the ground (the ground position) and the "right ascension $\alpha$ and declination $\delta$" of the satellite, for example, the microprocessor obtains the horizontal coordinates "azimuth Az, altitude h" of the satellite when viewed from the terminal, using Equation 46.

hour angle $(H)$ of satellite=Greenwich sidereal time $(\theta G)$+longitude $(\lambda)$ of observation point−right ascension $(\alpha)$ of satellite $$h = \sin^{-1}(\sin \psi \cdot \sin \delta + \cos \psi \cdot \cos \delta \cdot \cos H)$$

$$A_z = \tan^{-1}\{\cos \delta \cdot \sin H/(-\cos \psi \cdot \sin \delta + \sin \psi \cdot \cos \delta \cdot \cos H)\} \quad \text{[Equation 46]}$$

Further, the microprocessor obtains the geocentric X, Y and Z coordinates of the communication satellite and the geocentric x, y and z coordinates of the terminal from the "longitude $\lambda_{SAT}$ and latitude $\psi_{SAT}$" of the satellite passage point, the "geocentric distance $r_{SAT}$" between the center of the earth and the satellite passage point, the ground position "longitude $\lambda$ and latitude $\psi$" of the terminal and the "geocentric distance r" between the center of the earth and the terminal.

The coordinates (x, y, z) of the terminal are shown in Equation 47.

$$x = r \cdot \cos \psi \cdot \cos \lambda$$

$$y = r \cdot \cos \psi \cdot \sin \lambda$$

$$z = r \cdot \sin \psi \quad \text{[Equation 47]}$$

The coordinates (X, Y, Z) of the communication satellite are shown in Equation 48.

$$X = r_{SAT} \cdot \cos \psi_{SAT} \cdot \cos \lambda_{SAT}$$

$$Y = r_{SAT} \cdot \cos \psi_{SAT} \cdot \sin \lambda_{SAT}$$

$$Z = r_{SAT} \cdot \sin \psi_{SAT} \quad \text{[Equation 48]}$$

Hence, the straight-line distance R between the communication satellite and the terminal is shown in Equation 49.

$$R=\sqrt{\{(X-x)^2+(Y-y)^2+(Z-z)^2\}} \quad \text{[Equation 49]}$$

Figure 21:
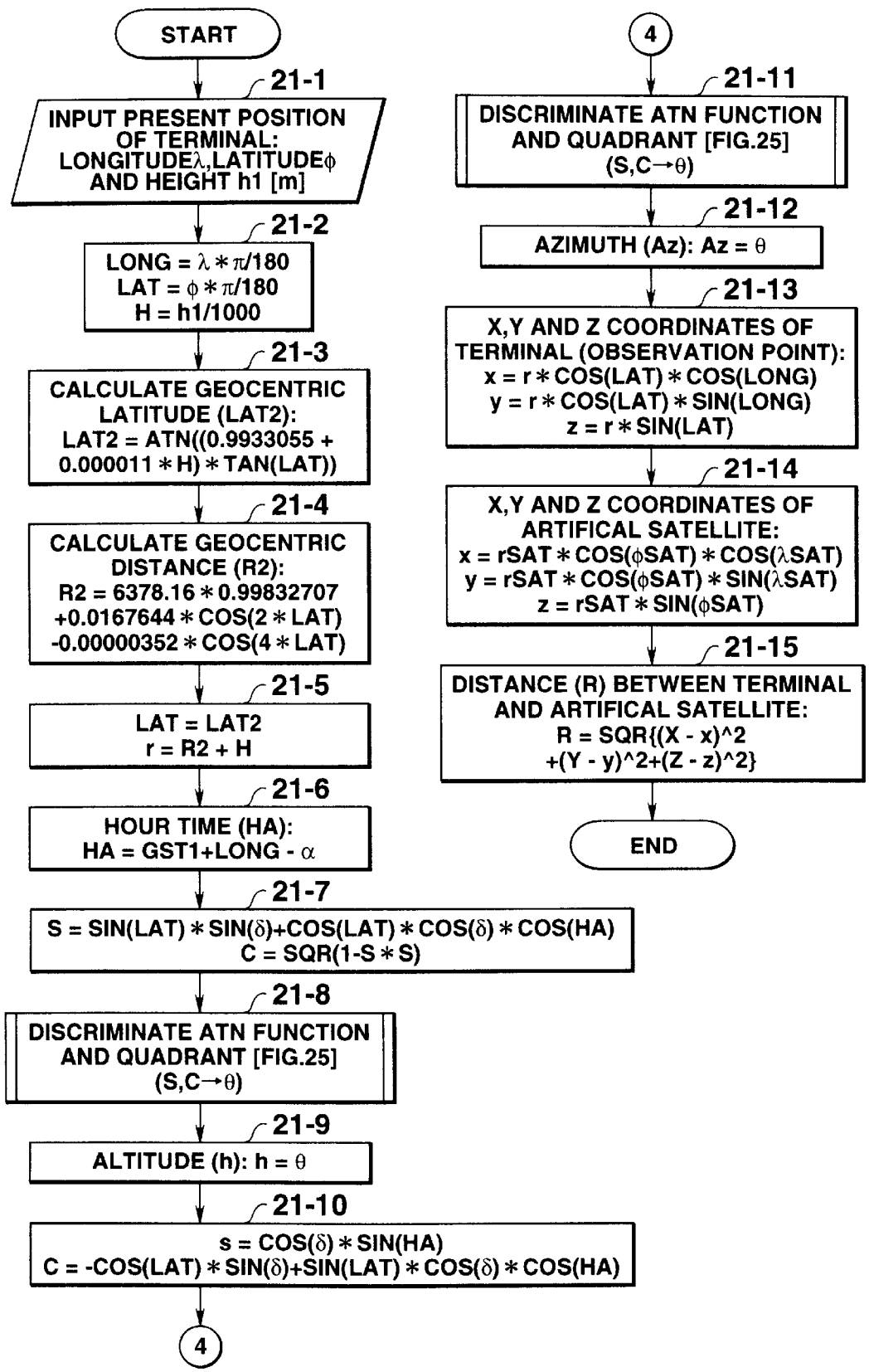
FIG. 21 is a flowchart for explaining the apparent position of the communication satellite.

The step S4 is shown in the form of a detailed flowchart in FIG. 21.

Moreover, the microprocessor determines from the calculated apparent angle and distance whether the communication satellite has reached a communicable area in which the communication satellite can communicate with the terminal (step S5).

In order to determine whether the communication satellite has reached the communicable area, the microprocessor performs the following determinations (a) to (d), for example:

(a) The microprocessor determines whether the communication satellite is located above the horizon ($h \geq 0$).

(b) The microprocessor determines whether the communication satellite is located at such an altitude or elevation angle that it can communicate with the terminal ($h_{MIN} \leq h \leq h_{MAX}$).

(c) The microprocessor determines whether the distance between the communication satellite and the terminal is in such a range that the communication satellite can communicate with the terminal ($R \leq R_{MAX}$).

(d) Based on the altitude and the thickness of an atmospheric air layer, the microprocessor determines the coefficients $\alpha_d$ of the attenuation which occurs in the intensity of an electric field during the propagation of radio waves, and obtains the electric field intensity $E_d$ from the distance R by using:

$$E_d = E_{dO}/(R^{\alpha_d})$$

or $$E_d R^{-\alpha^d}$$

Then, the microprocessor determines whether the obtained electric field intensity Ed has such a value that the communication satellite can communicate with the terminal ($E_d \geq E_{dMIN}$).

By performing the determinations (a) to (d), the microprocessor can determine whether the communication satellite will have reached the communicable area at the calculation date and time.

Figure 22:
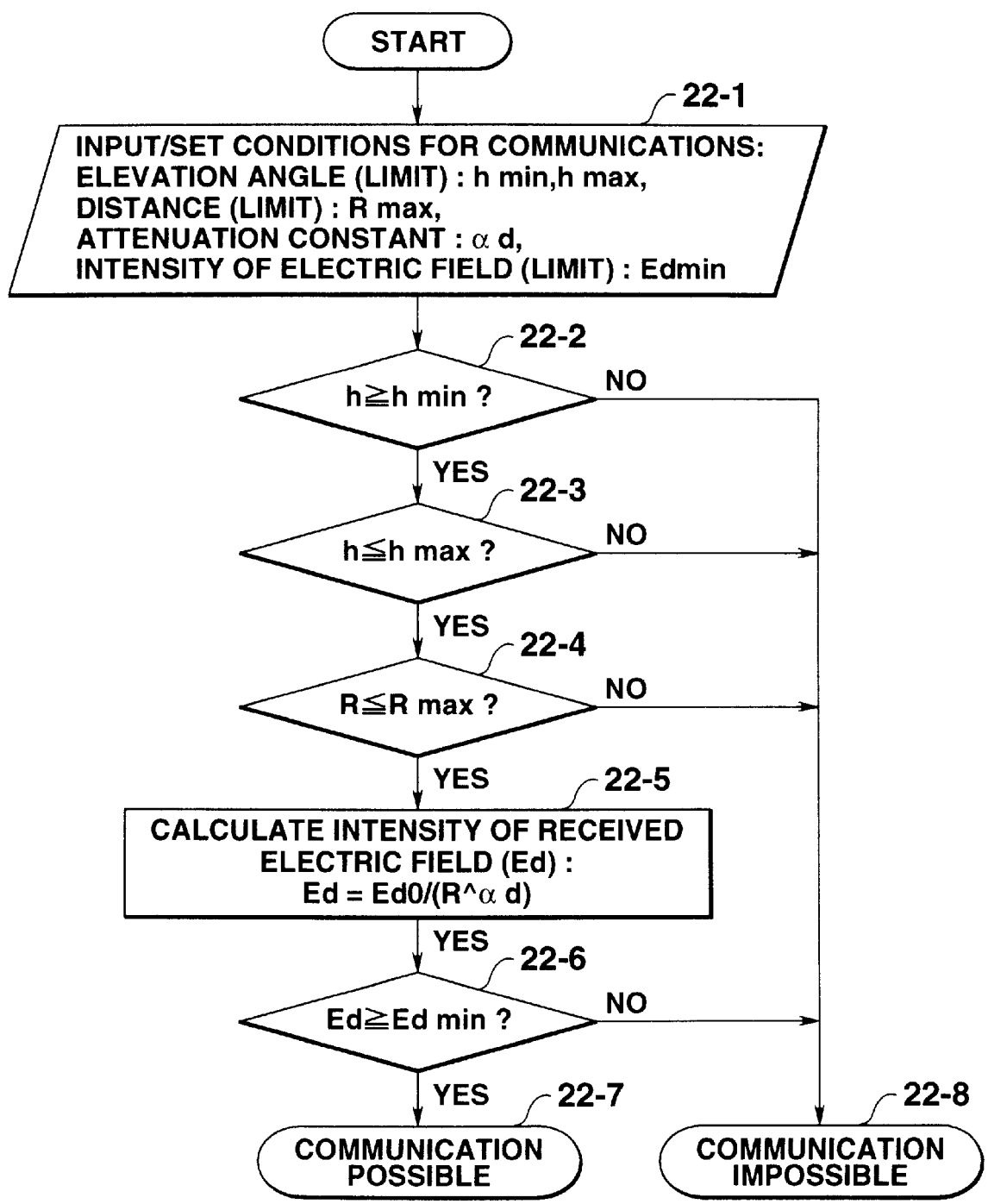
FIG. 22 is a flowchart for explaining calculations to determine the location at which communications are possible.

The step S5 is shown in the form of a detailed flowchart in FIG. 22.

By repeating the above-described steps S2 to S5 while sequentially changing the calculation date and time, the microprocessor can determine the arrival date and time at which the communication satellite is to reach the communicable area and the leaving date and time at which the communication satellite is to leave the communicable area.

Figure 23:
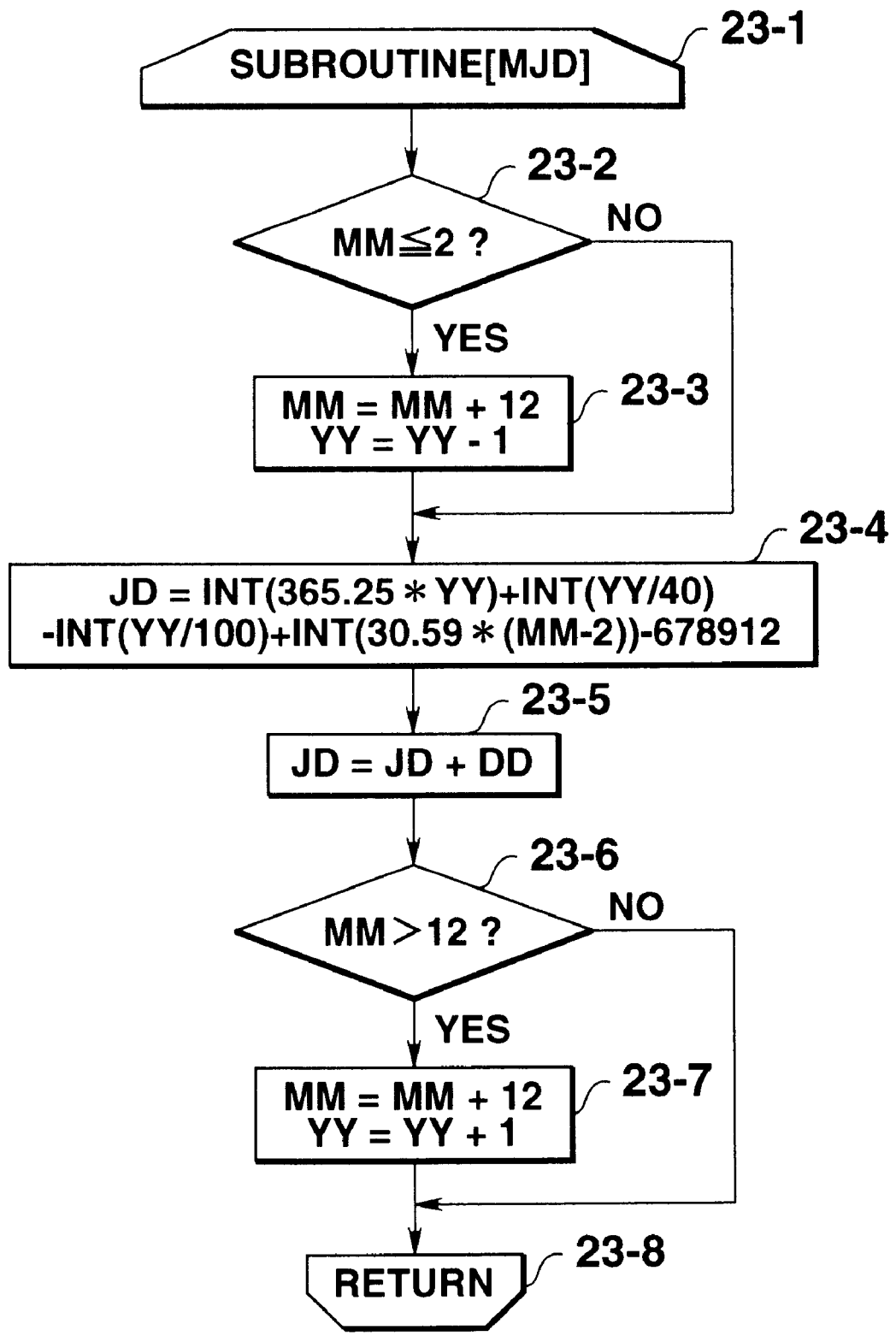
FIG. 23 is a flowchart showing the subroutine of calculating the semi-Julian Day.
Figure 24:
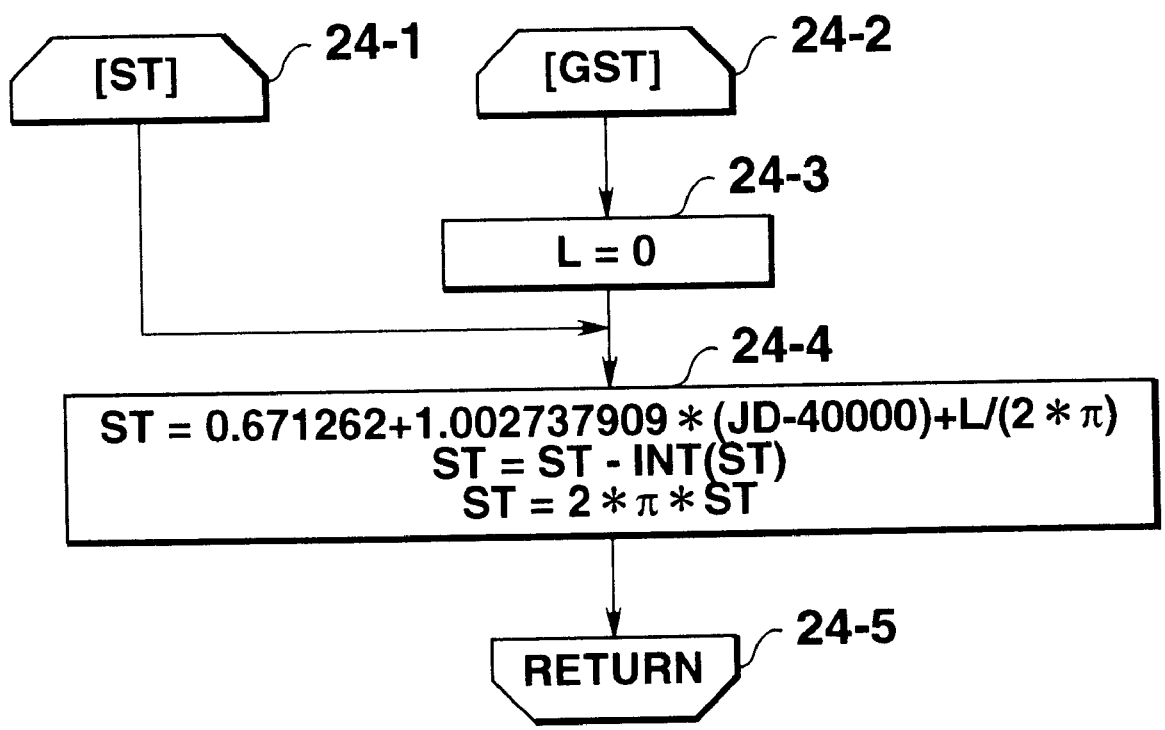
FIG. 24 is a flowchart showing the subroutine of calculating a local sidereal time and a Greenwich sidereal time.
Figure 25:
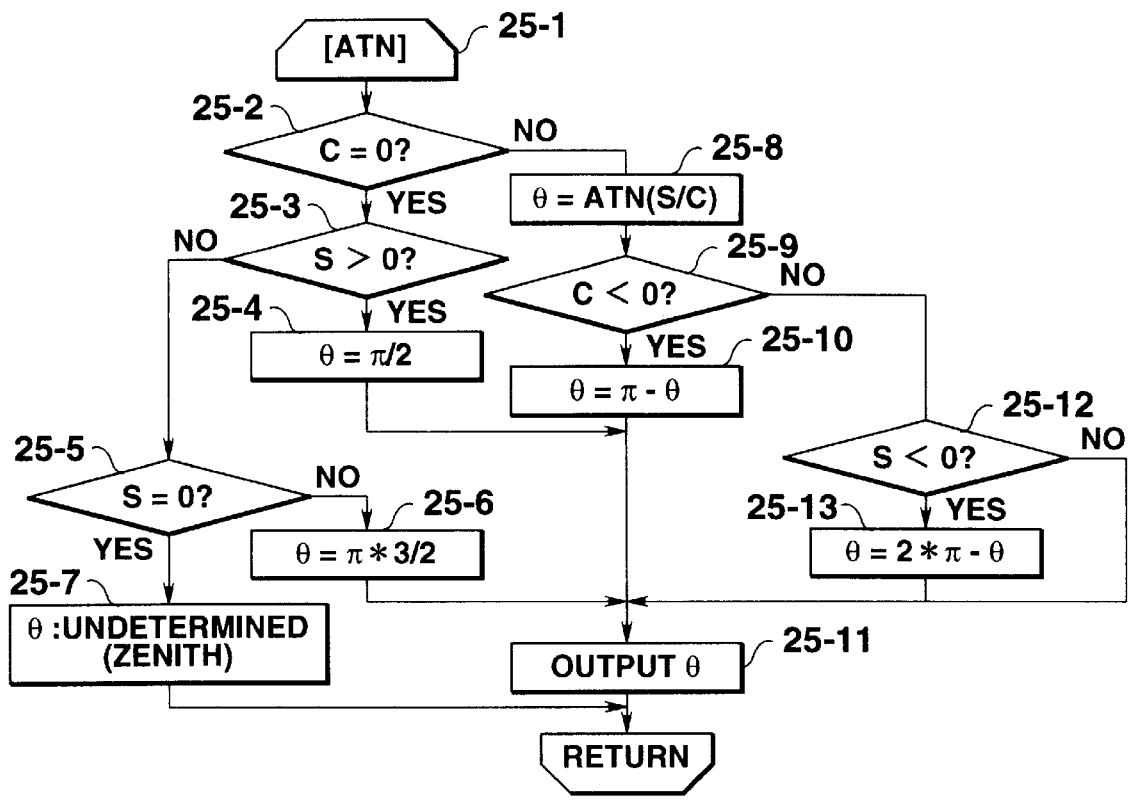
FIG. 25 is the flowchart showing the subroutine of calculations to determine an ATN function and a quadrant.
Figure 26:
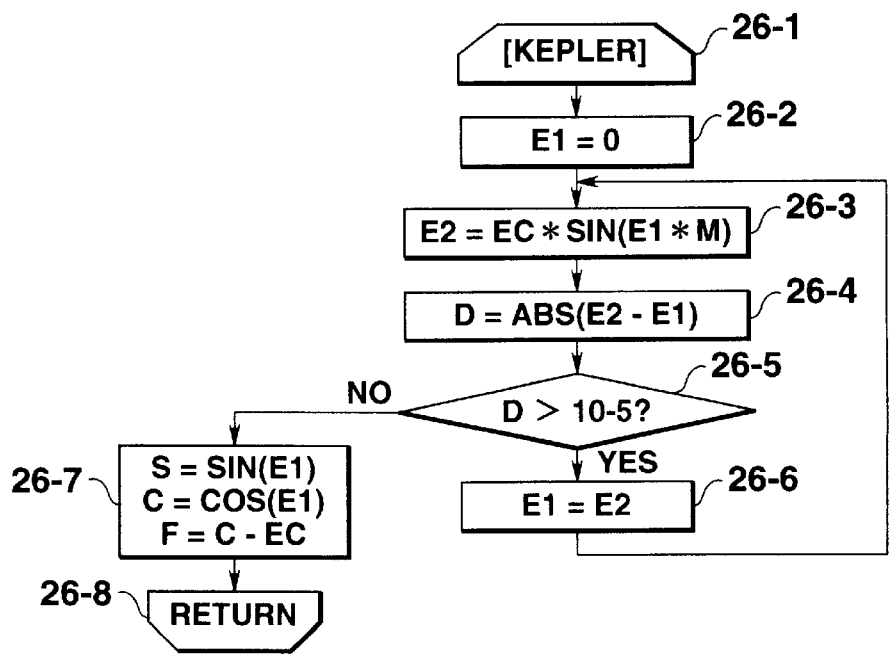
FIG. 26 is a flowchart showing the subroutine of solving the Kepler's equation.

The semi-Julian Day calculation step and the Greenwich sidereal time calculation step, both being referred to in FIGS. 18 and 20, are shown in the form of detailed flowcharts in FIGS. 23 and 24, respectively. The ATN function ($\tan^{-1}$ function) and quadrant discriminating step, referred to in FIGS. 19, 20 and 21, is shown as a detailed flowchart in FIG. 25. Further, the Kepler's equation solving step referred to in FIG. 20 is shown in the form of a detailed flowchart in FIG. 26.

The names of the variables or orbital elements used in the flowcharts of FIGS. 18 to 26 are shown in the orbital element outputting step recited in FIG. 19.

The microprocessor causes the display/output section 453 including the LCD panel 456 or the like to display in advance the arrival/leaving date and time calculated by the orbit calculation process explained above. The microprocessor may cause the speaker 12 to generate a sound such as a beep or the like to inform the user of the arrival/leaving date and time.

The microprocessor sets the arrival date and time to the timer 32 as the power-on date and time at which the satellite communication circuit section 3 turns on the supply of power. Further, the microprocessor sets the leaving date and time to the timer 32 as the power-off date and time at which the satellite communication circuit section 3 turns off the supply of power. When the communication satellite arrives the communicable area, the timer 32 automatically turns on the supply of power. When the communication satellite leaves the communicable area, the timer 32 automatically turns off the supply of power.

Moreover, the microprocessor may cause the display/output section 453 to prematurely display, together with date and time, the results of the above-described calculations such as the communication satellite's position in the orbit and the geocentric position, apparent position, distance, etc. of the communication satellite in the form of digital values each time the results of the calculations are attained. It is also possible for the microprocessor to cause the display/output section 453 to display the locus of the communication satellite in the form of a plot.

Furthermore, the microprocessor may appropriately update, or recalculate and change the calculation results such as the apparent position, distance, arrival date and time, leaving date and time, etc. of the communication satellite when data representing the ground position of the terminal is updated or changed by means of operation, input, and measurement of position.

The portable communication terminal apparatus according to the above-described first embodiment has the following advantages:

The portable communication terminal apparatus has the satellite orbit data memory 26 for storing the orbit data such as the orbital elements. Based on the orbit data stored in the satellite orbit data memory 26, the satellite orbital position calculating subsection 35 and geocentric position calculating subsection 36 of the portable communication terminal apparatus calculate the communication satellite's position in the orbit and the geocentric position of the communication satellite, and compute the current position of the communication satellite, the geocentric position (the equatorial coordinates, etc.) of the communication satellite at a given time, and the position (longitude and latitude) of the satellite passage point. The display/output section 453 including the LCD panel 456 or the like displays the computation results.

Consequently, even in a mobile communication system utilizing a non-geostationary satellite whose position relative to the earth changes within a short period of time unlike in the case of a geostationary satellite, the user can understand, from the portable communication terminal apparatus, here the communication satellite is located and when it arrives the communicable area.

Further, the portable communication terminal apparatus includes the terminal position input subsection 23 through which the ground position of the terminal is input or which receives the measured ground position of the terminal. Based on the geocentric position of the communication satellite which has been calculated by the satellite orbital position calculating subsection 35 and the geocentric position calculating subsection 36, the apparent position/distance calculating subsection 37 of the portable communication terminal apparatus calculates the apparent position of the communication satellite when viewed from the terminal and the distance between the communication satellite and the terminal. The sky arrival time calculating subsection 38 of the portable communication terminal apparatus discriminates the apparent position of the communication satellite and the distance between the communication satellite and the terminal, and calculates the arrival date and time at which the communication satellite arrives the communicable area and the leaving date and time at which the communication satellite leaves the communicable area.

It is possible for the portable communication terminal apparatus to inform the user of the arrival date and time by displaying them on the LCD panel 456 or the like. It is also possible for the portable communication terminal apparatus to generate a beep at that date and time. Therefore, the user can understand the arrival date and time and/or the leaving date and time from the portable communication terminal apparatus in advance, and can communicate with the communication satellite without missing the timing of communication.

Furthermore, according to the portable communication terminal apparatus, the satellite position/arrival-time calculating section 29 sets the arrival date and time to the timer 32 as the power-on date and time at which the satellite communication circuit section 3 automatically switches on the power supply control circuit 31. The satellite position/arrival-time calculating section 29 sets the leaving time and date to the timer 32 as the power-off date and time at which the satellite communication circuit section 3 automatically switches off the power supply control circuit 31. When the arrival time comes, the timer 32 automatically turns on the supply of power to the satellite communication circuit section 3. When the leaving time comes, the timer 32 automatically turns off the supply of power for communications.

Accordingly, the amount of electric power which the satellite communication circuit section 3 requires is reduced. This allows the capacity and size of the mounted battery 33 to be reduced, which permits even the size of the portable communication terminal apparatus like a wrist watch for satellite communications to be reduced.

Furthermore, according to the portable communication terminal apparatus, if the orbit data and the terminal position data are input to the terminal apparatus, the satellite position/arrival-time calculating section 29 can determine whether the terminal apparatus can communicate with the communication satellite. This eliminates the need of regularly receiving radio waves serving as an ID signal from the ground base station and the space station as the communication satellite, and the need of communicating with the base station in order to confirm a position. As a result, the power consumption and wasteful use of the communication line being reduced accordingly. Furthermore, the portable communication terminal apparatus needs only control communications such as waiting a call, sending a call, etc. only while the communication satellite is in the communicable area. This reduces the power consumption by the communication circuit while the portable communication terminal apparatus is performing no communications.

If an LSI (Large Scale Integration) digital logic circuit of small power-consumption like a microprocessor including a CPU is employed to perform the above-described calculations, the portable communication terminal apparatus can be miniaturized.

The user may perform the input of the ground position of the portable communication terminal apparatus by manually inputting the position data (coordinates data such as a latitude and a longitude, a country name, an area name, a city/town/village name, a code representing an area like a postal code, etc.) to the potable communication apparatus. Alternatively, the portable communication terminal apparatus may further include a reception circuit and/or the like for receiving radio waves serving as a position measurement signal from a position information transmitter arranged beside a road, for example, and the position data may be input from such a transmitter to the reception circuit.

The portable communication terminal apparatus described above informs the user of the arrival date and time by causing the display/output section 453 to display the arrival date and time or by causing the speaker 12 to generate a sound. However, the portable communication terminal apparatus may cause the display/output section 453 to display, in digital values and together with the arrival date and time, the communication satellite's position in the orbit (a latitude and a longitude) obtained during the calculation of the arrival date and time. It is also possible for the display/output section 453 to display, in the form of a plot, the locus of the communication satellite obtained during the calculation of the arrival date and time.

In the portable communication terminal apparatus according to the first embodiment of the present invention, the position of the terminal apparatus is measured or input externally. However, the portable communication terminal apparatus may further include a reception circuit for receiving radio waves from a GPS satellite and an arithmetic operation section for performing position measurements, and the position of the portable communication terminal apparatus may be measured using the arithmetic operation section, on the basis of the received radio waves. Employing the above-described reception circuit and the arithmetic operation section, the portable communication terminal apparatus can calculate not only the geocentric position of the communication satellite but also the position of itself, and can derive the apparent position of the communication satellite when seen from the terminal apparatus and the absolute distance between the communication satellite and the terminal apparatus from the calculated geocentric position of the communication satellite and the calculated position of the terminal apparatus.

Figure 28:
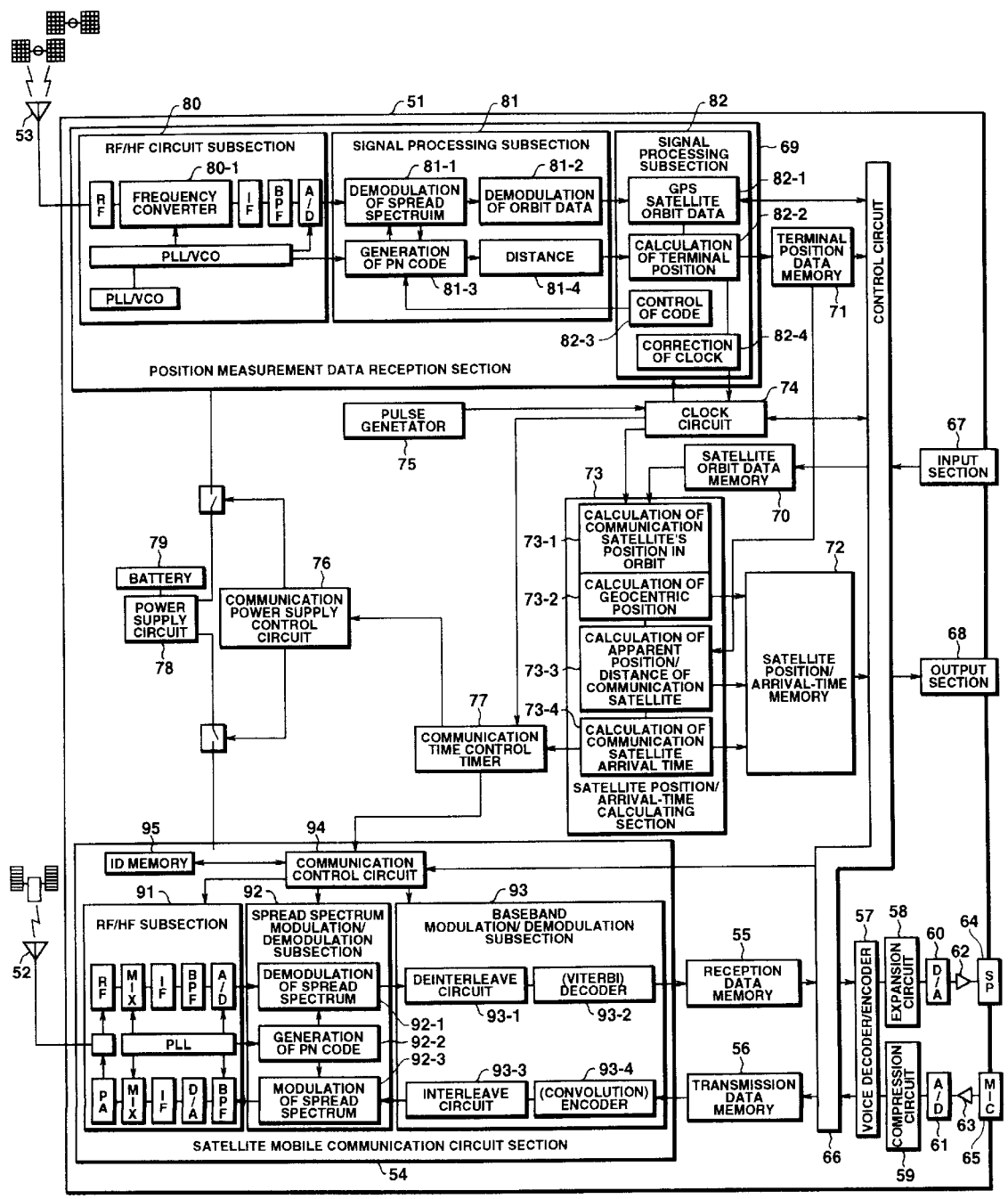
FIG. 28 is a block diagram which schematically shows the structure of a portable communication terminal according to the second embodiment of the present invention.

FIG. 28 shows a portable communication terminal apparatus according to the second embodiment of the present invention. This terminal apparatus further includes a reception circuit for receiving radio waves from a GPS satellite and an arithmetic operation section for performing position measurements on the basis of the received radio waves.

The portable communication terminal apparatus 51 shown in FIG. 28, includes a communication antenna section 52, a position measurement antenna section 53, a communication circuit section 54, a reception data memory 55, a transmission data memory 56, a voice decoder/encoder 57, an expansion circuit 58, a compression circuit 59, a D/A converter 60, an A/D converter 61, amplifiers 62 and 63, a speaker 64, a microphone 65, a control circuit 66, an input section 67 and an output section 68.

The communication antenna section 52 and the satellite communication circuit section 54 send and receive communication data by radio to and from a communication unit mounted in a communication satellite such as a non-geostationary satellite. The satellite communication circuit section 54 has an RF/HF subsection 91, a spread spectrum modulation/demodulation subsection 92, a baseband modulation/demodulation subsection 93, a communication control circuit 94 and an ID memory 95. The satellite communication circuit section 54 applies processing such as the modulation and demodulation of a spread spectrum, an interleave and a deinterleave to communication radio waves, and performs data communication with the communication satellite.

The communication control circuit 94 controls the data communication with the communication satellite which the satellite communication circuit section 54 performs. The ID memory 95 stores ID data for identifying the terminal apparatus. The reception data memory 55 stores reception data which the satellite communication circuit section 54 has received from the communication satellite. The transmission data memory 56 stores transmission data to be sent to the communication satellite through the communication circuit section 54.

In the case where data received from the communication satellite is voice data, the voice decoder/encoder 57 decodes the voice data, and the expansion circuit 58 expands the resultant data. The D/A converter 60 converts the expanded data to an analog voice signal. The analog voice signal converted is sent to the amplifier 62, and the speaker 64 reproduces a voice from the analog voice signal sent from the amplifier 62. The A/D converter 61 receives a voice signal from a microphone 65 through the amplifier 63, and converts the received voice signal to a digital voice signal. The compression circuit 59 compresses the digital voice signal, and the voice decoder/encoder 57 codes the digital voice signal as transmission data, and supplies the transmission data to the communication circuit section 54.

The control circuit 66 makes the transmission data memory 56 store data other than voices, such as characters, numerals, codes and image data, all being input from the input section 67. The control circuit 66 supplies, to the output section 68, data other than voices, i.e., characters, numeral codes and image data received from the communication satellite.

The portable communication terminal apparatus 51 further includes a position measurement data reception section 69, a satellite orbit data memory 70, a terminal position data memory 71, a satellite position/arrival-time memory 72, a satellite position/arrival-time calculating section 73, a clock circuit 74, a pulse generator 75, a communication power supply control circuit 76, a communication time control timer 77, a power supply circuit 78 and a battery 79.

The satellite orbit data memory 70 stores orbit data input from the input section 67 and used to calculate the communication satellite's position in the orbit. The orbit data is data such as the orbital elements of the non-geostationary communication satellite which is to communicate with the portable communication terminal apparatus 51.

The terminal position data memory 71 stores position information of the portable communication terminal apparatus 51, such as a latitude, a longitude, the name of a place and the name of an area, all being input from the position measurement data reception section 69.

The satellite position/arrival-time calculating section 73 calculates, from the orbit data of the communication satellite and the position information of the communication terminal apparatus, the position (the geocentric position, the apparent position, the distance) of the communication satellite and the arrival date and time at which the communication satellite is to arrive a communicable area where the communication satellite can communicate with the communication terminal apparatus.

The satellite position/arrival-time data memory 72 stores the position of the communication satellite and the arrival date and time, all of which have been calculated by the satellite position/arrival-time calculating section 73.

The communication power supply control circuit 76 turns on and off the supply of power to the satellite communication circuit section 54 and the position measurement data reception section 69 from the battery 79 and the power supply circuit 78.

The communication time control timer 77 controls the communication power supply control circuit 76 in accordance with the satellite arrival date and time information obtained by the satellite position/arrival-time calculating section 73. The pulse generator 75 and the clock circuit 74 generate current time information and time measurement information.

The position measurement data reception section 69 has an RF/HF circuit subsection 80, a signal processing subsection 81 and an arithmetic operation circuit subsection 82.

The RF/HF circuit subsection 80 converts the frequency of received satellite radio waves. The signal processing subsection 81 applies the spread-spectrum demodulation processing to the radio waves whose frequency has been converted by the RF/HF circuit subsection 80, and extracts and demodulates GPS satellite orbit data. The arithmetic operation circuit subsection 82 calculates the GPS satellite's position in the orbit from the orbit data extracted and demodulated by the signal processing subsection 81. The position measurement data reception section 69, as well as a general GPS reception circuit, can precisely derive the position of the communication terminal apparatus by calculations according to the principle of three-dimensional measurements from the geocentric positions of three or more GPS satellites and distance signals (phase lag) sent from the GPS satellites.

As in the case of the first embodiment, the portable communication terminal apparatus 51 can derive the apparent position of the communication satellite when seen from the terminal apparatus and the distance between the communication satellite and the terminal apparatus, from the position data of the terminal apparatus which has been obtained by the data reception section 69 and the geocentric position of the communication satellite which has been obtained by the satellite position/arrival-time calculating section 73. The portable communication terminal apparatus 51 can calculate the arrival date and time at which the communication satellite is to arrive a communicable area and the leaving date and time at which the communication satellite is to leave the communicable area, as in the case of the first embodiment.

The position measurement reception section 69 need not constantly receive radio waves from a GPS satellite, and may periodically or intermittently operate only for the period of time required for a position measurement when the range of movement of the communication terminal apparatus is small, particularly in such a case as that where the user is carrying the communication apparatus with him/her.

The portable communication terminal apparatus 51 sets the arrival date and time and the leaving date and time to the communication time control timer 77 as the starting date and time at which the supply of power to the satellite communication circuit section 54 or the operation of the satellite communication circuit section 54 is started and the stopping date and time at which the supply of power to the satellite communication circuit section 54 or the operation of the satellite communication circuit section 54 is stopped. The communication time control timer 77 automatically actuates the communication circuit section 94 at the arrival date and time, and automatically stops the communication circuit section 94 at the leaving date and time. Since the communication circuit section 94 is off while the communication satellite is not in the communicable area, the electric power is not wastefully consumed.

The appearance of the portable communication terminal apparatus 51 according to the second embodiment and the arrangement of parts mounted therein are substantially the same as those of the portable communication terminal apparatus 1 illustrated in FIGS. 2 and 3.

The input of the position of the communication terminal apparatus is performed in the first embodiment. According to the second embodiment, the portable communication terminal apparatus 51 of the second embodiment, which is illustrated in FIG. 28, has instead the position measurement data reception section 69 which receives radio waves from a GPS satellite. Hence, the user need not input the position of the terminal apparatus. The portable communication terminal apparatus 51 receives radio waves from a GPS satellite, and calculates the position of the terminal apparatus. Then, the portable communication terminal apparatus 51 derives the apparent position and the arrival date and time from the calculated position of the terminal apparatus so that the control of the supply of power to the communication circuit section 54, etc. can be performed.

It is also possible for the portable communication terminal apparatus 51 to automatically select, prior to communications, the corresponding communication satellite, communication line and communication service, etc. in accordance with the position of the portable communication terminal apparatus 51.

The portable communication terminal apparatus may receive, from the communication satellite or the ground communication line, the orbital element data used to calculate the communication satellite's position in the orbit.

In the above-described embodiments, the portable communication terminal apparatus functions only as a satellite communication terminal. However, it may be a plural-mode type terminal functioning also as a mobile ground communication terminal which can be employed in the PDC, the PHS, etc. The portable communication terminal apparatus can determine the arrival date and time and the position of the communication terminal apparatus, and can automatically select one of plural-mode communication functions or lines. Portable communication terminal apparatuses having such functions will now be described as the third to fifth embodiments of the present invention.

Figure 29:
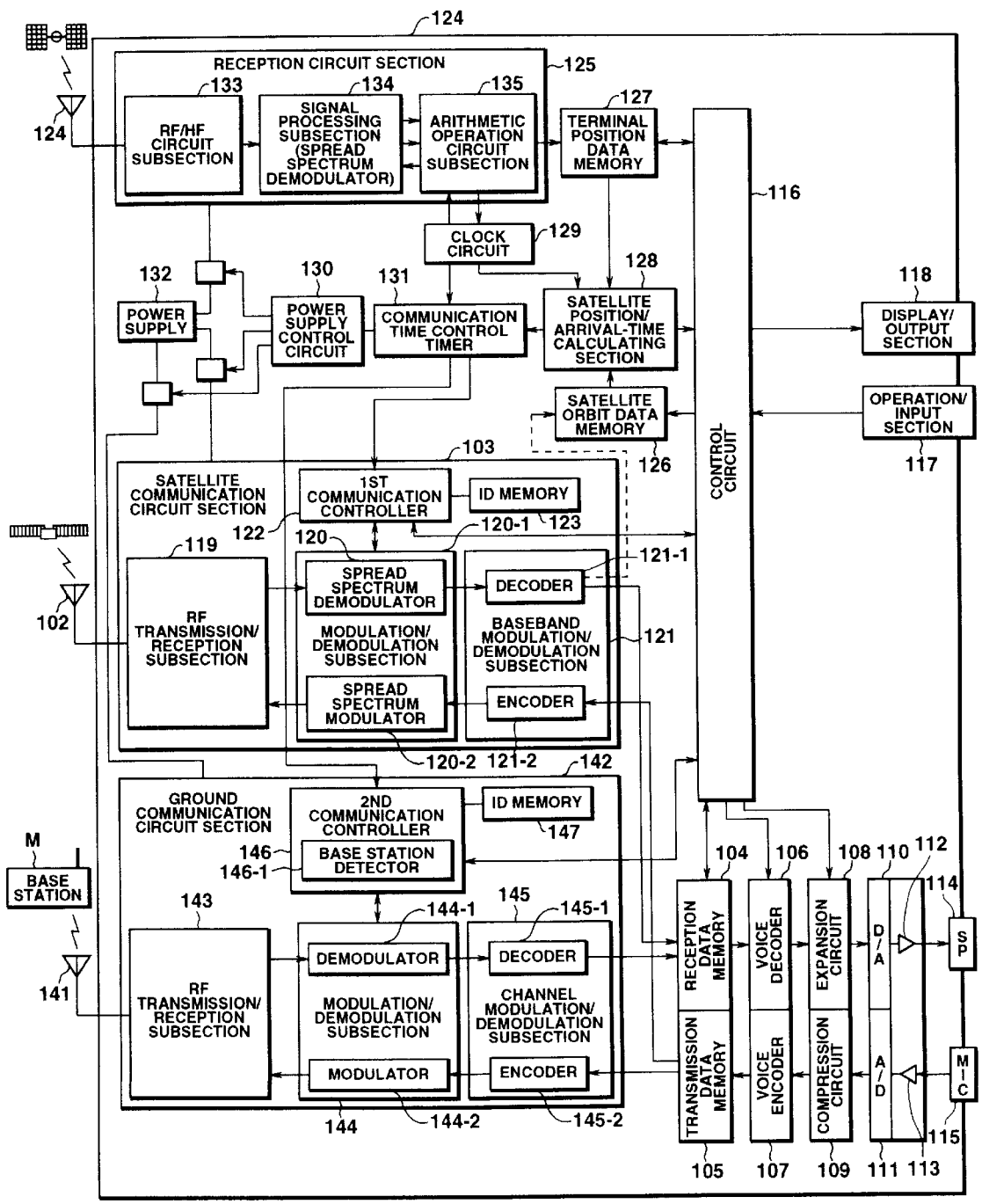
FIG. 29 is a block diagram which schematically shows the structure of a portable communication terminal apparatus according to the third embodiment of the present invention.
Figure 30:
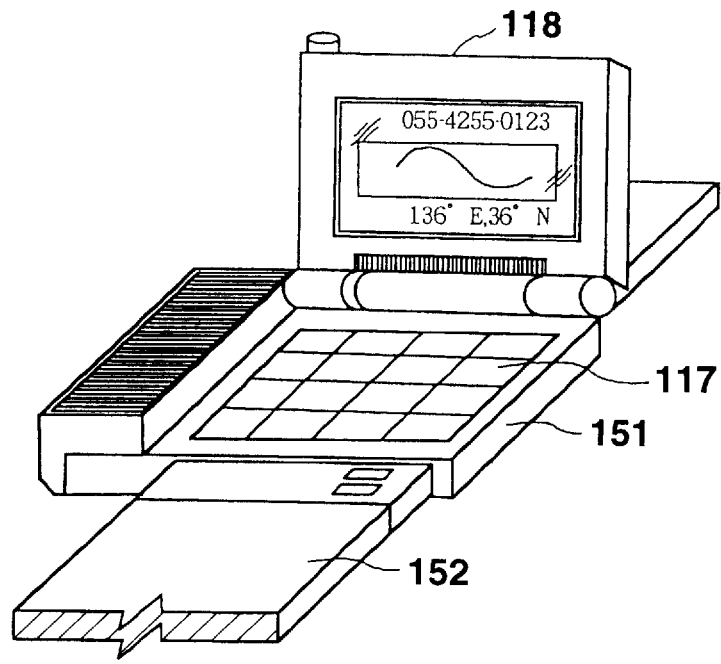
FIG. 30 is a schematic diagram for explaining the appearance of the portable communication terminal apparatus.
Figure 31:
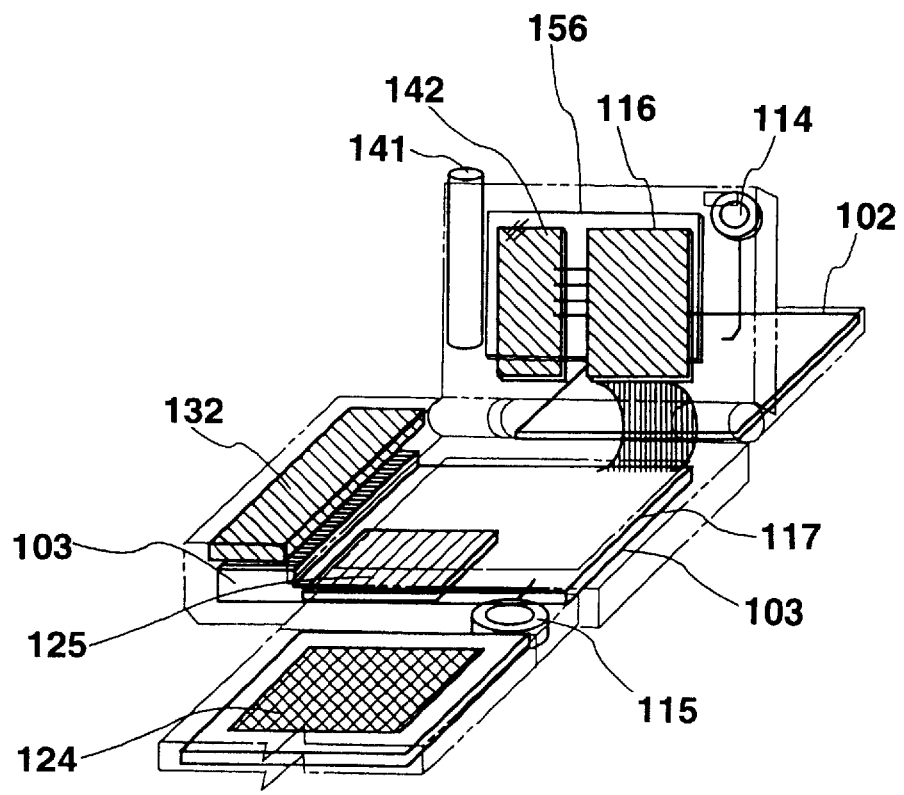
FIG. 31 is a schematic diagram for explaining the arrangement of parts mounted in the portable communication terminal apparatus.

FIG. 29 shows a portable communication terminal apparatus according to the third embodiment of the present invention. This communication terminal apparatus further includes a communication circuit section which realizes mobile communications on the ground. The appearance of this portable communication terminal apparatus and the arrangement of parts mounted therein are illustrated in FIGS. 30 and 31, respectively.

The portable communication terminal apparatus 101 illustrated in FIG. 29 includes a satellite communication antenna section 102, a satellite communication circuit section 103, a reception data memory 104, a transmission data memory 105, a voice decoder 106, a voice encoder 107, an expansion circuit 108, a compression circuit 109, a D/A converter 110, an A/D converter 111, amplifiers 112 and 113, a speaker 114, a microphone 115, a control circuit 116, an operation/input section 117 and a display/output section 118.

The satellite communication antenna section 102 and the satellite communication circuit section 103 send and receive communication data by radio to and from a communication unit mounted in a communication satellite such as a non-geostationary satellite. The satellite communication circuit section 103 has an RF/HF transmission/reception subsection 119, a spread spectrum modulation/demodulation subsection 120, a baseband modulation/demodulation subsection 121, a first communication controller 122 and an ID memory 123. The satellite communication circuit section 103 applies processing such as the modulation and demodulation of a spread spectrum, an interleave and a deinterleave to communication radio waves, and performs data communication with the communication satellite.

The first communication controller 122 controls the data communication with the communication satellite which the satellite communication circuit section 103 performs. The ID memory 123 stores ID data for identifying the terminal apparatus.

The reception data memory 104 stores reception data which the satellite communication circuit section 103 has received from the communication satellite. The transmission data memory 105 stores transmission data to be sent to the communication satellite through the satellite communication circuit section 103.

In the case where data received from the communication satellite is voice data, the voice decoder 106 decodes the voice data, and the expansion circuit 108 expands the resultant data. The D/A converter 110 converts the expanded data to an analog voice signal. The analog voice signal as converted is sent to the amplifier 112, and the speaker 114 reproduces a voice from the analog voice signal sent from the amplifier 112. The A/D converter 111 receives a voice signal from a microphone 115 through the amplifier 113, and converts the received voice signal to a digital voice signal. The compression circuit 109 compresses the digital voice signal, and the voice encoder 107 codes the digital voice signal as transmission data, and supplies the transmission data to the satellite communication circuit section 103.

The control circuit 116 makes the transmission data memory 105 store data other than voices, such as characters, numerals, codes and image data, all being input from the operation/input section 117. The control circuit 116 supplies, to the display/output section 118, data other than voices, i.e., characters, numeral codes and image data received from the communication satellite.

The portable communication terminal apparatus 101 further includes a position measurement antenna section 124, a reception circuit section 125, a satellite orbit data memory 126, a terminal position data memory 127, a satellite position/arrival-time calculating section 128, a clock circuit 129, a power supply control circuit 130, a communication time control timer 131 and a power supply 132.

The satellite orbit data memory 126 stores orbit data input from the operation/input section 117 and used to calculate the communication satellite's position in the orbit. The orbit data is data such as the orbital elements of the non-geostationary communication satellite which is to communicate with the portable communication terminal apparatus 101.

The terminal position data memory 127 stores position information of the portable communication terminal apparatus 101, such as a latitude, a longitude, the name of a place and the name of an area, all of which have been received by the reception circuit section 125.

The satellite position/arrival-time calculating section 128 calculates, from the orbit data of the communication satellite and the position information of the communication terminal apparatus, the position (the geocentric position, the apparent position, the distance) of the communication satellite and the arrival date and time at which the communication satellite is to arrive a communicable area where the communication satellite can communicate with the communication terminal apparatus.

The power supply control circuit 130 turns on and off the supply of power from the power supply 132 to the satellite communication circuit section 103, the reception circuit section 125 and a ground communication circuit section 142.

The communication time control timer 131 controls the power supply control circuit 130 in accordance with the satellite arrival date and time information obtained by the satellite position/arrival-time calculating section 128. The clock circuit 129 generates current time information and time measurement information.

The reception circuit section 125 has an RF/HF circuit subsection 1337 a signal processing subsection 134 and an arithmetic operation circuit subsection 135.

The RF/HF circuit subsection 133 converts the frequency of received satellite radio waves. The signal processing subsection 134 applies the spread-spectrum demodulation processing to the radio waves whose frequency has been converted by the RF/HF circuit subsection 133, and extracts and demodulates GPS satellite orbit data. The arithmetic operation circuit subsection 135 calculates the GPS satellite's position in the orbit from the orbit data extracted and demodulated by the signal processing subsection 134. The reception circuit section 125, as well as a general GPS reception circuit, can precisely derive the position of the communication terminal apparatus by calculations according to the principle of three-dimensional measurements from the geocentric positions of three or more GPS satellites and distance signals (phase lag) sent from the GPS satellites.

As in the case of the first embodiment, the portable communication terminal apparatus 101 can derive the apparent position of the communication satellite when seen from the terminal apparatus and the distance between the communication satellite and the terminal apparatus, from the position data of the terminal apparatus which has been obtained by the reception circuit section 125 and the geocentric position of the communication satellite which has been obtained by the satellite position/arrival-time calculating section 128. The portable communication terminal apparatus 101 can calculate the arrival date and time at which the communication satellite is to arrive a communicable area and the leaving date and time at which the communication satellite is to leave the communicable area, as in the case of the first embodiment.

The portable communication terminal apparatus 101 sets the arrival date and time and the leaving date and time to the communication time control timer 131 as the starting date and time at which the supply of power to the satellite communication circuit section 103 or the operation of the satellite communication circuit section 103 is started and the stopping date and time at which the supply of power to the satellite communication circuit section 103 or the operation of the satellite communication circuit section 103 is stopped.

The portable communication terminal apparatus 101 of the third embodiment further includes a ground communication antenna section 141 and a ground communication circuit section 142 which have ground mobile communication functions as in the case of a PDC digital portable telephone or a PHS digital cordless telephone, etc.

The ground communication antenna section 141 and the ground communication circuit section 142 send and receive data by radio to and from a ground radio base station. The ground communication circuit section 142 has an RF transmission/reception subsection 143, a modulation/demodulation subsection 144, a channel modulation/demodulation subsection 145, a second communication controller 146 and an ID memory 147.

The second communication controller 146 controls the data communication with the ground radio base station which the ground communication circuit section 142 performs. The ID memory 147 stores ID data for identifying the terminal apparatus.

The satellite communication circuit section 103 and the ground communication circuit section 142 share the reception data memory 104, the transmission data memory 105, the voice decoder 106, the voice encoder 107, the expansion circuit 108, the compression circuit 109, the D/A converter 110, the amplifiers 112 and 113, the speaker 114 and the microphone 115.

The portable communication terminal apparatus 101 has the function of a ground mobile communication terminal. By virtue of this function, the portable communication terminal apparatus 101 can perform the following control:

The portable communication terminal apparatus 101 automatically changes the way of communication so as to perform communications not via a satellite communication line but via a radio base station for ground mobile communications while the communication satellite is not in the communicable area.

Ground mobile communications can be prioritized even while the communication satellite is in the communicable area.

When the portable communication terminal apparatus 101 can receive a control signal from the radio base station for ground mobile communications, in other words, in the case where the terminal apparatus 101 is in a radio area which the radio base station is in charge of, the terminal apparatus 101 performs communications via the radio base station through the use of the ground communication circuit section 142. Meanwhile, when the portable communication terminal apparatus 101 cannot receive a control signal sent from the radio base station, in other words, in the case where the terminal apparatus 101 is not in the radio area which the radio base station is in charge of, the terminal apparatus 101 performs communications via an artificial satellite through the use of satellite communication circuit section 103.

The portable communication terminal apparatus 101 may discriminate not only its capability/incapability of performing communications via the radio base station and its capability/incapability of performing communications via the communication satellite, but also the kind and amount of transmission/reception data, the destination, the degree of emergency, services depending on areas/lines, a difference in communication fees, etc., for example, and may select the optimum communication line in view of the result of the discrimination.

In a digital mobile communication system, the sender converts a voice to a digital signal and send it after coding, and the receiver decodes the received digital signal and converts it to an analog signal in order to reproduce the voice.

The digitization of a voice, which the portable communication terminal apparatus 101 performs as the sender, will now be described.

The A/D converter 111 converts the voice signal input through the microphone 115 to a digital signal. The compression circuit 109 compresses the converted digital signal in synchronization with a baseband clock. The voice encoder 107 codes the compressed digital signal in accordance with an ADPCM (Adaptive Differential Pulse Code Modulation) system. Then, the coded digital signal is transmitted.

The reproduction of a voice, which the portable communication terminal apparatus 101 as the receiver, will now be described.

The voice decoder 106 decodes a coded digital signal in accordance with the ADPCM system. The expansion circuit 108 expands the digital signal in real time. The D/A converter 110 converts the expanded digital signal to an analog signal. The speaker 114 reproduces a voice signal from the analog signal sent from the amplifier 112.

A packet data communication service such as CDPD (Cellular Digital Packet Data) in the United States and Mobitex in Europe has been initiated. This service utilizes communication terminals as radio modems like portable electronic units, and realizes communications such as an electronic mail. Not only the packet data communication service requires a mobile data radio base station and a mobile data exchanging station, etc. in order to connect a fixed station and a mobile station to each other, but also various systems and standards such as a communications protocol for a general radio telephone and a protocol for a computer network, etc. are exist in the packet data communication service.

The mobile communication terminal illustrated in FIG. 29 sends and receive a voice call through the speaker 114 and the microphone 115, and performs data communications and packet data communications through the baseband modulation/demodulation subsection 121, the channel modulation/demodulation subsection 145 and the control circuit 116. However, the above communication terminal may be a data communication terminal only for use in the data communications and the packet data communications. The mobile communication terminal sends and receives a voice call and data in real time. However, this communication terminal can be used also in such storage-type data packet communications that the data stored in a server is received later, not in real time. The storage-type data may be a storage-type electronic mail which contains an electronic text mail and coded, compressed voice data affixed to the electronic text mail. The mobile communication terminal may realize substantially real-time voice communications by expanding and reproducing, in real time and at high speed, voice coded data received through the utilization of packet communications.

In the mobile communication terminal apparatus shown in FIG. 29, the supply of power to the communication circuit section is stopped while the communication satellite is not communicable area. Therefore, the above communication terminal apparatus is suitable especially for use in such packet communications that communication data is collectively send/received while the communication satellite is in the communicable area.

The appearance of the portable communication terminal apparatus 101 illustrated in FIG. 29 and the arrangement of parts mounted therein are shown in FIGS. 30 and 31, respectively.

The portable communication terminal apparatus 101 shown in FIGS. 30 and 31 has a watch case 151, a wrist band section 152 and a display/output section 118.

The watch case 151 contains the satellite communication circuit section 103 and the reception circuit section 125. The operation/input section 117 having numeric keys, etc. is arranged on the upper surface of the watch case 151. The microphone 115, the satellite communication antenna section 102 and the position measurement antenna section 124 are housed in the wrist band section 152.

The display/output section 118 serves also as a lid to cover the upper surface of the watch case 151, and is opened and closed by pivoting the display/output section 118 on its one peripheral portion. The display/output section 118 has an LCD panel 156 and displays time, communication data, the contents of the setting of communications, etc. For example, the display/output section 453 displays the current time, the arrival time and leaving time of the communication satellite. The display/output section 118 further displays, in the form of a plot, the communication satellite's position in the orbit and the geocentric position, apparent position and locus of the communication satellite, and displays in characters where the communication satellite and the communication terminal apparatus are located, etc. The display/output section 118 contains the control circuit 116, the speaker 114, the ground communication antenna section 141 and the ground communication circuit section 142.

The power supply 132 with a battery is housed in a side portion of the watch case 151.

Figure 32:
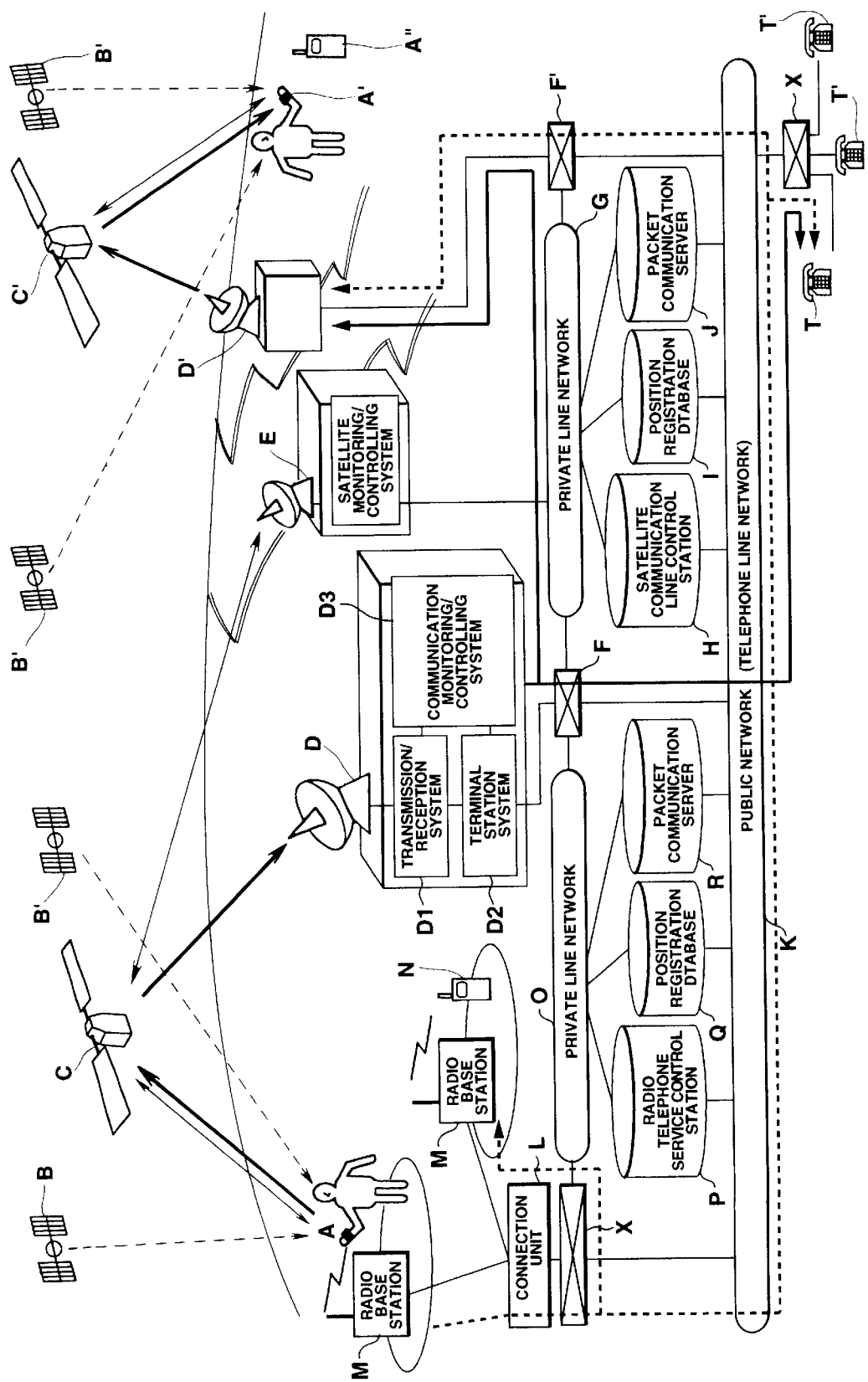
FIG. 32 is a schematic diagram or explaining a communication line system which is realized by the portable communication terminal apparatus.

FIG. 32 schematically shows the structure of a communication network system using the portable communication terminal apparatus 101.

In FIG. 32, base stations M and M' are connected to the connection unit L illustrated in FIG. 4, an a private line network O is connected to switchboards F and X. A radio telephone service control station P, a position registration data Q and a packet communication server R are connected to the private line network O.

Figure 33:
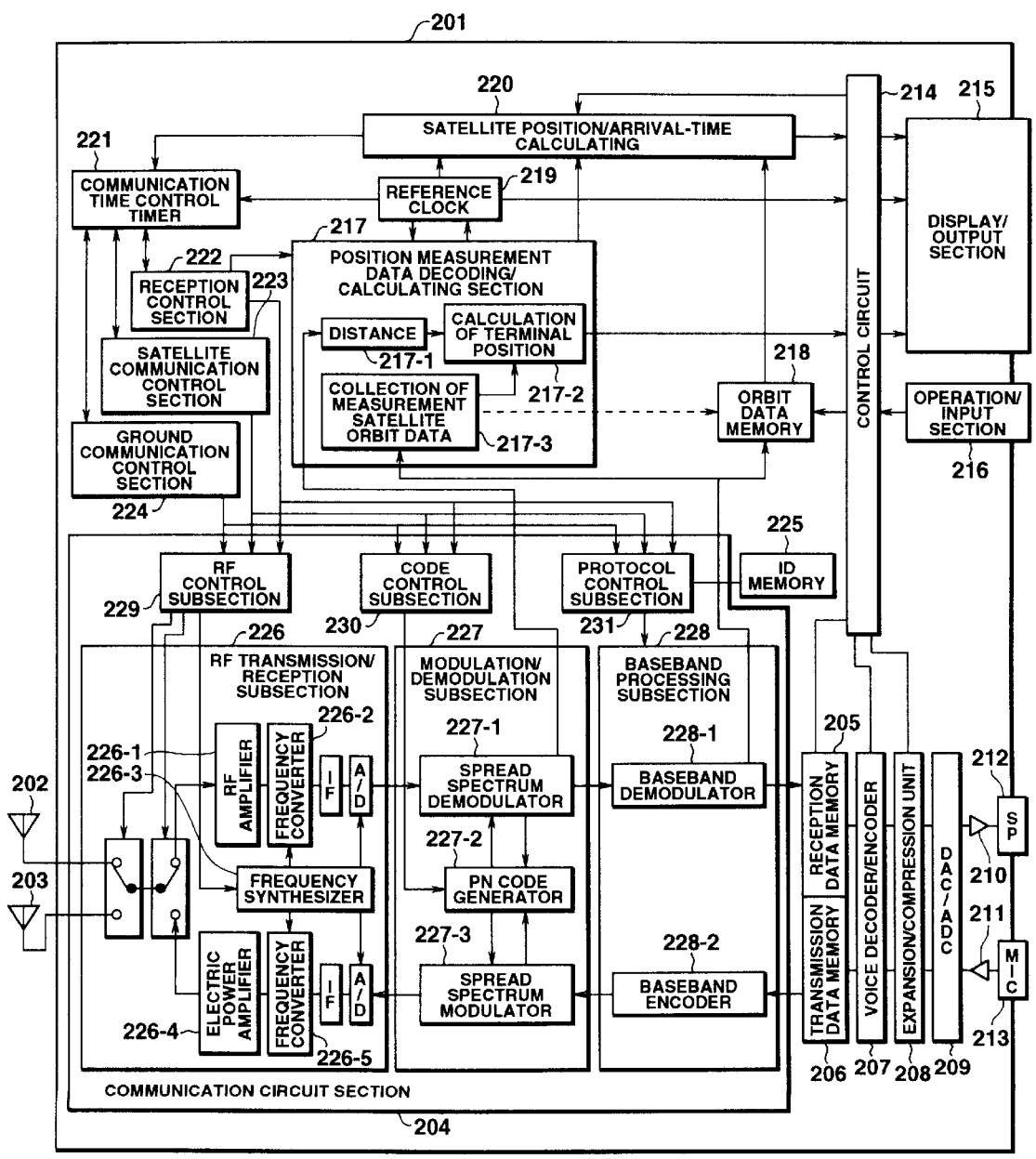
FIG. 33 is a block diagram which schematically shows the structure of a portable communication terminal apparatus according to the fourth embodiment of the present invention.
Figure 34:
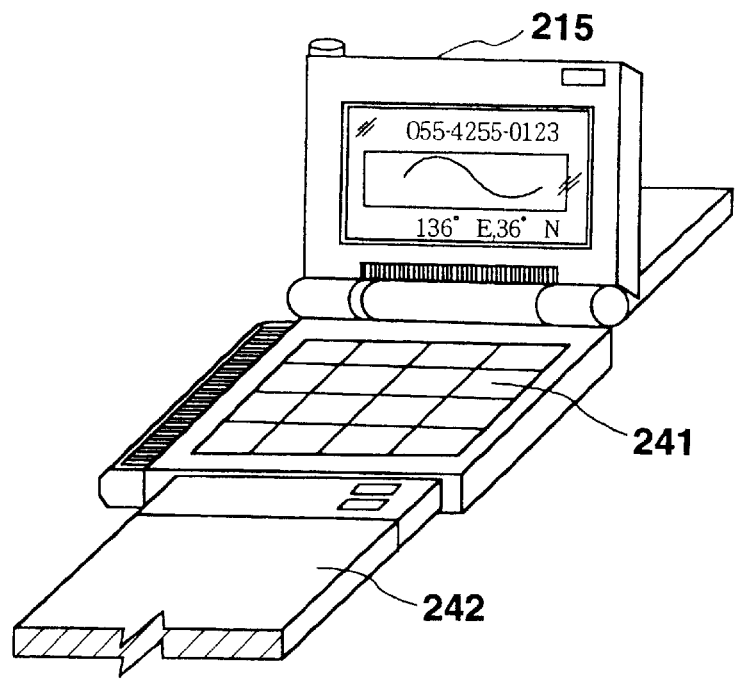
FIG. 34 is a schematic diagram for explaining the appearance of the portable communication terminal apparatus.

FIG. 33 shows the structure of the portable communication terminal apparatus according to the fourth embodiment of the present invention. FIGS. 33 and 34 show the appearance of the portable communication terminal apparatus illustrated in FIG. 33 and the arrangement of parts mounted therein, respectively. The portable communication terminal apparatus shown in FIG. 33 has a communication circuit section 204, into which a position measurement data reception circuit section, a satellite communication circuit section and a ground communication circuit section have been integrated in order to miniaturize the portable communication terminal apparatus.

In the portable communication terminal apparatus of the fourth embodiment, the communication circuit section 204 performs satellite communications and ground communications by employing spread spectrum modulation/demodulation techniques. However, the communication circuit section 204 may employ other techniques such as a CDMA (Code Division Multiple Access) technique. The portable communication terminal apparatus of the third embodiment employs three antenna sections i.e., the satellite communication antenna section 102, the position measurement antenna section 124 and the ground communication antenna section 141. However, the portable communication terminal apparatus of the fourth embodiment, which receives radio waves according to a read spectrum system from a GPS satellite as position measurement data, employs two antenna sections and uses one antenna section for position measurements and satellite (ground) communications and the other antenna section for ground (satellite) communications. The portable communication terminal apparatus of the fourth embodiment can automatically perform switching between frequencies such as RF (radio frequency), IF (intermediate frequency) and so forth, and can automatically change a modulation/demodulation code, the setting of a communication protocol, etc., in accordance with a position measurement frequency, a satellite communications frequency, a ground communications frequency, communication techniques such as modulation and demodulation and protocols.

The portable communication terminal apparatus 201 illustrated in FIG. 33 includes a satellite communication antenna section 202, a ground communication antenna section 203, a communication circuit section 204, a reception data memory 205, a transmission data memory 206, a voice decoder/encoder 207, an expansion/compression unit 208, a DAC/ADC circuit 209, amplifiers 210 and 211, a speaker 212, a microphone 213, a control circuit 214, a display/output section 215, an operation/input section 216, a position measurement data decoding/calculating section 217, an orbit data memory 218, a reference clock 219, a satellite position/arrival-time calculating section 220, a communication time control timer 221, a reception control section 222, a satellite communication control section 223, a ground communication control section 224 and an ID memory 225.

The communication circuit section 204 has an RF transmission/reception subsection 226, a modulation/demodulation subsection 227, a baseband processing subsection 228, an RF control subsection 229, a code control subsection 230 and a protocol control subsection 231. The communication control section 204 is controlled by the reception control section 222, the satellite communication control section 223 and the ground communication control section 224, and is used to perform position measurements, satellite communications and ground communications. The RF transmission/reception subsection 226, the modulation/demodulation subsection 227 and the baseband processing subsection 228 are respectively controlled by the RF control subsection 229, the code control subsection 230 and the protocol control subsection 231 in accordance with a communication mode.

The RF control subsection 229 performs switching between the ground communication antenna section 202 and the satellite communication antenna section 203. The satellite communication antenna section 202 sends and receives position measurement data and satellite communication data.

The position measurement data decoding/calculating section 217 performs position measurement calculations on the basis of a reception data signal which is supplied from the modulation/demodulation subsection 227.

Figure 35:
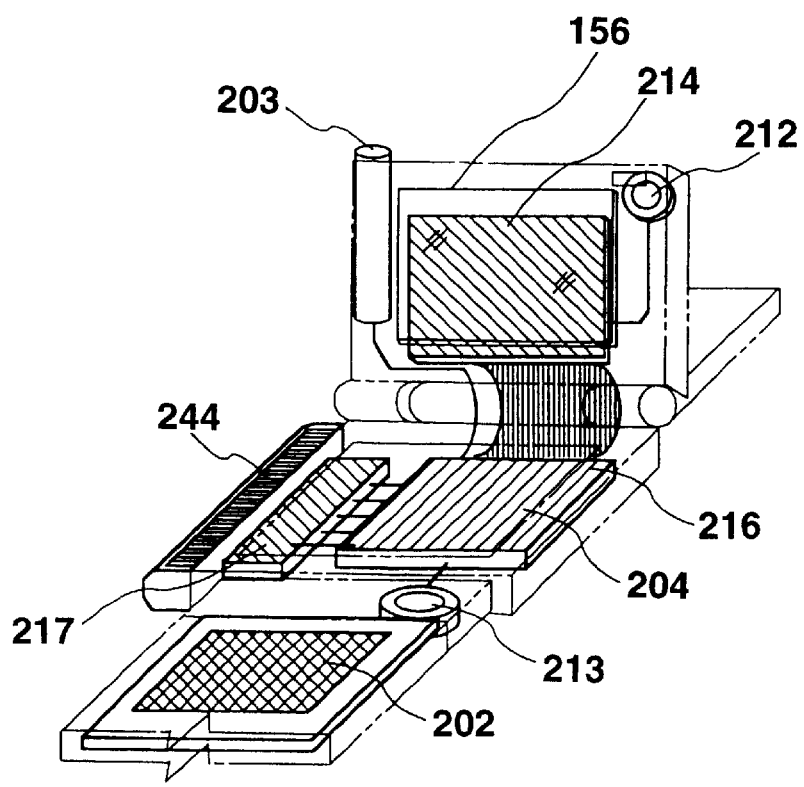
FIG. 35 is a schematic diagram for explaining the arrangement of parts mounted in the portable communication terminal apparatus.

The portable communication terminal 201 illustrated in FIGS. 34 and 35 has a watch case 241, a wrist band section 242 and a display/output section 215.

The watch case 241 contains the communication circuit section 204 and the position measurement data decoding/calculating section 217. The operation/input section 216 is arranged on the upper surface of the watch case 241. The microphone 213, the satellite communication antenna section 202 are housed in the wrist band section 242. A power supply 244 with a battery is housed in a side portion of the watch case 244.

The display/output section 215 serves also as a lid to cover the upper surface of the watch case 241, and is opened and closed by pivoting the display/output section 215 on its one peripheral portion. The display/output section 215 contains the control circuit 214, the speaker 212 and the ground communication antenna section 203.

Figure 36:
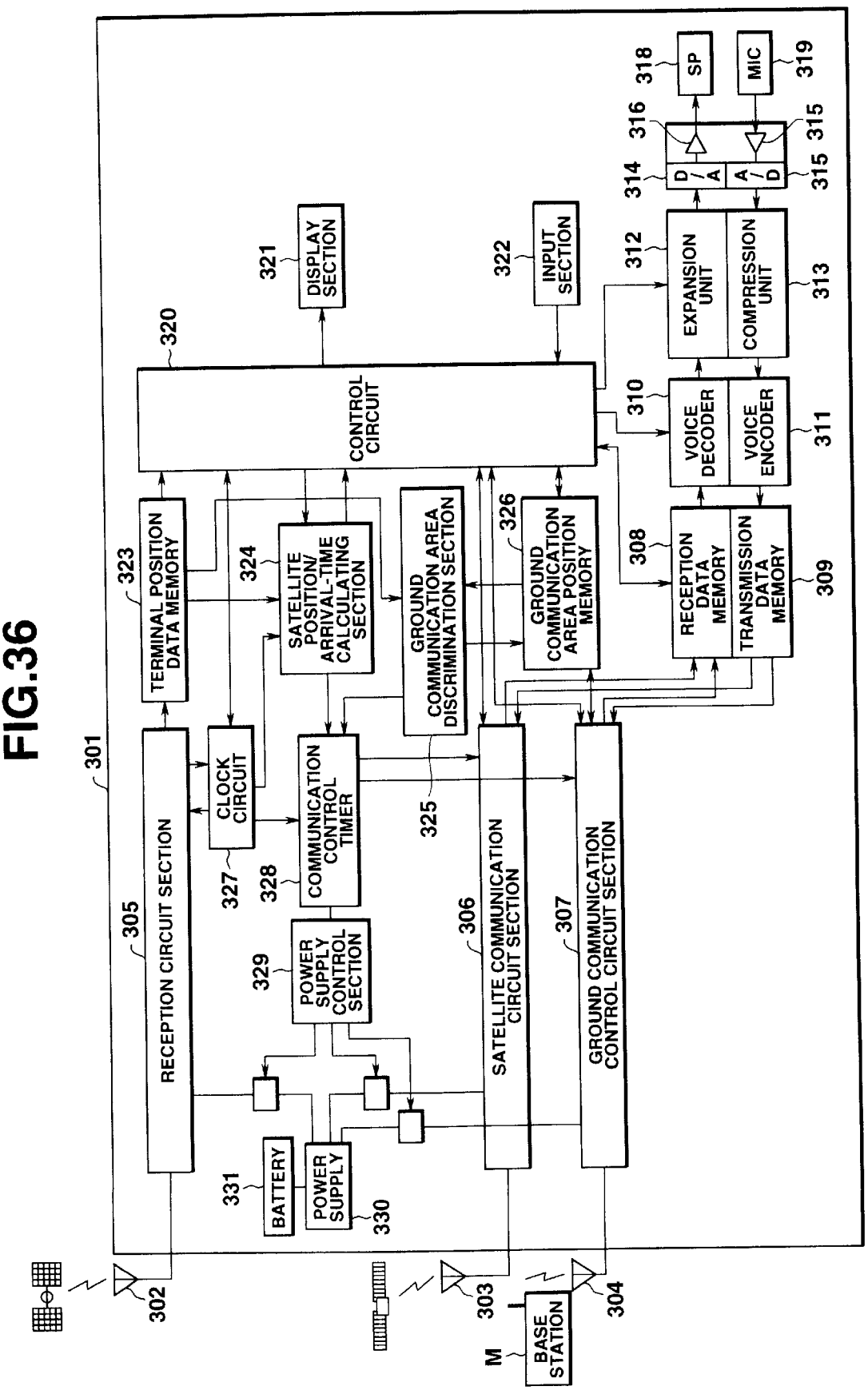
FIG. 36 is a block diagram which schematically shows the structure of a portable communication terminal apparatus according to the fifth embodiment of the present invention.

FIG. 36 shows the structure of the portable communication apparatus according to the fifth embodiment of the present invention. The portable communication terminal apparatus shown in FIG. 36 further includes a memory for storing position information representing the positions of ground communication areas.

The portable communication terminal apparatus illustrated in FIG. 36 has a position measurement antenna section 302, a satellite communication antenna section 303, a ground communication antenna section 304, a reception control section 305, a satellite communication circuit section 306, a ground communication control circuit section 307, a reception data memory 308, a transmission data memory 309, a voice decoder 310, a voice encoder 311, an expansion unit 312, a compression unit 313, a control circuit 320, a display section 321, an input section 322, a terminal position data memory 323, a satellite position/arrival-time calculating section 324, a ground communication area discrimination section 325, a ground communication area position memory 326, a clock circuit 327, a communication control timer 328, a power supply control section 329, a power supply 330 and a battery 331.

The ground communication area position memory 326 prestores data representing the extents of communicable areas and radio communication areas which radio base stations for ground mobile communications are in charge of, data showing the positions of the radio base stations, or data representing a table in which area names, position coordinates and communication services are shown in association with each other.

The ground communication area discrimination section 325 compares the measured position of the communication terminal apparatus and data stored in the ground communication area position memory 326 with each other, and discriminates a usable communication line and a communication system.

When the position of the portable communication terminal apparatus 301 is within an area which a radio base station is in charge of, the terminal apparatus performs communications via the ground radio base station and through a ground mobile communication line. When the position of the portable communication terminal apparatus 301 is not within such an area, it performs communications via the communication satellite and through a satellite communication line.

Figure 37:
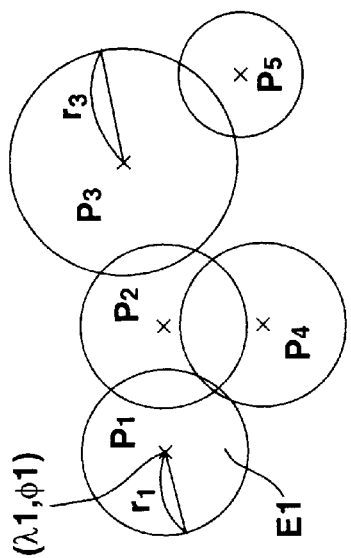
FIG. 37 is a schematic diagram for explaining one example of the structure of a communication area position memory included in the portable communication terminal apparatus.
Figure 38:
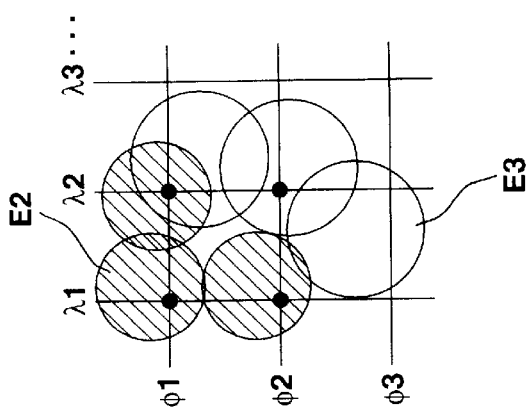
FIG. 38 is a schematic diagram for explaining another example of the structure of the communication area position memory included in the portable communication terminal apparatus.
Figure 39:
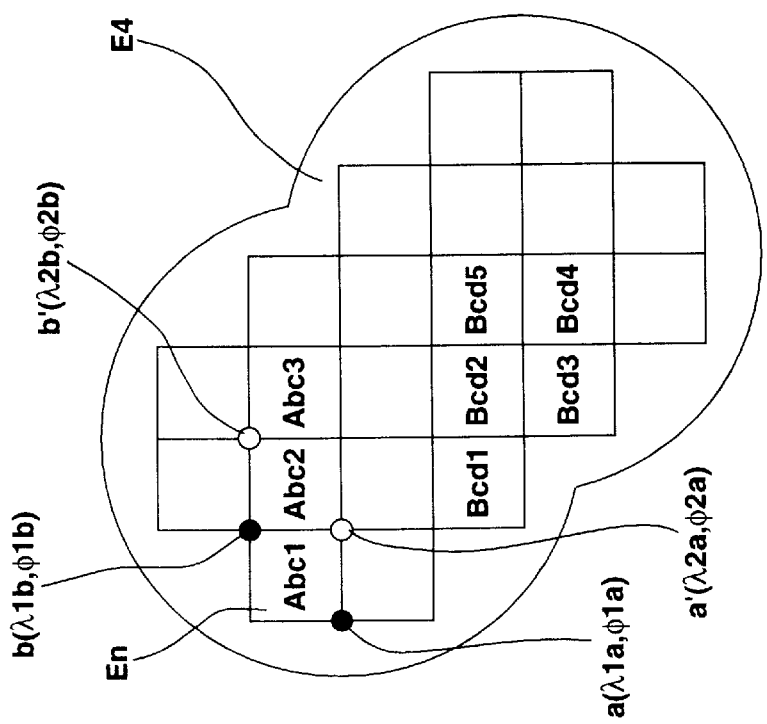
FIG. 39 is a schematic diagram for explaining another example of the structure of the communication area position memory included in the portable communication terminal apparatus.

FIGS. 37, 38 and 39 exemplify the constitution of the position information stored in the ground communication area position memory 326.

The position information shown in FIG. 37 includes position codes or area names used as keys, and the longitudes, latitudes and radii of their corresponding communication areas. The position information shown in FIG. 38 includes longitudes and latitudes used as keys and the types of their corresponding services, and indicates whether communications are possible or impossible. The position information shown in FIG. 39 includes the names of areas within a communication area and which are used as keys, and the longitudes and latitudes of diagonal vertices defining the extents of the areas. The ground communication area position memory 326 in the portable communication terminal apparatus stores those position information.

If the user inputs the position of the portable communication terminal apparatus 301 thereto or if the portable communication terminal apparatus 301 itself measures its position, that apparatus can determine whether ground communication is possible or impossible, without the need to operate the ground communication circuit section. Since there is no need to operate such a communication circuit section, which is large in power consumption, the power consumption of the communication terminal apparatus can be reduced, and the communication terminal apparatus can be miniaturized.

What is claimed is:

1. A communication apparatus comprising:

orbit calculation means for calculating a position of a communication satellite which is a position relative to the earth and which is changing;

current position discrimination means for discriminating a current position of said communication apparatus on the earth;

determination means for determining whether said communication satellite has arrived in a communicable area in which said communication satellite is capable of communicating with said communication apparatus, based on the position of said communication satellite which said orbit calculation means has calculated and the current position of said communication apparatus which said current position discrimination means has discriminated;

satellite communication means for communicating with said communication satellite; and communication control means for controlling said satellite communication means to start and stop communications, in accordance with a result of the determination performed by said determination means;

wherein said determination means and said communication control means include:

calculating means for calculating at least one of an arrival time at which said communication satellite is to arrive said communicable area and a leaving time at which said communication satellite is to leave said communicable area, storing means for storing the at least one of the arrival time and leaving time, a timer for counting current time, and comparing means for comparing the current time and the time stored in said storage device, and controlling said satellite communication means to start and stop communications, in accordance with a result of the comparison by said comparing means.

2. The communication apparatus according to claim 1, wherein said orbit calculation means includes:

storage means for storing orbital element data specifying a shape of an orbit of said communication satellite and a motion of said communication satellite, and means for calculating a geocentric position of said communication satellite which is the position relative to the earth, by performing orbital calculations based on the orbital element data stored in said storage means.

3. The communication apparatus according to claim 1, wherein said determination means includes position determination means for determining whether said communication satellite has arrived in said communicable area and whether said communication satellite has left said communicable area.

4. The communication apparatus according to claim 1, wherein said current position discrimination means includes position input means for inputting information representing the current position of said communication apparatus on the earth.

5. The communication apparatus according to claim 1, wherein said current position discrimination means includes position measurement calculation means for measuring and calculating the current position of said communication apparatus on the earth.

6. The communication apparatus according to claim 5, wherein said position measurement calculation means includes means for receiving signal radio waves from a GPS satellite and deriving the current position of said communication apparatus on the earth by performing predetermined position measurement and calculation based on the received signal radio waves.

7. The communication apparatus according to claim 1, wherein said position measurement calculation means and said satellite communication means share at least a part of an antenna and at least a part of a communication circuit.

8. The communication apparatus according to claim 1, wherein:

said determination means includes calculating determination means for calculating at least one of the arrival time at which said communication satellite is to arrive said in communicable area and the leaving time at which said communication satellite is to leave said communicable area, and for determining, based on a result of the calculation, whether said communication satellite has arrived in said communicable area, and said communication control means controls said satellite communication means to start and stop communications, in accordance with a result of the determination performed by said calculating determination means.

9. The communication apparatus according to claim 1, wherein said communication control means includes power supply control means for controlling turning on and off of a power supply to said satellite communication means.

10. The communication apparatus according to claim 1, wherein said satellite communication means includes communication means which employs at least one of a spread spectrum modulation and demodulation system and a code division multiple access system.

11. The communication apparatus according to claim 1, wherein said orbit calculation means includes storage means for storing orbital element data created by demodulating and decoding a signal which said satellite communication means has received from said communication satellite, and means for calculating the position of said communication satellite by using the orbital element data stored in said storage means.

12. A communication apparatus comprising:

orbit calculation means for calculating a position of a communication satellite which is a position relative to the earth and which is changing;

current position discrimination means for discriminating a current position of said communication apparatus on earth;

determination means for determining whether said communication satellite has arrived in a communicable area in which said communication satellite is capable of communicating with said communication apparatus, based on the position of said communication satellite which said orbit calculation means has calculated and the current position of said communication apparatus which said current position discrimination means has discriminated;

satellite communication means for communication with said communication satellite;

communication control means for controlling said satellite communication means to start and stop communications, in accordance with a result of the determination performed by said determination means;

display means for displaying data;

position calculation means for calculating communication satellite position information, based on at least one of orbit position information specifying a position of an orbit of said communication satellite, geocentric position information specifying a geocentric position of said communication satellite, and apparent position information specifying an apparent position of said communication satellite; and display control means for controlling said display means to display, in a form of at least one of character data and plot image data, the communication satellite position information calculated by said position calculation means.

13. The communication apparatus according to claim 1, wherein said communication apparatus is adapted to be fitted on a part of a body of a user.

14. A communication apparatus comprising:

orbit calculation means for calculating a position of a communication satellite which is a position relative to the earth and which is changing;

current position discrimination means for discriminating a current position of said communication apparatus on the earth;

determination means for determining whether said communication satellite has arrived in a communicable area in which said communication satellite is capable of communicating with said communication apparatus, based on the position of said communication satellite which said orbit calculation means has calculated and the current position of said communication apparatus which said current position discrimination means has discriminated;

satellite communication means for communicating with said communication satellite;

communication control means for controlling said satellite communication means to start and stop communications, in accordance with a result of the determination performed by said determination means; and an antenna element which is used to perform communications via said communication satellites;

wherein said antenna element includes one of a helical type antenna, a dielectric antenna and a patch type flat antenna.

15. The communication apparatus according to claim 14, wherein said communication apparatus is adapted to be fitted on a part of a body of a user.

16. A communication apparatus comprising:

orbit calculation means for calculating a position, relative to the earth, of a communication satellite;

current position discrimination means for discriminating a current position of said communication apparatus on the earth;

determination means for determining whether said communication satellite has arrived in a communicable area in which said communication satellite is capable of communicating with said communication apparatus, based on the position of said communication satellite which said orbit calculation means has calculated and the current position of said communication apparatus which said current position discrimination means has discriminated;

satellite communication means for communicating with said communication satellite;

ground communication means for performing communications via a earth radio base station; and communication control means for controlling said ground communication means to stop communications and controlling said satellite communication means to start communications, when said determination means determines that said communication satellite is in said communicable area, and for controlling said satellite communication means to stop communications and controlling said ground communication means to start communications, when said determination means determines that said communication satellite is not in said communicable area;

wherein said ground communication means includes identification code detection means for receiving and detecting an identification code sent from said earth radio base station; and wherein said communication control means includes means for controlling said ground communication means to start communications, when said identification code detection means detects the identification code sent from said earth radio base station, and for controlling said satellite communication means to start communications, when said identification code detection means does not detect the identification code sent from said earth radio base station and when said determination means determines that said communication satellite is in said communicable area.

17. The communication apparatus according to claim 16, wherein said ground communication means includes waiting reception means, which waits for a call from said earth radio base station, for performing communications upon receiving the call from said earth radio base station.

18. The communication apparatus according to claim 16, wherein said ground communication means and said satellite communication means share at least a part of an antenna and at least a part of a communication circuit.

19. A communication apparatus comprising:

orbit calculation means for calculating a position of a communication satellite;

current position detection means for detecting a current position of said communication apparatus on the ground and outputting current position information specifying the detected current position;

determination means for determining whether said communication satellite has arrived in a communicable area where said communication satellite is capable of communicating with said communication apparatus, based on the position of said communication satellite which said orbit calculation means has calculated and the current position of said communication apparatus which said current position detection means has detected;

satellite communication means for communicating with said communication satellite;

ground communication means for performing communications via a ground radio base station;

communication condition information storage means for storing communication condition information including communication area position information specifying a position of a communication area where said ground communication means is capable of performing communications;

area discrimination means for discriminating whether said communication apparatus is in said communication area, based on the current position information output from said current position detection means and the communication area position information stored in said communication condition information storage means; and communication control means for controlling said ground communication means to start communications, when said area discrimination means discriminates that said communication apparatus is in said communication area, and for controlling said satellite communication means to start communications, when said area discrimination means discriminates that said communication apparatus is not in said communication area.

* * * * *